(12) United States Patent
Kuempel et al.

(10) Patent No.: US 7,972,404 B2
(45) Date of Patent: *Jul. 5, 2011

(54) AIR CLEANER ARRANGEMENTS; COMPONENTS THEREOF; AND, METHODS

(75) Inventors: Bradley A. Kuempel, Eden Prairie, MN (US); Richard J. Osendorf, St. Paul, MN (US); Dan Adamek, Bloomington, MN (US); Wayne Bishop, St. Louis Park, MN (US); Nels Nordstrom, Bloomington, MN (US); John Pooler, Victoria, MN (US); Bill Whelan, St. Paul, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 536 days.

This patent is subject to a terminal disclaimer.

(21) Appl. No.: 11/821,378

(22) Filed: Jun. 21, 2007

(65) Prior Publication Data

US 2008/0066434 A1 Mar. 20, 2008

Related U.S. Application Data

(60) Provisional application No. 60/832,456, filed on Jul. 21, 2006, provisional application No. 60/815,794, filed on Jun. 22, 2006.

(51) Int. Cl.
*B01D 46/52* (2006.01)
*B01D 39/14* (2006.01)

(52) U.S. Cl. ............ 55/521; 55/385.3; 55/480; 55/481; 55/498; 55/502; 55/DIG. 31

(58) Field of Classification Search .................... 55/478, 55/480, 481, 498, 502, 203, 506, 520, 521, 55/503, 504, DIG. 31

See application file for complete search history.

(56) References Cited

U.S. PATENT DOCUMENTS

| | | |
|---|---|---|
| 991,572 A | 5/1911 | Weisenstein |
| 1,079,042 A | 11/1913 | Duncan |
| 1,103,717 A | 7/1914 | Walton et al. |
| 1,942,600 A | 1/1934 | Hornung |
| 2,074,294 A | 11/1935 | Woodruff |
| 2,599,604 A | 6/1952 | Bauer et al. |
| 2,887,177 A | 5/1959 | Mund et al. |
| 2,890,796 A | 6/1959 | Blood |
| 2,914,785 A | 12/1959 | Ela |
| 2,942,127 A | 6/1960 | Harse |

(Continued)

FOREIGN PATENT DOCUMENTS

CA 997684 9/1976

(Continued)

OTHER PUBLICATIONS

Invitation to Pay Additional Fees with Partial International Search Report mailed Dec. 6, 2007.

(Continued)

*Primary Examiner* — Robert A Clemente
(74) *Attorney, Agent, or Firm* — Merchant & Gould P.C.

(57) ABSTRACT

Air cleaner assemblies and components therefore are described and shown. Also methods of assembly and use are described and shown. Example air cleaner assemblies shown. Projection/receiver arrangements are described, for securing a filter cartridge in place within the housing. Also housing seal arrangements for the filter arrangements being sealed to the housing, and specific housing features and cartridge features are shown.

25 Claims, 27 Drawing Sheets

U.S. PATENT DOCUMENTS

| | | |
|---|---|---|
| 3,019,854 A | 3/1962 | O'Bryant |
| 3,025,963 A | 3/1962 | Bauer |
| 3,209,917 A | 10/1965 | Yelinek |
| 3,442,067 A | 5/1969 | Swenson |
| 3,494,113 A | 2/1970 | Kinney |
| 3,676,242 A | 7/1972 | Prentice |
| 3,695,437 A | 10/1972 | Shaltis |
| 3,740,933 A | 6/1973 | Hollowell |
| 3,807,150 A | 4/1974 | Maracle |
| 3,841,953 A | 10/1974 | Kohkamp et al. |
| 3,849,241 A | 11/1974 | Butin et al. |
| 3,878,014 A | 4/1975 | Melead |
| 3,912,631 A | 10/1975 | Turman |
| 4,018,580 A | 4/1977 | Bürkholz et al. |
| 4,065,341 A | 12/1977 | Cub |
| 4,158,449 A | 6/1979 | Sun et al. |
| 4,159,899 A | 7/1979 | Deschenes |
| 4,162,906 A | 7/1979 | Sullivan et al. |
| 4,236,902 A | 12/1980 | Fricke |
| 4,255,175 A | 3/1981 | Wilkins |
| 4,282,186 A | 8/1981 | Nonnemann et al. |
| 4,285,909 A | 8/1981 | Mizusawa et al. |
| 4,310,419 A | 1/1982 | Nara et al. |
| 4,322,231 A | 3/1982 | Hilzendeger et al. |
| 4,394,147 A | 7/1983 | Caddy et al. |
| 4,402,830 A | 9/1983 | Pall |
| 4,410,427 A | 10/1983 | Wydeven |
| 4,430,223 A | 2/1984 | Miyakawa et al. |
| 4,449,993 A | 5/1984 | Bergeron |
| 4,480,359 A | 11/1984 | Koster |
| 4,498,989 A | 2/1985 | Miyakawa et al. |
| 4,537,608 A | 8/1985 | Koslow |
| 4,578,091 A | 3/1986 | Borja |
| 4,589,983 A | 5/1986 | Wydeven |
| 4,617,176 A | 10/1986 | Merry |
| 4,678,489 A | 7/1987 | Bertelsen |
| 4,704,143 A | 11/1987 | Percy |
| 4,720,292 A | 1/1988 | Engel et al. |
| 4,759,783 A | 7/1988 | Machado |
| 4,767,531 A | 8/1988 | Holzer |
| 4,783,029 A | 11/1988 | Geppert et al. |
| 4,824,564 A | 4/1989 | Edwards et al. |
| 4,925,469 A * | 5/1990 | Clement et al. ................ 55/480 |
| 4,925,561 A | 5/1990 | Ishii et al. |
| 4,963,170 A | 10/1990 | Weber et al. |
| 4,999,038 A | 3/1991 | Lundberg |
| 5,013,182 A | 5/1991 | Coulvonvaux et al. |
| 5,030,264 A | 7/1991 | Klotz et al. |
| 5,049,326 A | 9/1991 | Matsumoto et al. |
| 5,069,790 A | 12/1991 | Mordeki |
| 5,082,476 A | 1/1992 | Kahlbaugh et al. |
| 5,125,941 A | 6/1992 | Ernst et al. |
| 5,174,895 A | 12/1992 | Drori |
| 5,211,846 A | 5/1993 | Kott et al. |
| 5,213,596 A | 5/1993 | Kume et al. |
| 5,238,474 A | 8/1993 | Kahlbaugh et al. |
| 5,304,312 A | 4/1994 | Forster et al. |
| 5,350,515 A | 9/1994 | Stark et al. |
| 5,415,677 A | 5/1995 | Ager et al. |
| 5,435,870 A | 7/1995 | Takagaki et al. |
| 5,472,463 A | 12/1995 | Herman et al. |
| 5,484,466 A | 1/1996 | Brown et al. |
| 5,487,767 A | 1/1996 | Brown |
| 5,494,497 A | 2/1996 | Lee |
| 5,536,290 A | 7/1996 | Stark et al. |
| 5,543,007 A | 8/1996 | Takagaki et al. |
| 5,547,480 A | 8/1996 | Coulonvaux |
| 5,569,311 A | 10/1996 | Oda et al. |
| 5,582,146 A | 12/1996 | Linsbauer et al. |
| 5,601,717 A | 2/1997 | Villette et al. |
| 5,611,922 A | 3/1997 | SteNe |
| 5,613,992 A | 3/1997 | Engel |
| 5,645,718 A | 7/1997 | Hardison et al. |
| 5,672,399 A | 9/1997 | Kahlbaugh et al. |
| 5,683,660 A | 11/1997 | Wirth et al. |
| 5,685,985 A | 11/1997 | Brown et al. |
| 5,690,712 A | 11/1997 | Engel |
| 5,714,126 A | 2/1998 | Frund |
| 5,730,766 A | 3/1998 | Clements |
| 5,730,768 A | 3/1998 | Kaminaga et al. |
| 5,740,774 A | 4/1998 | Kennedy |
| 5,755,843 A | 5/1998 | Sundquist |
| 5,772,883 A | 6/1998 | Rothman et al. |
| D396,098 S | 7/1998 | Gillingham et al. |
| 5,792,247 A | 8/1998 | Gillingham et al. |
| D398,046 S | 9/1998 | Gillingham et al. |
| 5,800,587 A | 9/1998 | Kahlbaugh et al. |
| 5,820,646 A * | 10/1998 | Gillingham et al. ............ 55/488 |
| 5,863,313 A | 1/1999 | Coulonvaux |
| 5,895,574 A | 4/1999 | Friedmann et al. |
| 5,897,676 A | 4/1999 | Engel |
| 5,902,364 A | 5/1999 | Tokar et al. |
| 5,908,480 A | 6/1999 | Ban et al. |
| 5,951,729 A | 9/1999 | Ernst et al. |
| D416,308 S | 11/1999 | Ward et al. |
| D417,268 S | 11/1999 | Gillingham |
| 6,007,169 A | 12/1999 | Li et al. |
| 6,048,386 A | 4/2000 | Gillingham et al. |
| D425,189 S | 5/2000 | Gillingham et al. |
| 6,149,700 A | 11/2000 | Morgan et al. |
| 6,179,890 B1 | 1/2001 | Romas et al. |
| 6,190,432 B1 * | 2/2001 | Gieseke et al. ............ 55/385.3 |
| 6,231,630 B1 | 5/2001 | Ernst et al. |
| 6,235,195 B1 | 5/2001 | Tokar |
| 6,264,713 B1 | 7/2001 | Lewis |
| 6,296,025 B1 | 10/2001 | Gregg et al. |
| 6,299,661 B1 | 10/2001 | Bloomer et al. |
| 6,322,602 B2 | 11/2001 | Engel et al. |
| 6,348,084 B1 | 2/2002 | Gieseke et al. |
| 6,348,085 B1 | 2/2002 | Tokar et al. |
| 6,350,291 B1 * | 2/2002 | Gieseke et al. ............ 55/385.3 |
| 6,368,374 B1 | 4/2002 | Tokar et al. |
| D461,003 S | 7/2002 | Gieseke et al. |
| 6,517,598 B2 * | 2/2003 | Anderson et al. ................ 55/498 |
| 6,572,667 B1 | 6/2003 | Greif et al. |
| 6,585,792 B2 | 7/2003 | Schneider et al. |
| 6,598,580 B2 | 7/2003 | Baumann et al. |
| 6,610,117 B2 * | 8/2003 | Gieseke et al. ............ 55/385.3 |
| 6,610,126 B2 * | 8/2003 | Xu et al. .................... 95/273 |
| D483,459 S | 12/2003 | DeWit et al. |
| 6,673,136 B2 * | 1/2004 | Gillingham et al. ............ 95/273 |
| 6,743,317 B2 | 6/2004 | Wydeven |
| 6,783,565 B2 | 8/2004 | Gieseke et al. |
| 6,878,190 B1 * | 4/2005 | Xu et al. .................... 95/273 |
| 6,953,124 B2 | 10/2005 | Winter et al. |
| 6,966,940 B2 | 11/2005 | Krisko et al. |
| 6,974,490 B2 * | 12/2005 | Gillingham et al. ............ 55/486 |
| 6,997,968 B2 * | 2/2006 | Xu et al. .................... 55/495 |
| 7,004,986 B2 | 2/2006 | Kopec et al. |
| 7,090,712 B2 * | 8/2006 | Gillingham et al. ............ 55/486 |
| 7,097,694 B1 | 8/2006 | Jaroszczyk et al. |
| 7,211,124 B2 | 5/2007 | Gieseke et al. |
| 7,255,300 B2 | 8/2007 | Johnston |
| 7,318,851 B2 | 1/2008 | Brown et al. |
| 7,323,029 B2 * | 1/2008 | Engelland et al. ............. 55/502 |
| 7,351,270 B2 * | 4/2008 | Engelland et al. ............. 55/502 |
| 7,396,375 B2 * | 7/2008 | Nepsund et al. ................ 55/481 |
| 2001/0003893 A1 | 6/2001 | Ramos et al. |
| 2001/0037631 A1 | 11/2001 | Morgan et al. |
| 2002/0184864 A1 | 12/2002 | Bishop et al. |
| 2002/0185007 A1 | 12/2002 | Xu et al. |
| 2004/0020177 A1 | 2/2004 | Hiromi et al. |
| 2004/0173097 A1 | 9/2004 | Engelland et al. |
| 2004/0221555 A1 | 11/2004 | Engelland et al. |
| 2005/0081497 A1 | 4/2005 | Connor et al. |
| 2006/0081528 A1 | 4/2006 | Oelpke et al. |
| 2006/0090431 A1 | 5/2006 | Brown |
| 2006/0090434 A1 | 5/2006 | Brown et al. |
| 2006/0091061 A1 | 5/2006 | Brown |
| 2006/0091064 A1 | 5/2006 | Brown et al. |
| 2006/0091084 A1 | 5/2006 | Merritt et al. |
| 2006/0101999 A1 | 5/2006 | Steins |
| 2006/0121768 A1 | 6/2006 | Dworatzek et al. |
| 2006/0123754 A1 | 6/2006 | Oelpke et al. |
| 2006/0151655 A1 | 7/2006 | Johnston |
| 2006/0163150 A1 | 7/2006 | Golden |
| 2007/0006560 A1 | 1/2007 | Ruhland et al. |

| | | | |
|---|---|---|---|
| 2007/0169449 A1 | 7/2007 | Merritt | |
| 2007/0186527 A1 | 8/2007 | Lampert et al. | |
| 2007/0186528 A1 | 8/2007 | Wydeven et al. | |
| 2007/0193236 A1 | 8/2007 | Merritt | |
| 2007/0261662 A1 | 11/2007 | Lampert et al. | |
| 2008/0011896 A1 | 1/2008 | Johnston et al. | |
| 2008/0060329 A1 | 3/2008 | Brown et al. | |
| 2008/0086990 A1 | 4/2008 | Kuempel et al. | |
| 2008/0115470 A1 | 5/2008 | Kuempel et al. | |
| 2008/0135470 A1 | 6/2008 | Merritt et al. | |
| 2008/0250763 A1* | 10/2008 | Widerski et al. | 55/357 |
| 2008/0271423 A1* | 11/2008 | Nepsund et al. | 55/481 |
| 2009/0090091 A1 | 4/2009 | Kuempel et al. | |

FOREIGN PATENT DOCUMENTS

| | | |
|---|---|---|
| DE | 3405719 A1 | 8/1985 |
| DE | 2155522 | 5/1993 |
| DE | 40 31 014 C2 | 11/1993 |
| DE | 44 15 890 A1 | 11/1995 |
| EP | 0 376 443 A2 | 7/1990 |
| EP | 0 486 276 A1 | 5/1992 |
| EP | 0 492 250 | 7/1992 |
| EP | 0 529 921 | 3/1993 |
| EP | 05 581 695 | 2/1994 |
| EP | 0 704 233 A1 | 4/1996 |
| EP | 0 726 389 | 8/1996 |
| EP | 0 738 528 | 10/1996 |
| EP | 0897317 | 7/2000 |
| EP | 1 159 052 B1 | 11/2003 |
| EP | 1 364 695 A1 | 11/2003 |
| EP | 1 169 109 B1 | 4/2004 |
| EP | 1 731 749 A1 | 12/2006 |
| EP | 1 509 311 B1 | 1/2007 |
| EP | 1 258 278 | 1/2008 |
| FR | 2 034 160 | 12/1970 |
| GB | 703823 | 2/1954 |
| GB | 1275651 | 5/1972 |
| JP | S58-151417 | 3/1982 |
| JP | 59-26113 | 2/1984 |
| JP | S60-155921 | 3/1984 |
| JP | 59-170669 | 11/1984 |
| JP | 60-112320 | 7/1985 |
| JP | H02-48118 | 9/1988 |
| JP | 1-11971 | 4/1989 |
| JP | 01 171615 A | 10/1989 |
| JP | 63-122617 | 6/1998 |
| JP | H02-48117 | 9/1998 |
| WO | 88/03432 | 5/1988 |
| WO | WO 88/03431 | 5/1988 |
| WO | 97/40908 | 11/1997 |
| WO | 97/40910 | 11/1997 |
| WO | 97/40917 | 11/1997 |
| WO | WO 97/40918 | 11/1997 |
| WO | WO 97/41939 | 11/1997 |
| WO | WO 97/45200 | 12/1997 |
| WO | WO 98/35144 | 8/1998 |
| WO | WO 99/37381 | 7/1999 |
| WO | WO 99/47237 | 9/1999 |
| WO | WO 00/50149 | 8/2000 |
| WO | WO 00/74818 | 12/2000 |
| WO | 02/49741 A1 | 6/2002 |
| WO | WO 03/084641 | 2/2003 |
| WO | WO 03/095068 | 11/2003 |
| WO | WO 2004/007054 | 1/2004 |
| WO | WO 2004/020075 A2 | 3/2004 |
| WO | WO 2005/046841 | 5/2005 |
| WO | WO 2005/079954 | 9/2005 |
| WO | WO 2006/009766 | 1/2006 |
| WO | WO 2006/009766 A1 | 1/2006 |
| WO | WO 2007/000397 A1 | 4/2007 |
| WO | WO 2007/044677 | 4/2007 |
| WO | WO 2007/044677 A1 | 4/2007 |

OTHER PUBLICATIONS

U.S. Appl. No. 09/258,481, filed Feb. 26, 1999.
U.S. Appl. No. 09/502,346, filed Feb. 10, 2000.
U.S. Appl. No. 10/055,062, filed Jan. 22, 2002.
U.S. Appl. No. 10/914,510, filed Aug. 9, 2004.
U.S. Appl. No. 11/999,246, filed Dec. 3, 2007.
Exhibit A corresponding to U.S. Appl. No. 12/087,819.
Exhibit B corresponding to U.S. Appl. No. 11/625,096.
Search Report and Written Opinion corresponding to PCT/US2007/001476.
Exhibit A, Pending Claims corresponding to U.S. Appl. No. 12/087,819.
Exhibit B, Pending Claims corresponding to U.S. Appl. No. 11/625,096.

* cited by examiner

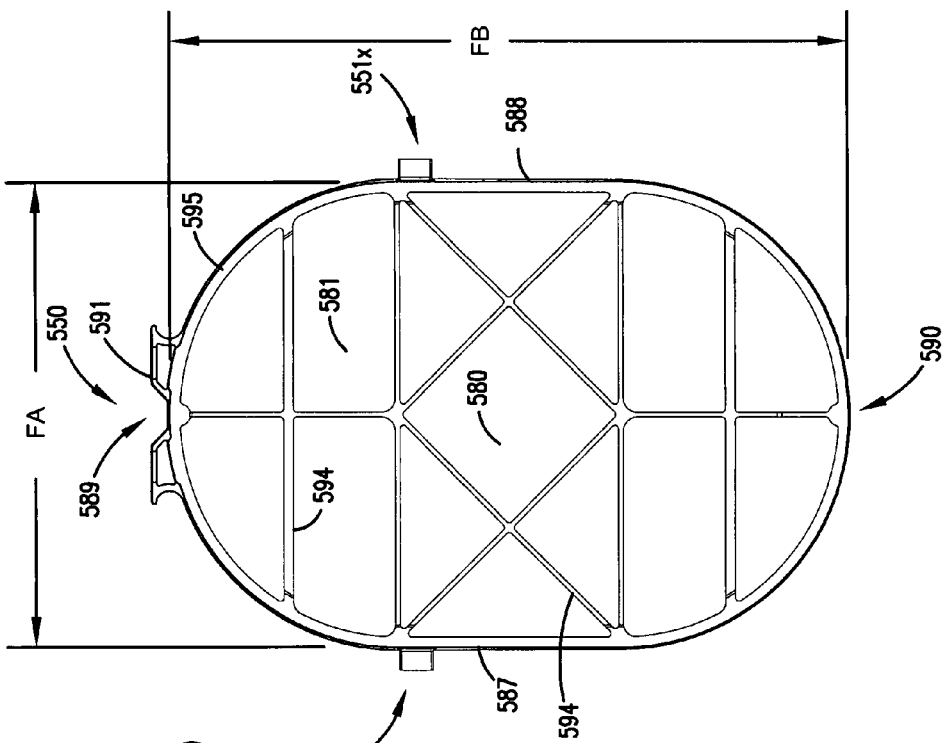
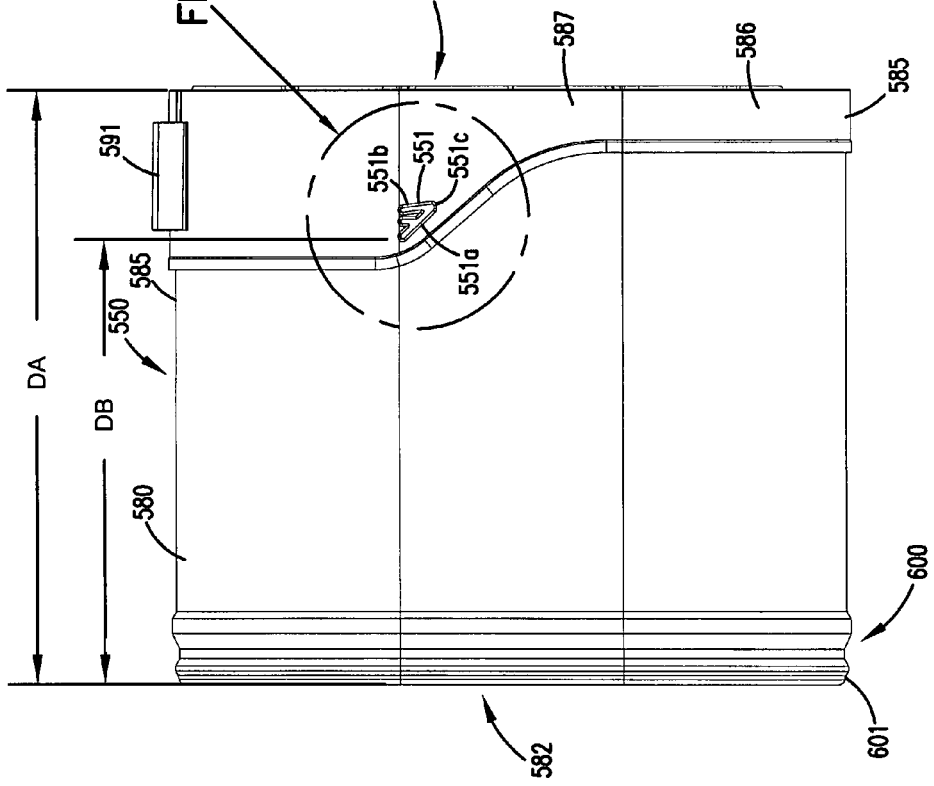

AIR CLEANER ARRANGEMENTS; COMPONENTS THEREOF; AND, METHODS

CROSS-REFERENCE TO RELATED APPLICATIONS

A claim of priority for the present application is made to U.S. Provisional application 60/832,456 filed Jul. 21, 2006, to the extent appropriate. In addition, the present application includes a portion of the disclosure in U.S. Provisional application 60/815,794 filed Jun. 22, 2006. A claim of priority to provisional application 60/815,794 is made to the extent appropriate.

Provisional applications U.S. 60/815,794 and 60/832,456 are incorporated herein by reference.

FIELD OF THE DISCLOSURE

The present disclosure concerns air cleaners for use, for example, for cleaning engine combustion air for vehicles and other equipment. The disclosure provides preferred components, assemblies and methods.

BACKGROUND

Gas streams often carry particulate material therein. In many instances it is desirable to remove some or all of the particulate material from the gas flow stream. For example, air intake streams to engines for motorized vehicles or power generation equipment often include particulate material therein. The particulate material, should it reach the internal workings of the mechanisms involved, can cause substantial damage. It is therefore preferred, for such systems, to remove the particulate material from the gas flow upstream of the engine or other equipment involved. A variety of air cleaner arrangements have been developed for particulate removal.

There has been a general trend for the utilization of air cleaner arrangements that utilize, as a media pack, z-filter media constructions. In general z-filter media constructions can be characterized as comprising fluted media sheet material secured to a facing media sheet material, formed into a media pack configuration. Examples of z-filter arrangements are described in PCT Publication WO 97/40918, published Nov. 6, 1997; U.S. Pat. Nos. 6,190,432 and 6,350,291; PCT application US 04/07927, filed Mar. 17, 2004; U.S. Provisional application 60/532,783, filed Dec. 22, 2003; PCT Publication 03/095068, published Nov. 20, 2003; PCT publication WO 04/007054, published Jan. 22, 2004; PCT publication WO 03/084641, published Oct. 16, 2003; and, U.S. Provisional Application 60/543,804, filed Feb. 11, 2004; the complete disclosures of each of these cited references being incorporated herein by reference.

With some arrangements, it has been desired to develop configurations in which the z-filter media is loaded into an air cleaner housing through a side (as opposed to an end) of the housing. Such arrangements are described for example in WO 03/095068, incorporated herein by reference.

Selected components described herein are improvements in such air cleaner arrangements as those described in U.S. Provisional Application 60/567,121, filed Apr. 30, 2004; U.S. Provisional Application 60/604,549, filed Aug. 25, 2004; U.S. Provisional Application 60/649,301, filed Feb. 1, 2005; and PCT Publication WO 05/107924, published Nov. 17, 2005. Each of these references is incorporated herein by reference.

SUMMARY OF THE DISCLOSURE

The present disclosure concerns air cleaners and componentry therefor. A variety of features and component features are described, for air cleaners and their components, including serviceable filter cartridges. Selected features described herein relate to features in an air cleaner housing facilitating secure installation of primary filter cartridges; and, features of primary filter cartridges that facilitate installation in such housings.

It is noted that not all of the features described herein must be incorporated in an arrangement, for the arrangement to have some selected advantage according to the present disclosure.

BRIEF DESCRIPTION OF THE DRAWINGS

FIG. 11 depicting the cartridge in side plan view toward a side facing an installer, during an example installation.

FIG. 29 is a side elevational view of a filter cartridge installable in the air cleaner of FIGS. 20-28.

FIG. 31 is a schematic inlet end elevational view of the filter cartridge depicted in FIG. 29.

DETAILED DESCRIPTION

I. Z-Filter Media Configurations, Generally

Figure 1:
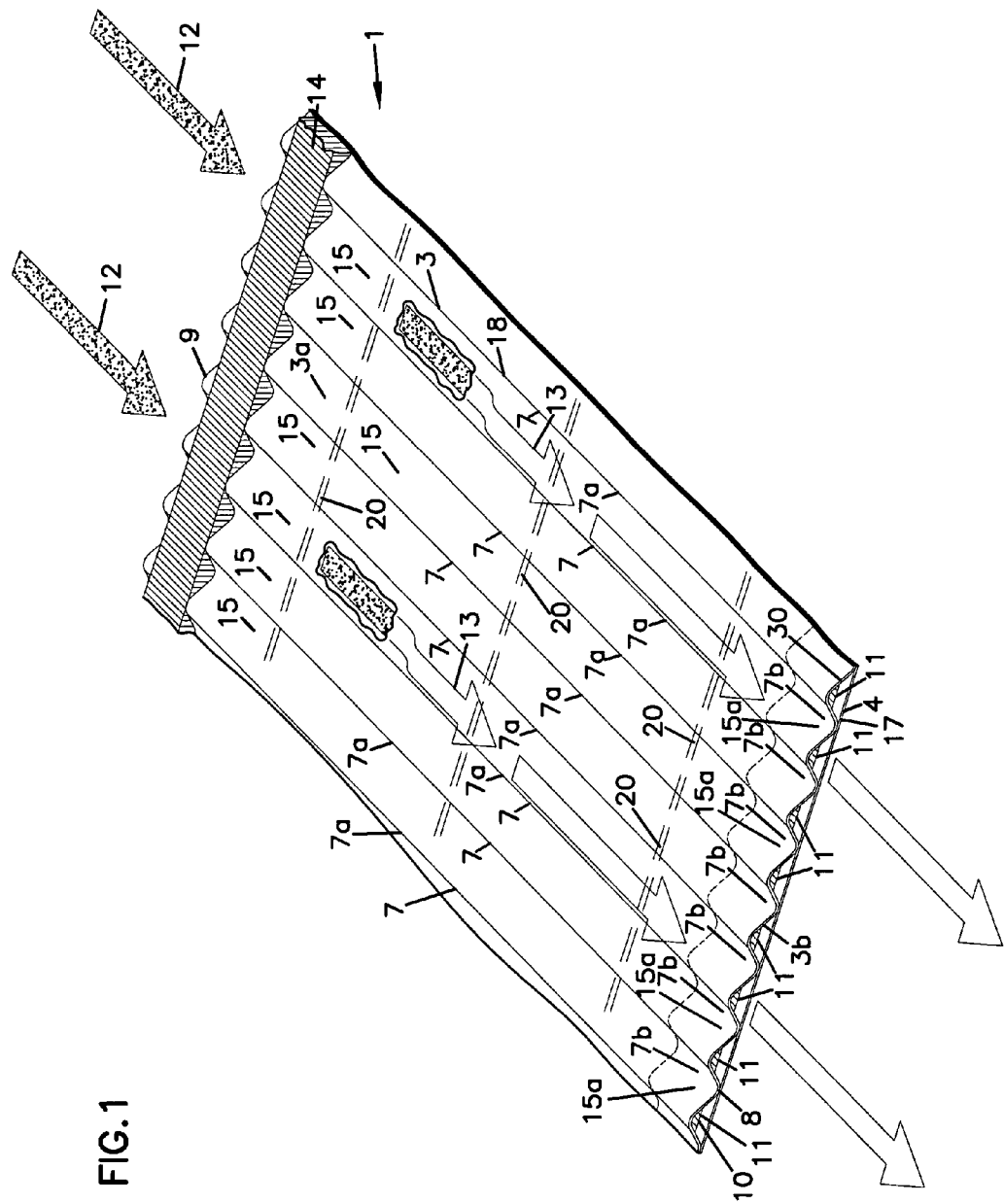
FIG. 1 is a fragmentary, schematic, perspective view of an example z-filter media useable in arrangements according to the present disclosure.

Fluted filter media can be used to provide fluid filter constructions in a variety of manners. One well known manner is as a z-filter construction. The term "z-filter construction" as used herein, is meant to refer to a filter construction in which individual ones of corrugated, folded or otherwise formed filter flutes are used to define longitudinal filter flutes for fluid flow through the media; the fluid flowing along the flutes between opposite inlet and outlet flow ends (or flow faces) of the media. Some examples of z-filter media are provided in U.S. Pat. Nos. 5,820,646; 5,772,883; 5,902,364; 5,792,247; 5,895,574; 6,210,469; 6,190,432; 6,350,296; 6,179,890; 6,235,195; Des. 399,944; Des. 428,128; Des. 396,098; Des. 398,046; and, Des. 437,401; each of these fifteen cited references being incorporated herein by reference.

One type of z-filter media, utilizes two specific media components joined together, to form the media construction. The two components are: (1) a fluted (typically corrugated) media sheet; and, (2) a facing media sheet. The facing media sheet is typically non-corrugated, however it can be corrugated, for example perpendicularly to the flute direction as described in U.S. provisional 60/543,804, filed Feb. 11, 2004, incorporated herein by reference.

In certain z-filter arrangements, the fluted (typically corrugated) media sheet and the facing media sheet, together, can be used to define media having parallel inlet and outlet flutes. In some instances, the fluted sheet and non-fluted sheet are secured together and are then coiled to form a z-filter media construction. Such arrangements are described, for example, in U.S. Pat. Nos. 6,235,195 and 6,179,890, each of which is incorporated herein by reference. In certain other arrangements, some non-coiled sections of fluted media secured to flat media, are stacked on one another, to create a filter construction. An example of this is described in FIG. 11 of U.S. Pat. No. 5,820,646, incorporated herein by reference.

For specific examples described herein below, coiled arrangements are depicted, although many of the principles can be applied with stacked arrangements.

Typically, coiling of the fluted sheet/facing sheet combination around itself, to create a coiled media pack, is conducted with the facing sheet directed outwardly. Some techniques for coiling are described in U.S. provisional application 60/467, 521, filed May 2, 2003 and PCT Application US 04/07927, filed Mar. 17, 2004, each of which is incorporated herein by reference. The resulting coiled arrangement generally has, as the outer surface of the media pack, a portion of the facing sheet, as a result.

The term "corrugated" used herein to refer to structure in media, is meant to refer to a flute structure resulting from passing the media between two corrugation rollers, i.e., into a nip or bite between two rollers, each of which has surface features appropriate to cause a corrugation affect in the resulting media. The term "corrugation" is not meant to refer to flutes that are formed by techniques not involving passage of media into a bite between corrugation rollers. However, the term "corrugated" is meant to apply even if the media is further modified or deformed after corrugation, for example by the folding techniques described in PCT WO 04/007054, published Jan. 22, 2004, incorporated herein by reference.

Corrugated media is a specific form of fluted media. Fluted media is media which has individual flutes (for example formed by corrugating or folding) extending thereacross.

Serviceable filter element or filter cartridge configurations utilizing z-filter media are sometimes referred to as "straight through flow configurations" or by variants thereof. In general, in this context what is meant is that the serviceable filter elements generally have an inlet flow end (or face) and an opposite exit flow end (or face), with flow entering and exiting the filter cartridge in generally the same straight through direction. (The term "straight through flow configuration" disregards, for this definition, air flow that passes out of the media pack through the outermost wrap of facing media.) The term "serviceable" in this context is meant to refer to a media containing filter cartridge that is periodically removed and replaced from a corresponding air cleaner. In some instances, each of the inlet flow end and outlet flow end will be generally flat or planar, with the two parallel to one another. However, variations from this, for example non-planar faces, are possible in some applications.

A straight through flow configuration (especially for a coiled media pack) is, for example, in contrast to serviceable filter cartridges such as cylindrical pleated filter cartridges of the type shown in U.S. Pat. No. 6,039,778, incorporated herein by reference, in which the flow generally makes a substantial turn as its passes through the serviceable cartridge. That is, in a U.S. Pat. No. 6,039,778 filter, the flow enters the cylindrical filter cartridge through a cylindrical side, and then turns to exit through an end face (in forward-flow systems). In a typical reverse-flow system, the flow enters the serviceable cylindrical cartridge through an end face and then turns to exit through a side of the cylindrical filter cartridge. An example of such a reverse-flow system is shown in U.S. Pat. No. 5,613,992, incorporated by reference herein.

The term "z-filter media construction" and variants thereof as used herein, without more, is meant to refer to any or all of: a web of corrugated or otherwise fluted media secured to (facing) media with appropriate sealing to inhibit air flow from one flow face to another without filtering passage through the filter media; and/or, such a media coiled or otherwise constructed or formed into a three dimensional network of flutes; and/or, a filter construction including such media. In many arrangements, the z-filter media construction is configured for the formation of a network of inlet and outlet flutes, inlet flutes being open at a region adjacent an inlet face and being closed at a region adjacent an outlet face; and, outlet flutes being closed adjacent an inlet face and being open adjacent an outlet face. However, alternative z-filter media arrangements are possible, see for example US 2006/0091084 A1, published May 4, 2006 to Baldwin filters, also comprising flutes extending between opposite flow faces, with a seal arrangement to prevent flow of unfiltered air through the media pack.

In FIG. 1 herein, an example type of media 1 useable as z-filter media is shown. The media 1 is formed from a fluted (in the example corrugated) sheet 3 and a facing sheet 4.

In general, the (fluted corrugated) sheet 3, FIG. 1 is of a type generally characterized herein as having a regular, curved, wave pattern of flutes or corrugations 7. The term "wave pattern" in this context, is meant to refer to a flute or corrugated pattern of alternating troughs 7b and ridges 7a. The term "regular" in this context is meant to refer to the fact that the pairs of troughs and ridges (7b, 7a) alternate with generally the same repeating corrugation (or flute) shape and size. (Also, typically in a regular configuration each trough 7b is substantially an inverse of each ridge 7a.) The term "regular" is thus meant to indicate that the corrugation (or flute) pattern comprises troughs and ridges with each pair (comprising an adjacent trough and ridge) repeating, without substantial modification in size and shape of the corrugations along at least 70% of the length of the flutes. The term "substantial" in this context, refers to a modification resulting from a change in the process or form used to create the corrugated or fluted sheet, as opposed to minor variations from the fact that the media sheet 3 is flexible. With respect to the characterization of a repeating pattern, it is not meant that in any given filter construction, an equal number of ridges and troughs is necessarily present. The media 1 could be terminated, for example, between a pair comprising a ridge and a trough, or partially along a pair comprising a ridge and a trough. (For example, in FIG. 1 the media 1 depicted in fragmentary has eight complete ridges 7a and seven complete troughs 7b.) Also, the opposite flute ends (ends of the troughs and ridges) may vary from one another. Such variations in ends are disregarded in these definitions, unless specifically stated. That is, variations in the ends of flutes are intended to be covered by the above definitions.

In the context of the characterization of a "curved" wave pattern of corrugations, the term "curved" is meant to refer to a corrugation pattern that is not the result of a folded or creased shape provided to the media, but rather the apex 7a of each ridge and the bottom 7b of each trough is formed along a radiused curve. Although alternatives are possible, a typical radius for such z-filter media would be at least 0.25 mm and typically would be not more than 3 mm. (Media that is not curved, by the above definition, can also be useable.)

An additional characteristic of the particular regular, curved, wave pattern depicted in FIG. 1, for the corrugated sheet 3, is that at approximately a midpoint 30 between each trough and each adjacent ridge, along most of the length of the flutes 7, is located a transition region where the curvature inverts. For example, viewing back side or face 3a, FIG. 1, trough 7b is a concave region, and ridge 7a is a convex region. Of course when viewed toward front side or face 3b, trough 7b of side 3a forms a ridge; and, ridge 7a of face 3a, forms a trough. (In some instances, region 30 can be a straight segment, instead of a point, with curvature inverting at ends of the segment 30.)

A characteristic of the particular regular, curved, wave pattern corrugated sheet 3 shown in FIG. 1, is that the individual corrugations are generally straight. By "straight" in this context, it is meant that through at least 70% (typically at least 80%) of the length between edges 8 and 9, the ridges 7a and troughs 7b do not change substantially in cross-section. The term "straight" in reference to corrugation pattern shown in FIG. 1, in part distinguishes the pattern from the tapered flutes of corrugated media described in FIG. 1 of WO 97/40918 and PCT Publication WO 03/47722, published Jun. 12, 2003, incorporated herein by reference. The tapered flutes of FIG. 1 of WO 97/40918, for example, would be a curved wave pattern, but not a "regular" pattern, or a pattern of straight flutes, as the terms are used herein.

Referring to the present FIG. 1 and as referenced above, the media 1 has first and second opposite edges 8 and 9. For the example shown, when the media 1 is coiled and formed into a media pack, in general edge 9 will form an inlet end for the media pack and edge 8 an outlet end, although an opposite orientation is possible in some applications.

In the example shown, adjacent edge 8 is provided sealant, in this instance in the form of a sealant bead 10, sealing the corrugated (fluted) sheet 3 and the facing sheet 4 together. Bead 10 will sometimes be referred to as a "single facer" bead, since it is a bead between the corrugated sheet 3 and facing sheet 4, which forms the single facer or media strip 1. Sealant bead 10 seals closed individual flutes 11 adjacent edge 8, to passage of air therefrom.

In the example shown, adjacent edge 9 is provided sealant, in this instance in the form of a seal bead 14. Seal bead 14 generally closes flutes 15 to passage of unfiltered fluid therein, adjacent edge 9. Bead 14 would typically be applied as the media 1 is coiled about itself, with the corrugated sheet 3 directed to the inside. Thus, bead 14 will form a seal between a back side 17 of facing sheet 4, and side 18 of the corrugated sheet 3. The bead 14 will sometimes be referred to as a "winding bead" since it is typically applied, as the strip 1 is coiled into a coiled media pack. If the media 1 is cut in strips and stacked, instead of coiled, bead 14 would be a "stacking bead."

Referring to FIG. 1, once the media 1 is incorporated into a media pack, for example by coiling or stacking, it can be operated as follows. First, air in the direction of arrows 12, would enter open flutes 11 adjacent end 9. Due to the closure at end 8, by bead 10, the air would pass through the media shown by arrows 13. It could then exit the media pack, by passage through open ends 15a of the flutes 15, adjacent end 8 of the media pack. Of course operation could be conducted with air flow in the opposite direction.

In more general terms, z-filter media comprises fluted filter media secured to facing filter media, and configured in a media pack of flutes extending between first and second opposite flow faces. A sealant or seal arrangement is provided within the media pack, to ensure that air entering flutes at a first upstream edge cannot exit the media pack from a downstream edge, without filtering passage through the media. Alternately stated, a z-filter media is closed to passage of unfiltered air therethrough, between the inlet face and the outlet flow face, typically by a sealant arrangement or other arrangement.

For the particular arrangement shown herein in FIG. 1, the parallel corrugations 7a, 7b are generally straight completely across the media, from edge 8 to edge 9. Straight flutes or corrugations can be deformed or folded at selected locations, especially at ends. Modifications at flute ends for closure are generally disregarded in the above definitions of "regular," "curved" and "wave pattern."

Z-filter constructions which do not utilize straight, regular curved wave pattern corrugation (flute) shapes are known. For example in Yamada et al. U.S. Pat. No. 5,562,825 corrugation patterns which utilize somewhat semicircular (in cross section) inlet flutes adjacent narrow V-shaped (with curved sides) exit flutes are shown (see FIGS. 1 and 3, of U.S. Pat. No. 5,562,825). In Matsumoto, et al. U.S. Pat. No. 5,049,326 circular (in cross-section) or tubular flutes defined by one sheet having half tubes attached to another sheet having half tubes, with flat regions between the resulting parallel, straight, flutes are shown, see FIG. 2 of Matsumoto '326. In Ishii, et al. U.S. Pat. No. 4,925,561 (FIG. 1) flutes folded to have a rectangular cross section are shown, in which the flutes taper along their lengths. In WO 97/40918 (FIG. 1), flutes or parallel corrugations which have a curved, wave patterns (from adjacent curved convex and concave troughs) but which taper along their lengths (and thus are not straight) are shown. Also, in WO 97/40918 flutes which have curved wave patterns, but with different sized ridges and troughs, are shown.

In general, the filter media is a relatively flexible material, typically a non-woven fibrous material (of cellulose fibers, synthetic fibers or both) often including a resin therein, sometimes treated with additional materials. Thus, it can be conformed or configured into the various fluted, for example corrugated, patterns, without unacceptable media damage. Also, it can be readily coiled or otherwise configured for use, again without unacceptable media damage. Of course, it must be of a nature such that it will maintain the required fluted (for example corrugated) configuration, during use.

In the corrugation or fluting process, an inelastic deformation is caused to the media. This prevents the media from returning to its original shape. However, once the tension is released the flutes or corrugations will tend to spring back, recovering only a portion of the stretch and bending that has occurred. The facing sheet is sometimes tacked to the fluted sheet, to inhibit this spring back in the fluted (or corrugated) sheet.

Also, typically, the media contains a resin. During the corrugation process, the media can be heated to above the glass transition point of the resin. When the resin then cools, it will help to maintain the fluted shapes.

The media of the corrugated sheet 3, facing sheet 4 or both, can be provided with a fine fiber material on one or both sides thereof, for example in accord with U.S. Pat. No. 6,673,136, incorporated herein by reference.

An issue with respect to z-filter constructions relates to closing of the individual flute ends. Typically a sealant or adhesive is provided, to accomplish the closure. As is apparent from the discussion above, in typical z-filter media, especially that which uses straight flutes as opposed to tapered flutes, large sealant surface areas (and volume) at both the upstream end and the downstream end are needed. High quality seals at these locations are critical to proper operation of the media structure that results. The high sealant volume and area creates issues with respect to this.

Still referring to FIG. 1, at 20 tack beads are shown positioned between the corrugated sheet 3 and facing sheet 4, securing the two together. The tack beads 20 can be for example, discontinuous lines of adhesive. The tack beads can also be points in which the media sheets are welded together.

From the above, it will be apparent that the example corrugated sheet 3 depicted is typically not secured continuously to the facing sheet, along the troughs or ridges where the two adjoin. Thus, air can flow between adjacent inlet flutes, and alternately between the adjacent outlet flutes, without passage through the media. However air which has entered in inlet flute cannot exit from an outlet flute, without passing through at least one sheet of media, with filtering.

Figure 2:
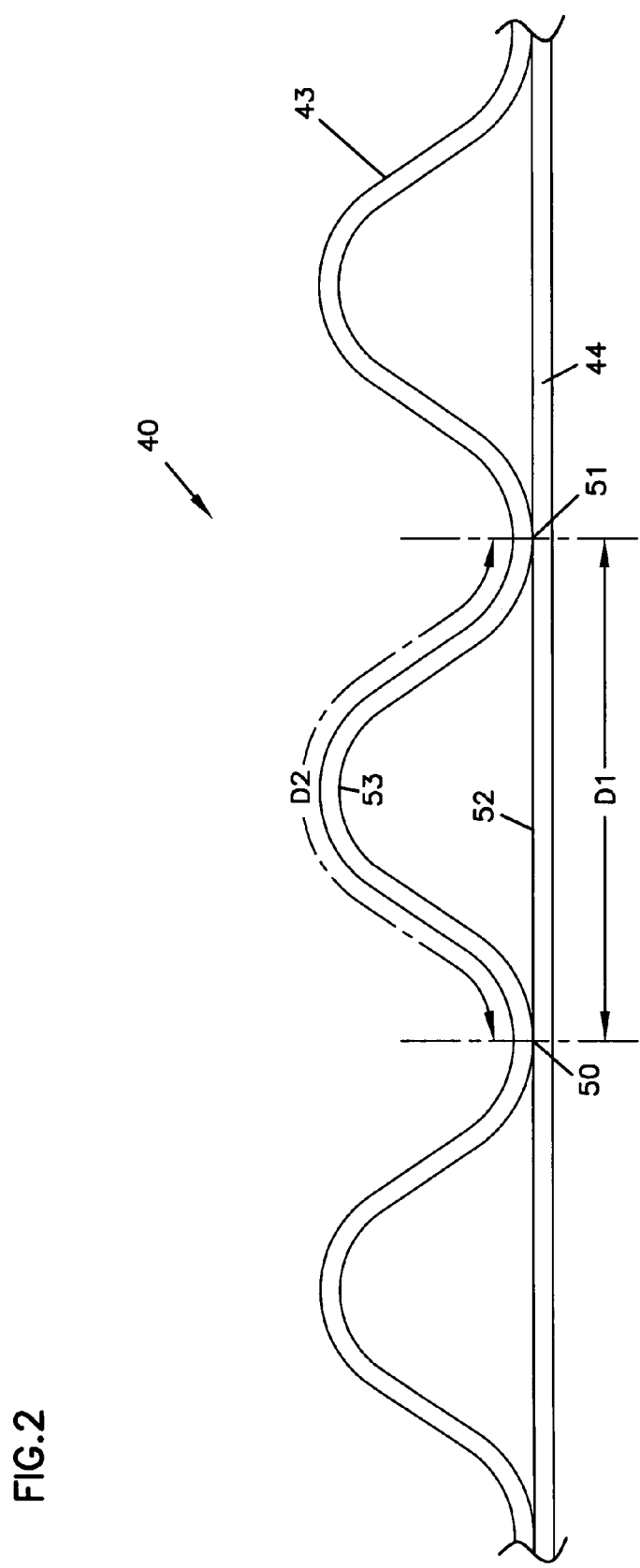
FIG. 2 is an enlarged schematic, cross-sectional view of a portion of the media depicted in FIG. 1.

Attention is now directed to FIG. 2, in which a z-filter media construction 40 utilizing a fluted (in this instance regular, curved, wave pattern corrugated) sheet 43, and a non-corrugated flat, facing, sheet 44, is depicted. The distance D1, between points 50 and 51, defines the extension of flat media 44 in region 52 underneath a given corrugated flute 53. The length D2 of the arcuate media for the corrugated flute 53, over the same distance D1 is of course larger than D1, due to the shape of the corrugated flute 53. For a typical regular shaped media used in fluted filter applications, the linear length D2 of the media 53 between points 50 and 51 will generally be at least 1.2 times D1. Typically, D2 would be within a range of 1.2-2.0, inclusive. One particularly convenient arrangement for air filters has a configuration in which D2 is about 1.25–1.35×D1. Such media has, for example, been used commercially in Donaldson Powercore™ Z-filter arrangements. Herein the ratio D2/D1 will sometimes be characterized as the flute/flat ratio or media draw for the corrugated media.

Figure 3:
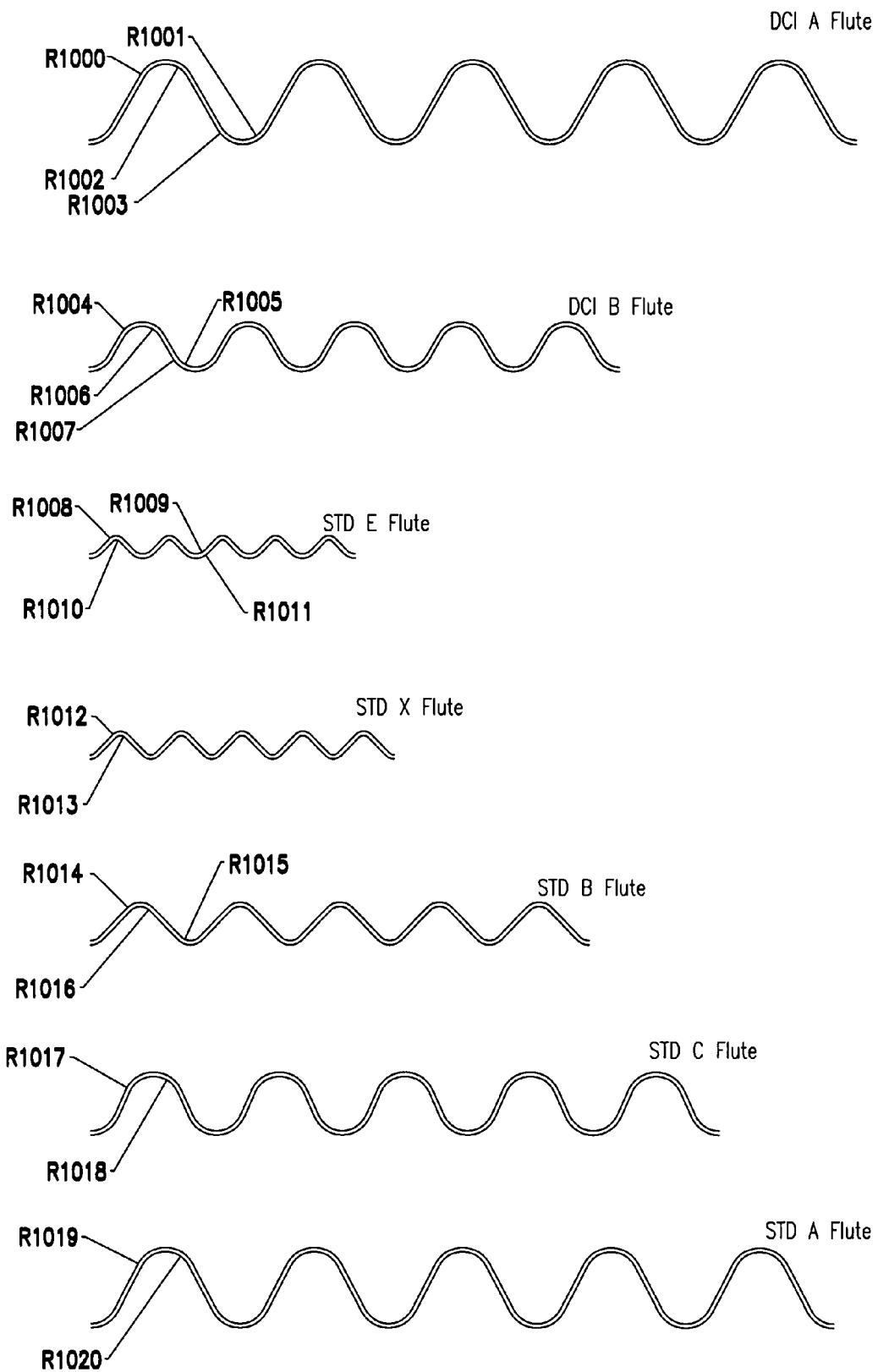
FIG. 3 is a schematic view of examples of various corrugated media definitions.

In the corrugated cardboard industry, various standard flutes have been defined. For example the standard E flute, standard X flute, standard B flute, standard C flute and standard A flute. FIG. 3, attached, in combination with Table A below provides definitions of these flutes.

Donaldson Company, Inc., (DCI) the assignee of the present disclosure, has used variations of the standard A and standard B flutes, in a variety of z-filter arrangements. These flutes are also defined in Table A and FIG. 3.

TABLE A (Flute definitions for FIG. 3)

| | |
|---|---|
| DCI A Flute: | Flute/flat = 1.52:1; The Radii (R) are as follows: R1000 = .0675 inch (1.715 mm); R1001 = .0581 inch (1.476 mm); R1002 = .0575 inch (1.461 mm); R1003 = .0681 inch (1.730 mm); |
| DCI B Flute: | Flute/flat = 1.32:1; The Radii (R) are as follows: R1004 = .0600 inch (1.524 mm); R1005 = .0520 inch (1.321 mm); R1006 = .0500 inch (1.270 mm); R1007 = .0620 inch (1.575 mm); |
| Std. E Flute: | Flute/flat = 1.24:1; The Radii (R) are as follows: R1008 = .0200 inch (.508 mm); R1009 = .0300 inch (.762 mm); R1010 = .0100 inch (.254 mm); R1011 = .0400 inch (1.016 mm); |
| Std. X Flute: | Flute/flat = 1.29:1; The Radii (R) are as follows: R1012 = .0250 inch (.635 mm); R1013 = .0150 inch (.381 mm); |
| Std. B Flute: | Flute/flat = 1.29:1; The Radii (R) are as follows: R1014 = .0410 inch (1.041 mm); R1015 = .0310 inch (.7874 mm); R1016 = .0310 inch (.7874 mm); |
| Std. C Flute: | Flute/flat = 1.46:1; The Radii (R) are as follows: R1017 = .0720 inch (1.829 mm); R1018 = .0620 inch (1.575 mm); |
| Std. A Flute: | Flute/flat = 1.53:1; The Radii (R) are as follows: R1019 = .0720 inch (1.829 mm); R1020 = .0620 inch (1.575 mm). |

Of course other, standard, flute definitions from the corrugated box industry are known.

In general, standard flute configurations from the corrugated box industry can be used to define corrugation shapes or approximate corrugation shapes for corrugated media. Comparisons above between the DCI A flute and DCI B flute, and the corrugation industry standard A and standard B flutes, indicate some convenient variations.

II. Manufacture of Coiled Media Configurations Using Fluted Media, Generally

Figure 4:
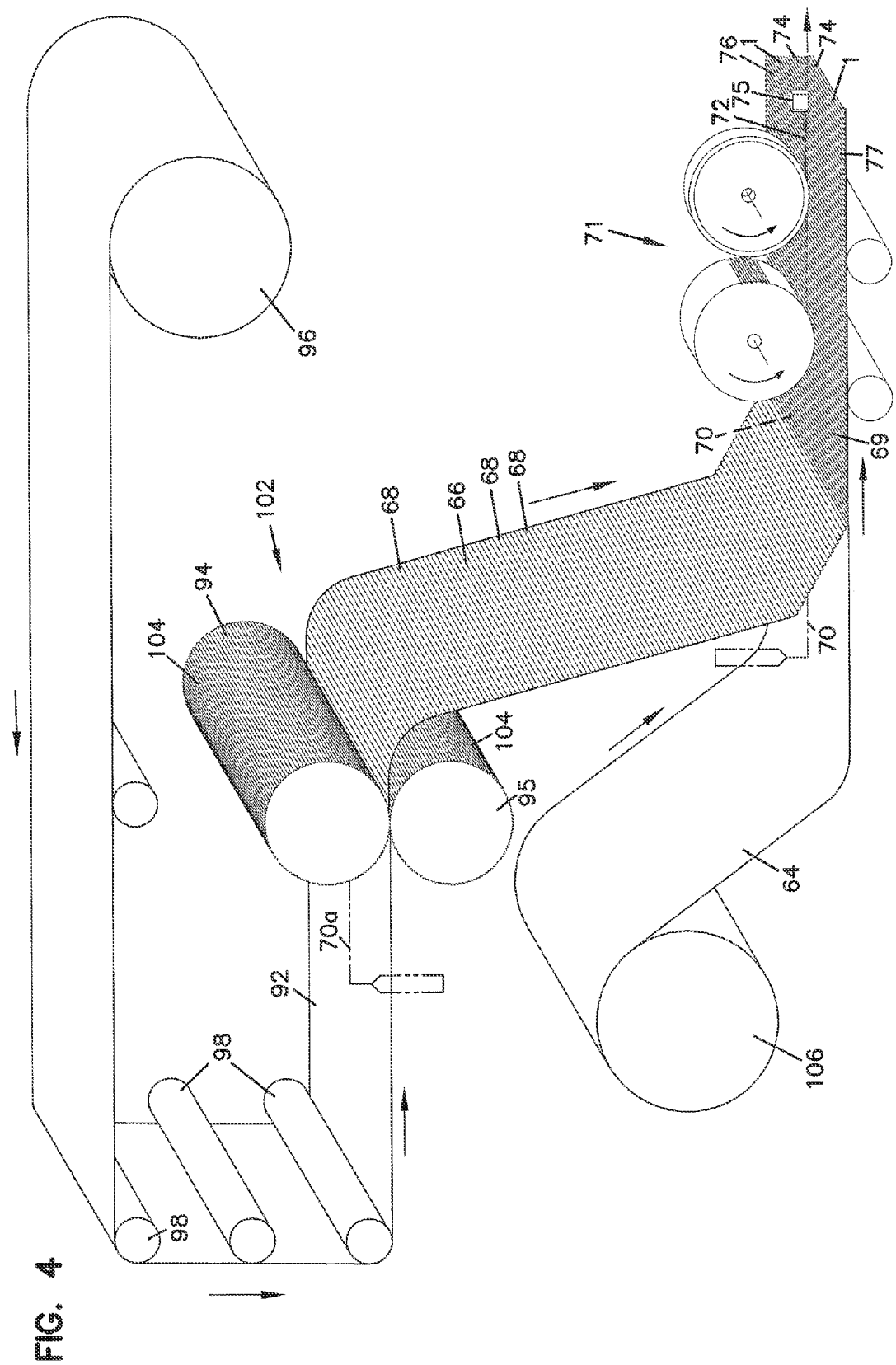
FIG. 4 is a schematic view of a useable process for manufacturing example media according to FIG. 1.

In FIG. 4, one example of a manufacturing process for making a media strip corresponding to strip 1, FIG. 1 is shown. In general, facing sheet 64 and the fluted (corrugated) sheet 66 having flutes are brought together to form a media web 69, with an adhesive bead located therebetween at 70. The adhesive bead 70 will form a single facer bead 10, FIG. 1. An optional darting process occurs at station 71 to form center darted section 72 located mid-web. The z-filter media or Z-media strip 74 can be cut or slit at 75 along the bead 70 to create two pieces 76, 77 of z-filter media 74, each of which has an edge with a strip of sealant (single facer bead) extending between the corrugating and facing sheet. Of course, if the optional darting process is used, the edge with a strip of sealant (single facer bead) would also have a set of flutes darted at this location.

Techniques for conducting a process as characterized with respect to FIG. 4 are described in PCT WO 04/007054, published Jan. 22, 2004 incorporated herein by reference.

Still in reference to FIG. 4, before the z-filter media 74 is put through the darting station 71 and eventually slit at 75, it must be formed. In the schematic shown in FIG. 4, this is done by passing a sheet of media 92 through a pair of corrugation rollers 94, 95. In the schematic shown in FIG. 4, the sheet of media 92 is unrolled from a roll 96, wound around tension rollers 98, and then passed through a nip or bite 102 between the corrugation rollers 94, 95. The corrugation rollers 94, 95 have teeth 104 that will give the general desired shape of the corrugations after the flat sheet 92 passes through the nip 102. After passing through the nip 102, the sheet 92 becomes corrugated across the machine direction and is referenced at 66 as the corrugated sheet. The corrugated sheet 66 is then secured to facing sheet 64. (The corrugation process may involve heating the media, in some instances.)

Still in reference to FIG. 4, the process also shows the facing sheet 64 being routed to the darting process station 71. The facing sheet 64 is depicted as being stored on a roll 106 and then directed to the corrugated sheet 66 to form the Z-media 74. The corrugated sheet 66 and the facing sheet 64 would typically be secured together by adhesive or by other means (for example by sonic welding).

Referring to FIG. 4, an adhesive line 70 is shown used, to secure corrugated sheet 66 and facing sheet 64 together, as the sealant bead. Alternatively, the sealant bead for forming the facing bead could be applied as shown as 70a. If the sealant is applied at 70a, it may be desirable to put a gap in the corrugation roller 95, and possibly in both corrugation rollers 94, 95, to accommodate the bead 70a.

Of course the equipment of FIG. 4 can be modified to provide for the tack beads 20, if desired.

The type of corrugation provided to the corrugated media is a matter of choice, and will be dictated by the corrugation or corrugation teeth of the corrugation rollers 94, 95. One useful corrugation pattern will be a regular curved wave pattern corrugation, of straight flutes, as defined herein above. A typical regular curved wave pattern used, would be one in which the distance D2, as defined above, in a corrugated pattern is at least 1.2 times the distance D1 as defined above. In example applications, typically D2=1.25–1.35×D1, although alternatives are possible. In some instances the techniques may be applied with curved wave patterns that are not "regular," including, for example, ones that do not use straight flutes. Also, variations from the curved wave patterns shown, are possible.

Figure 5:
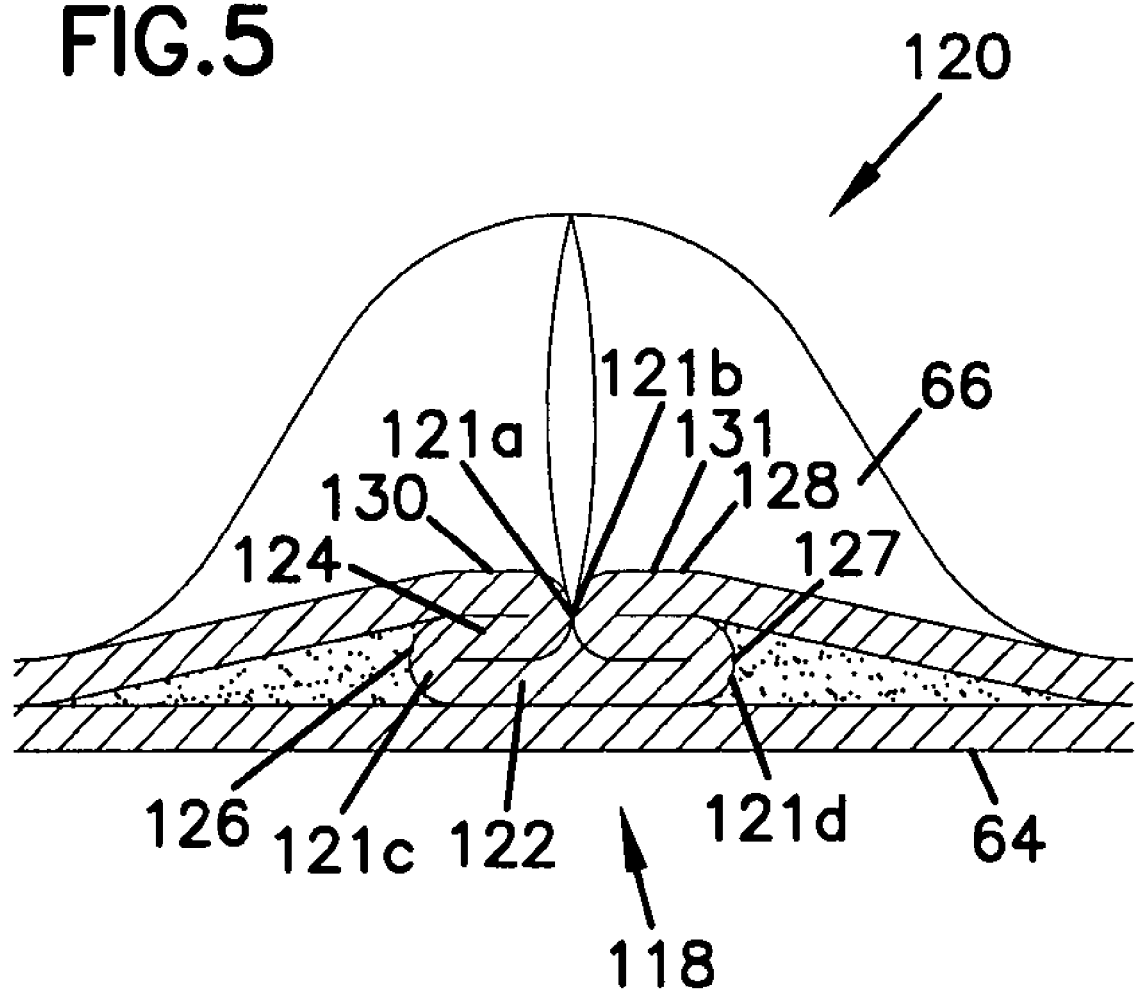
FIG. 5 is an enlarged schematic cross-sectional view of an optional end dart for example media flutes useable in arrangements according to the present disclosure.

As described, the process shown in FIG. 4 can be used to create the center darted section 72. FIG. 5 shows, in cross-section, one of the flutes after darting and slitting.

A fold arrangement 118 can be seen to form a darted flute 120 with four creases 121a, 121b, 121c, 121d. The fold arrangement 118 includes a flat first layer or portion 122 that is secured to the facing sheet 64. A second layer or portion 124 is shown pressed against the first layer or portion 122. The second layer or portion 124 is preferably formed from folding opposite outer ends 126, 127 of the first layer or portion 122.

Still referring to FIG. 5, two of the folds or creases 121a, 121b will generally be referred to herein as "upper, inwardly directed" folds or creases. The term "upper" in this context is meant to indicate that the creases lie on an upper portion of the entire fold 120, when the fold 120 is viewed in the orientation of FIG. 5. The term "inwardly directed" is meant to refer to the fact that the fold line or crease line of each crease 121a, 121b, is directed toward the other.

In FIG. 5, creases 121c, 121d, will generally be referred to herein as "lower, outwardly directed" creases. The term "lower" in this context refers to the fact that the creases 121c, 121d are not located on the top as are creases 121a, 121b, in the orientation of FIG. 5. The term "outwardly directed" is meant to indicate that the fold lines of the creases 121c, 121d are directed away from one another.

The terms "upper" and "lower" as used in this context are meant specifically to refer to the fold 120, when viewed from the orientation of FIG. 5. That is, they are not meant to be otherwise indicative of direction when the fold 120 is oriented in an actual product for use.

Based upon these characterizations and review of FIG. 5, it can be seen that a preferred regular fold arrangement 118 according to FIG. 5 in this disclosure is one which includes at least two "upper, inwardly directed, creases." These inwardly directed creases are unique and help provide an overall arrangement in which the folding does not cause a significant encroachment on adjacent flutes.

A third layer or portion 128 can also be seen pressed against the second layer or portion 124. The third layer or portion 128 is formed by folding from opposite inner ends 130, 131 of the third layer 128.

Another way of viewing the fold arrangement 118 is in reference to the geometry of alternating ridges and troughs of the corrugated sheet 66. The first layer or portion 122 is formed from an inverted ridge. The second layer or portion 124 corresponds to a double peak (after inverting the ridge) that is folded toward, and in preferred arrangements, folded against the inverted ridge.

Useable techniques for providing the optional dart described in connection with FIG. 5 are described in PCT WO 04/007054, incorporated herein by reference. Techniques for coiling the media, with application of the winding bead, are described in PCT application US 04/07927, filed Mar. 17, 2004 and incorporated herein by reference.

Techniques described herein are particularly well adapted for use in media packs that result from coiling a single sheet comprising a corrugated sheet/facing sheet combination, i.e., a "single facer" strip. Certain of the techniques can be applied with arrangements that, instead of being formed by coiling, are formed from a plurality of strips of single facer.

Coiled media pack arrangements can be provided with a variety of peripheral perimeter definitions. In this context the term "peripheral, perimeter definition" and variants thereof, is meant to refer to the outside perimeter shape defined, looking at either the inlet end or the outlet end of the media pack. Typical shapes are circular as described in PCT WO 04/007054 and PCT application US 04/07927. Other useable shapes are obround, some examples of obround being oval shape. In general oval shapes have opposite curved side ends attached by a pair of opposite sides. In some oval shapes, the opposite sides are also curved. In other oval shapes, sometimes called racetrack shapes, the opposite sides are generally straight. Racetrack shapes are described for example in PCT WO 04/007054 and PCT application US 04/07927.

Another way of describing the peripheral or perimeter shape is by defining the perimeter resulting from taking a cross-section through the media pack in a direction orthogonal to the winding access of the coil.

Opposite flow ends or flow faces of the media pack can be provided with a variety of different definitions. In many arrangements, the ends are generally flat and perpendicular to one another. In other arrangements, the end faces include tapered, coiled, stepped portions which can either be defined to project axially outwardly from an axial end of the side wall of the media pack; or, to project axially inwardly from an end of the side wall of the media pack.

The flute seals (for example from the single facer bead, winding bead or stacking bead) can be formed from a variety of materials. In various ones of the cited and incorporated references, hot melt or polyurethane seals are described as possible for various applications.

III. An Example Improved Air Cleaner Arrangement Utilizing Z-Filter Media, FIGS. 6-19

A. General Air Cleaner Features.

Figure 14:
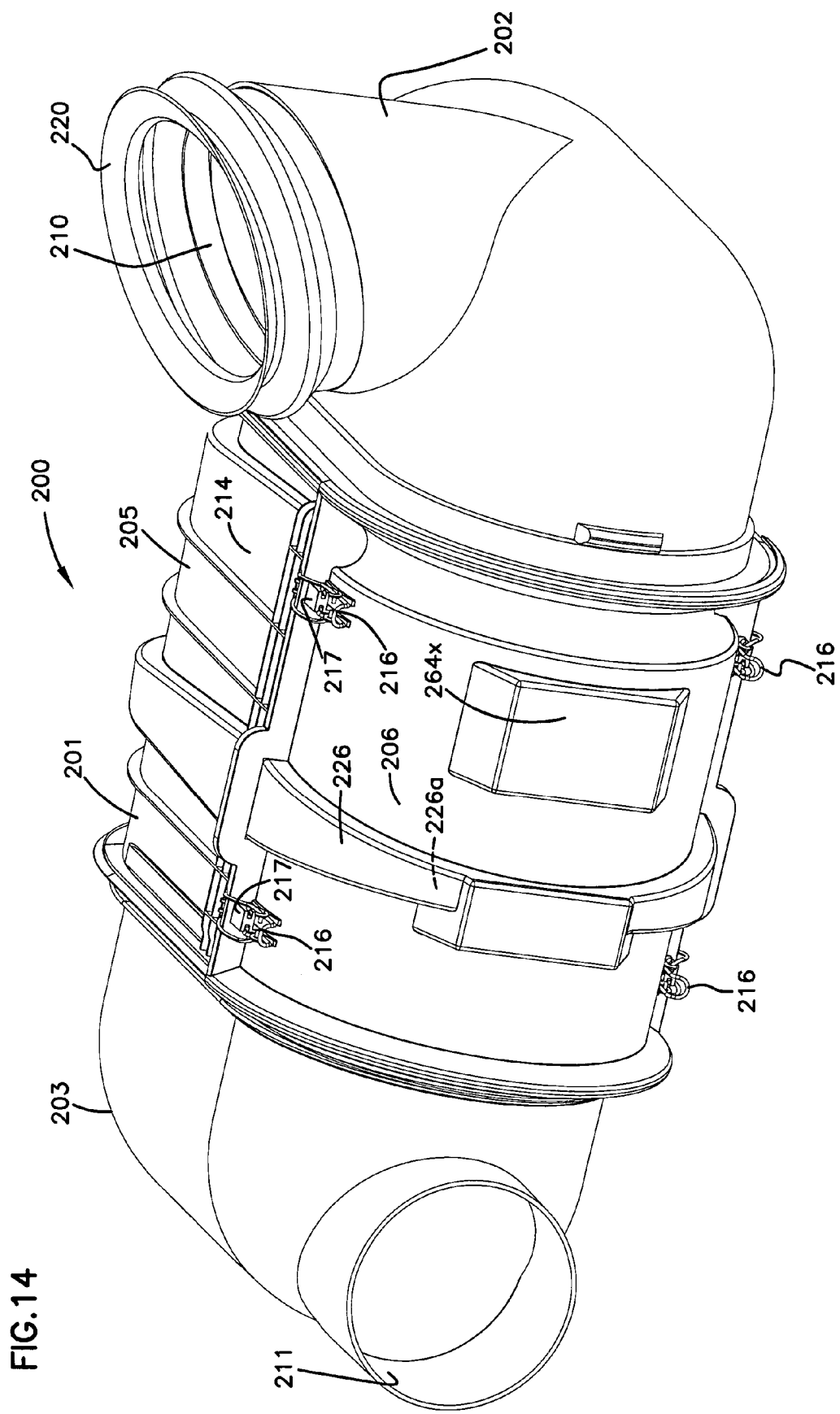
FIG. 14 is a schematic perspective view of an air cleaner arrangement for use with a filter cartridge according to FIGS. 6 and 11-13.

The reference numeral 200, FIG. 14, generally depicts an air cleaner according to the present disclosure. The air cleaner 200 comprises a housing 201 having an inlet (end) section 202, an outlet (end) section 203 and a central region 205 positioned therebetween. The central region 205 includes a removable, side, access cover 206.

In general, the central region 205 defines an installation and receiving space for a serviceable primary air filter cartridge or cartridge arrangement; i.e., the primary filter cartridge is removable and replaceable. During air cleaner use, air to be filtered: (a) enters the air cleaner 200 through inlet arrangement 210 in inlet section 202; (b) is directed through a primary filter cartridge received within central region 205; and, then, (c) the resulting filtered air is passed into outlet section 203, from which it passes through outlet arrangement 211 and, for example, into appropriate ductwork for direction into an engine combustion air intake or elsewhere as needed.

The particular air cleaner 200 depicted, would typically be manufactured in modular pieces comprising: the inlet section 202; the outlet section 203; and, the central section 205, comprising base 214 and separable access cover 206. In a typical approach, the parts 202, 203, 206 and 214 can be molded from plastic utilizing a variety of molding techniques. However, alternate materials and approaches to construction can be used with the principles described herein.

Herein the base 214 will sometimes be referred to as a "primary filter cartridge receiving section." The term "primary filter cartridge" in this context, is meant to refer to a serviceable filter cartridge including z-filter media, for example in accord with the general descriptions above, positioned within housing 201 (in an installed or installation position) during use. The term "primary filter cartridge" is not meant to include within its scope, any separate safety filters that may be positioned within the housing 201. The term "primary filter cartridge receiving section" is meant to refer to the portion of base 214, into which the primary filter cartridge is inserted during installation. It is noted that in some instances: portions of the primary filter cartridge, during installation, i.e., when in the installed position, can project out of the primary filter cartridge receiving section 214, for example into cover 206; and portions of a seal arrangement on the primary filter cartridge may, in some instances, project into the outlet section 203.

As a result of the modular construction, the air cleaner 200 of FIG. 14 can be provided with a variety of options including, for example: mounting of a modified outlet section 203 for example configured such that outlet arrangement 211 is a tube that points in an opposite direction from that shown in FIG. 14; and, replacement of inlet section 202 with an alternate inlet section modified, for example, to receive air flow from an alternate direction and/or to have a different inlet configuration. Some examples of these possibilities are discussed in U.S. Provisional 60/760,559 filed Jan. 20, 2006.

In a typical arrangement, once the modular housing assembly 201 is created, the inlet section 202 and outlet section 203 would not be removed from the base 214. Thus, typically these components will be provided with an interference fit or be sonically welded or otherwise secured together.

The access cover 206 is configured to removable from a remainder of housing 201, for side (not end) service access to an interior of the housing 201. In the example shown, the access cover 206 is secured in place by over center latches 216. Such latches 216 would typically be manufactured from metal wire and then would be mounted on latch mounts 217 molded into the access cover 206.

Still referring to FIG. 14, it is noted that for the particular air cleaner 200 depicted, inlet 210 is provided with a flexible bellows 220. The bellows 220 is an option, and is configured to be engaged by a hood of a vehicle, such as a truck, being closed over the air cleaner 200, such that an inlet duct arrangement built into the hood engages the bellows 220 for directing air to inlet 210. An example is shown schematically in U.S. Provisional 60/760,559, incorporated herein by reference.

The air cleaner 200 depicted in FIG. 14, is depicted in an orientation it would typically have when installed, typically on top of an engine block and under the hood of a truck although alternate uses are possible. Also, although alternatives are possible, in the exemplified use, cover 206 would be removable laterally from a side of housing 201, instead of being lifted upwardly when removed.

Figure 15:
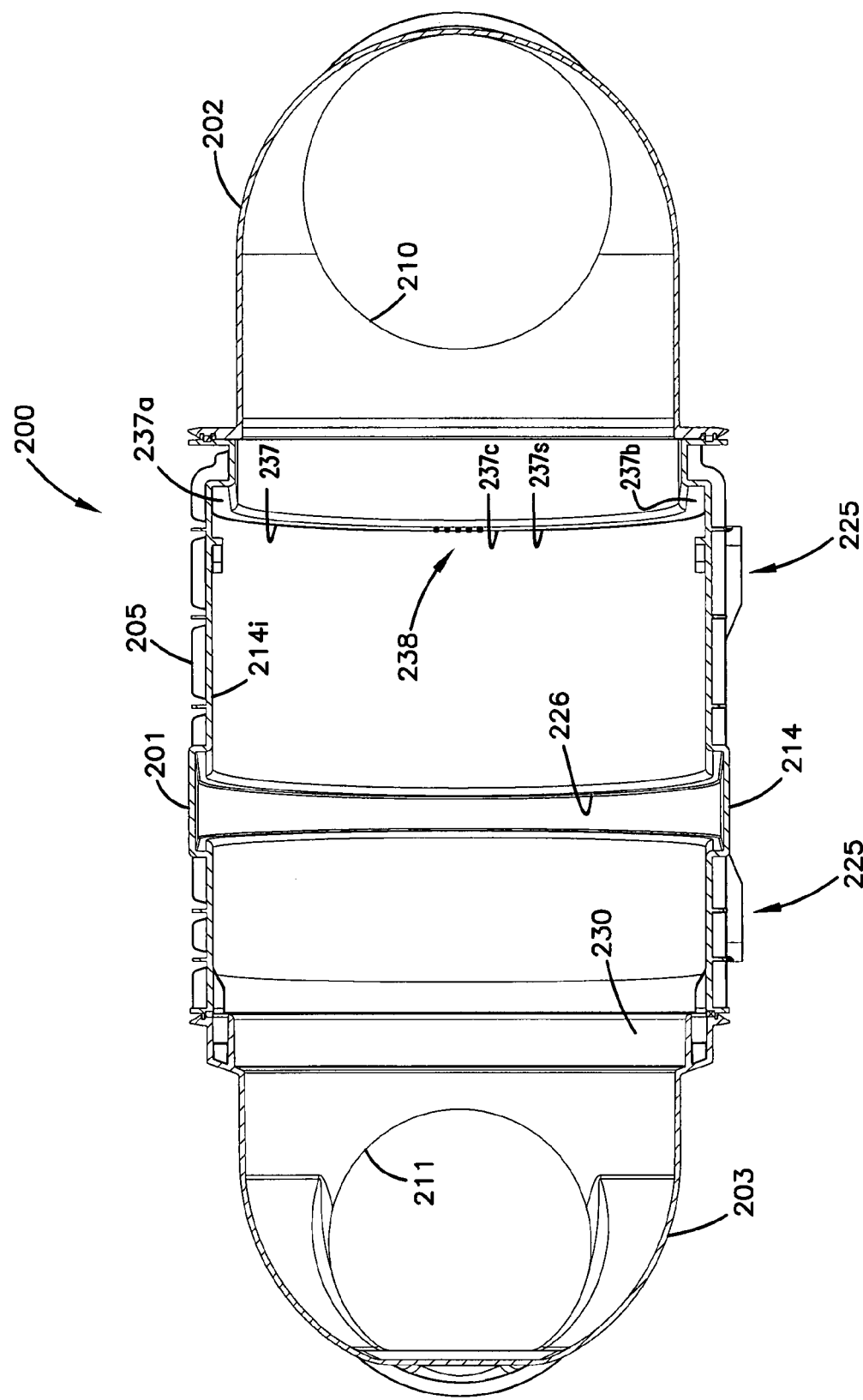
FIG. 15 is a schematic side cross-sectional view of an air cleaner generally in accord with FIG. 14; the air cleaner of FIG. 15 having modified inlet and outlet sections and an access cover removed.

Attention is now directed to FIG. 15. In FIG. 15 air cleaner 200 is depicted in a side cross-sectional view and with an internally mounted (installed) filter cartridge removed; the view being toward where a removed access cover 206 would otherwise be positioned. It is noted that in FIG. 15 the outlet section 203 is depicted mounted rotated 180° relative to FIG. 14, such that the outlet arrangement 211 points away from the viewer. This is indicative of certain options provided by the modular construction.

Also referring to FIG. 15, it is noted that inlet section 202 is modified from that shown in FIG. 14, in that the inlet section 202 is provided with a side inlet arrangement 210, in the example shown directed away from the viewer. This too is indicative of certain options provided by the modular construction.

Referring still to FIG. 15, at 225 mounting legs or pads of a mounting arrangement are provided, for securing the air cleaner 200 in position on or within equipment such as a vehicle. It is noted that a mounting arrangement can be provided at various locations on the housing 201, to allow for alternate orientations of the mounting of the air cleaner 200. The mounting pads 225 will typically be positioned on base 214 (FIG. 14) of central section 205, for convenience and modular assembly.

For the example shown, the mounting pads 225 are directed at an angle of about 90° from a direction of removal of cover 206, FIG. 14, although alternatives are possible. This example, then, is consistent with a depicted orientation of FIG. 14, in which the cover 206 is removed laterally from the air cleaner housing 201, as opposed to being lifted directly upwardly, during servicing. Alternative orientations of mounting can be used with principles described herein, however.

Air cleaners with features in accord with the descriptions herein can be manufactured in a variety of sizes, for use with a variety of equipment. For the example of FIG. 14, the air cleaners could, for example, be used with mobile equipment such as trucks, and could be installed under a hood arrangement of the trucks.

Referring to FIG. 15, the air cleaner housing 201 is configured specifically to accept more than one size of primary filter cartridge, securely, as alternatives. That is, for example, the air cleaner housing 201 can be used with a first primary filter cartridge of a first axial length, or it can alternatively be used with a second primary filter cartridge of a second, different, axial length. Examples of this are described in U.S. Provisional 60/760,559 and in related Provisional Application 60/815,794 filed Jun. 22, 2006. Configurations that allow for this, provide for a wide variety of options in the use of the air cleaner 200. In particular, the same air cleaner housing 201 can be used with a variety of different specific vehicles, depending on the vehicle engine size and air cleaner demands, by modifying the installed filter cartridge without modifying the air cleaner housing itself. Also the same vehicle can be provided with different primary filter cartridge configurations, depending on the environment of use (for example: city; over-the-highway; and, off-road).

Although the air cleaner housing 201 is configured to specifically accept more than one size primary filter cartridge, features of particular interest herein relate to stabilization when a relatively long filter cartridge is used. Thus, detailed description of features relating to the installation of a (relatively) shorter filter cartridge are not described here. In general, it is simply stated herein that housing base 214 includes a guide arrangement 226 therein, for mounting a relatively shorter filter cartridge. Such a guide arrangement 226 is provided with a companion receiver 226a in cover 206, FIG. 14. Analogous features, and operation of them, is described in U.S. Provisional Application 60/760,559 and in related Provisional Application 60/815,794, filed Jun. 22, 2006.

Herein the term "axial length" when used in connection with a primary filter cartridge, is meant to refer to a direction of extension generally between, or generally parallel with, a direction between inlet and outlet flow faces. A total overall axial filter cartridge, of course, would be measured including axial projection of any structures positioned on the media pack projecting axially outwardly therefrom. The total axial length of the media pack, would typically only refer to a maximum distance between the inlet flow face and the opposite outlet flow face.

Referring to FIG. 15, although alternatives are possible, the particular air cleaner 200 depicted, is configured for utilization with a primary filter cartridge that has a housing seal member that seals in place using an outwardly directed radial seal. Examples of this type of seal are described in U.S. Pat. Nos. 6,190,432; 6,350,291; 6,610,117; and 6,783,565 and US Publication 2005/0166561, published Aug. 4, 2005. Other examples of this type of seal are described in US Publications 2006/0090434; US 2006/0090431; US 2006/0091064; and US 2006/0091061; each of these publications to Baldwin Filters, Inc., indicating seal arrangements that can be adapted for use with principles according to the present disclosure.

In the previous paragraph reference was made to the housing seal member sealing in place using an "outwardly directed radial seal." The term "radial" in this context, is generally meant to refer to a direction generally perpendicular to an axial direction of extension (flute or air flow direction) of a media pack or filter cartridge. The term "outwardly" in this context, is meant to refer to a direction radially outwardly from a center longitudinal axis of the media pack.

Referring to FIG. 15, it is again noted that interior 214i of base 214 is configured with multiple (in this instance two) biasing tracks therein, to accommodate two different sized elements. A first biasing track is indicated generally at 226 and a second at 237. As indicated above, operation of the first biasing track 226 is not described in detail herein, since features described herein generally do not specifically relate to its use. With respect to its operation and use, reference is again made to U.S. Provisional Application 60/760,559 and related Provisional Application 60/815,794, filed Jun. 22, 2006.

Operation and use of the second biasing track 237 will also be understood from U.S. Provisional application 60/760,559 and related Provisional application 60/815,794, filed Jun. 22, 2006 and further from discussion below. In general, however, it is noted that the first biasing track 226 is positioned a different distance (referenced herein as Distance DX) from inlet section 202 (and also outlet section 203, than is the second biasing track 237 (referenced herein as Distance DY). That is, the two biasing tracks 226, 237 are spaced, axially, within the air cleaner housing 201, with biasing track 226 closer to the outlet section 203, and biasing track 237 positioned closer to the inlet section 202.

It is noted that many of the principles described herein, can be implemented in an air cleaner arrangement that does not include two biasing tracks, but rather only includes one or includes a different number from two.

Still referring to FIGS. 14 and 15, it is noted that the air cleaner housing 201 depicted, is generally configured for receipt of filter cartridges having exterior seal perimeter (peripheral) shapes that are generally oval (two narrowly curved ends with two opposite sides) and media packs that have an exterior perimeter (peripheral) shape that is generally oval (again two narrowly curved ends with two opposite sides). A typical oval arrangement would be a perimeter shape referred to herein as racetrack, in which the perimeter definition of both the seal and the media pack is to have opposite semi-circular curved ends with opposite, generally parallel, sides extending therebetween. This is shown and discussed below, with example primary filter cartridges. Of course certain of the principles described herein can be adopted for application with alternate configurations of primary filter cartridges and/ or seals, for example circular or alternate oval shapes in which not only are the two ends curved, but the opposite sides are also curved.

The second biasing track 237 is viewable in FIG. 15 as having generally u-shape with opposite sides 237a, 237b, and rounded center 237c. Again, it is noted that biasing track 237 is positioned axially closer to inlet section 202 than is track 226. Alternately stated, biasing track 226 is positioned closer to outlet section 203 than is biasing track 237. Referring to FIG. 15, in a bottom innermost portion of rounded center 237 are provided a plurality of projections 238, projecting toward outlet section 203. The projections 238 help for further biasing toward outlet section 203 of an installed cartridge, and thus maintenance of that cartridge in position. The projections 238 are typically each wedge or cam shaped, with projection more toward outlet section 203 in extension away from cover 206, i.e., away from the viewer in FIG. 15.

The second biasing track 237 generally defines a track surface 237s oriented directed axially toward outlet section 203 and away from outlet section 202. Surface 237s typically is planar, and is typically oriented in a plane not quite perpendicular to a flow direction between sections 202 and 203, but rather slanted slightly therefrom at a declination angle. For surface 237s, tips 237t, then, are generally oriented closer to section 202, than is a portion of surface 237s in center 237c.

In some instances a reference can be made to "direct distance". When the term "direct distance" is used in connection with tips 237t, the intent is to refer to the shortest distance between the tips 237t, not the distance that follows the u-shape of the corresponding biasing track 237.

As above noted, u-shaped biasing track 237 generally extends inwardly of section 214 at an acute angle tapering toward outlet section 203 from inlet section 202. Typically track 237 will extend at a declination angle of at least 0.5°, usually not more than 15°, typically within the range of 2° to 10°. The term "declination angle" as used in this context, is meant to refer to an acute angle between a plane defining the track 237 and a plane perpendicular to the general direction of air flow through air cleaner 200 from inlet 202 to outlet 203.

B. An Example First Primary Filter Cartridge and Installation.

Figure 6:
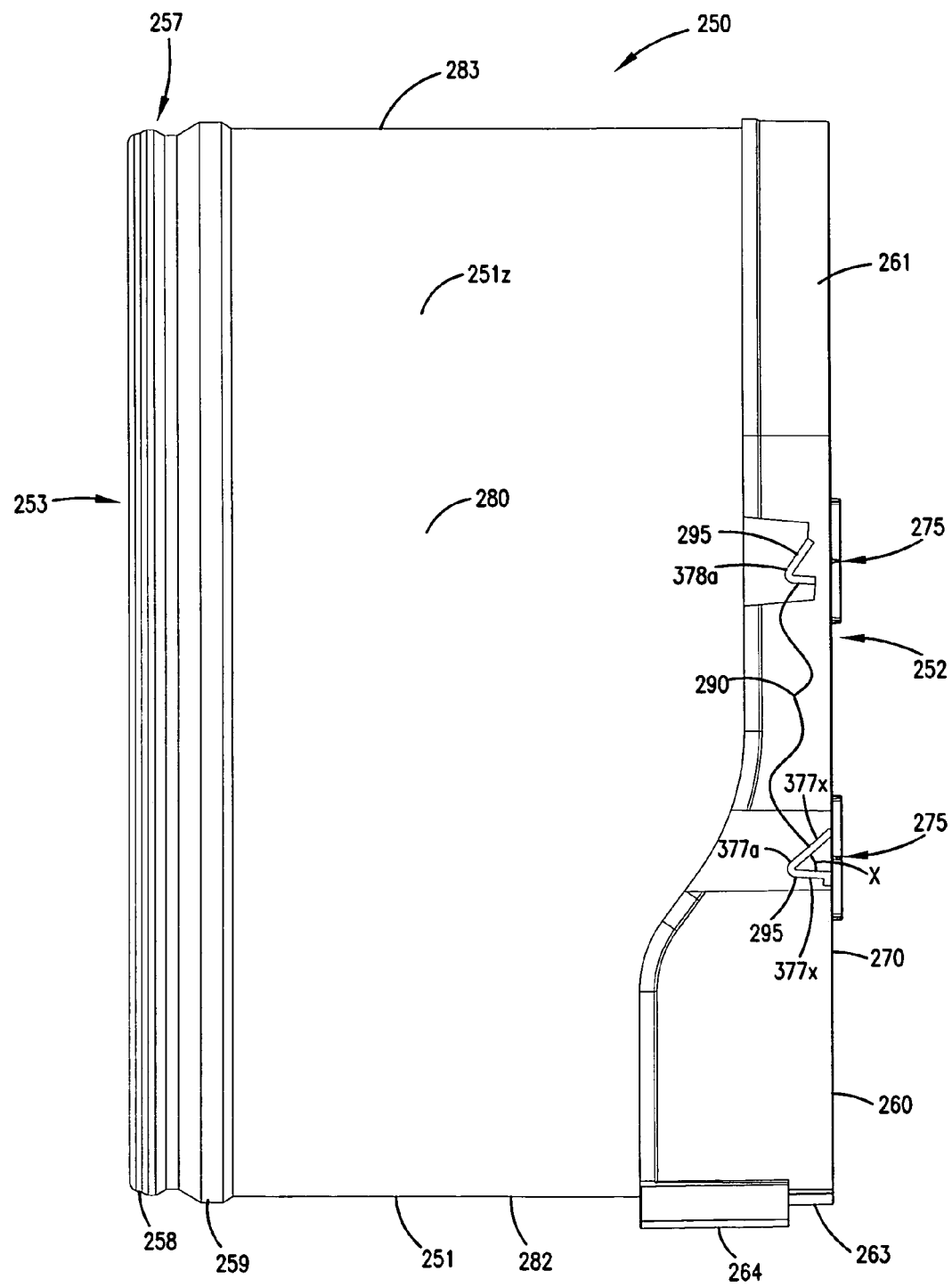
FIG. 6 is a schematic top plan view of a first filter cartridge configured for installation in an air cleaner according to the present disclosure.
Figure 11:
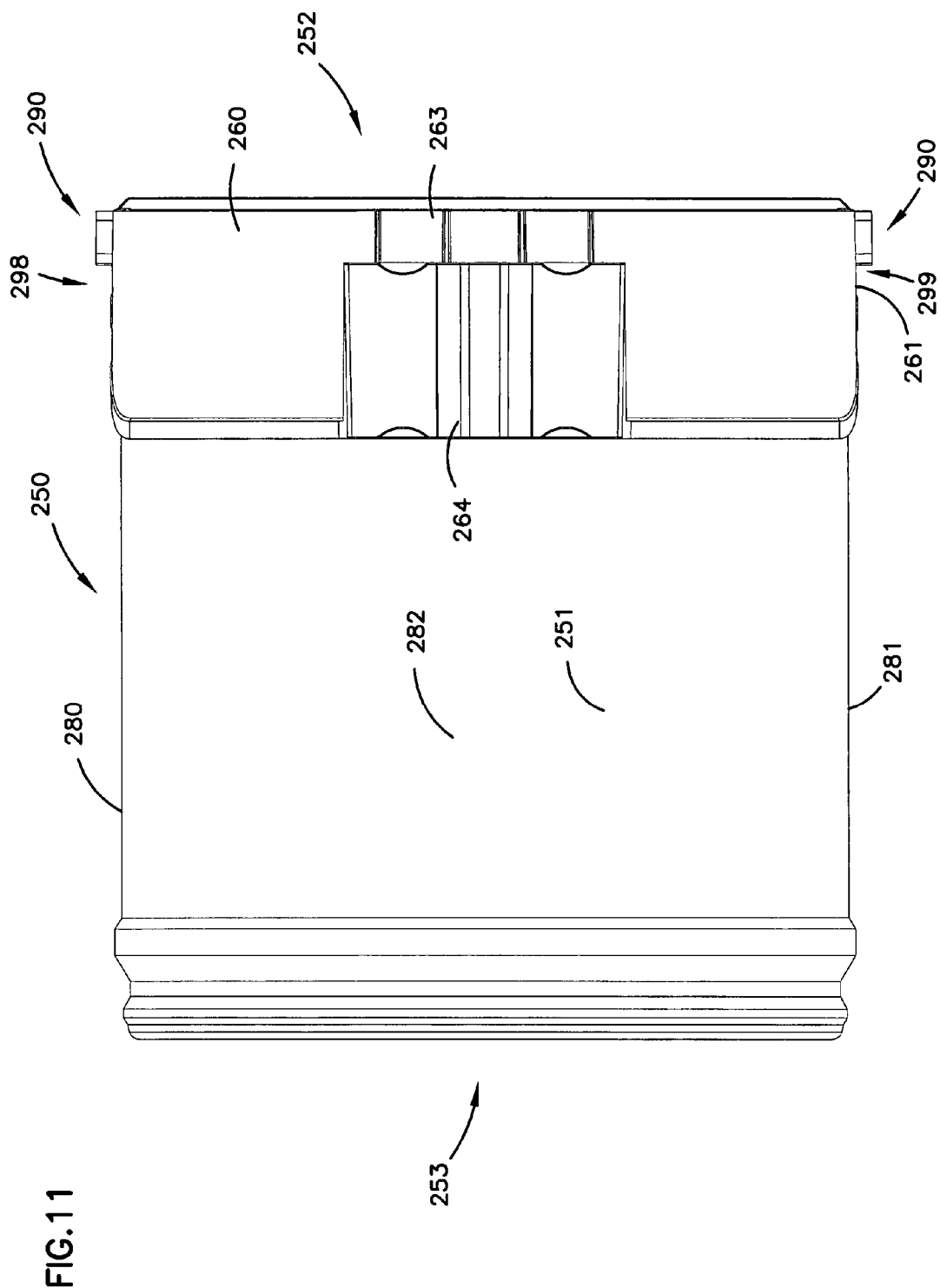
FIG. 11 is a schematic side elevational view of the filter cartridge of FIG. 6.

In FIGS. 6 and 11, a first primary filter cartridge 250 is depicted for installation in air cleaner 200. Specifically, primary filter cartridge 250 is configured to be installed in a position extending between a location contacting (or if not contacting adjacent) biasing track 237 (FIG. 15) with sealing at housing seal surface 230, FIG. 15. Thus, for the example shown in FIG. 15 the first filter cartridge 250 (FIG. 6) is sized as a maximum (axial) length (or nearly maximum length) cartridge that can be fit within interior 214a of housing base 214.

In FIG. 6 a top plan view of the filter cartridge 250 is depicted. The cartridge 250 is oriented as it would be during installation in the housing 201, with the observer looking down the filter cartridge 250.

The cartridge 250 comprises a media pack 251 having a first air flow (in the example inlet) face 252 and an opposite, second, air flow (in the example outlet) face 253.

The media pack 251 generally comprises z-filter media in accord with the descriptions provided above. As explained above, z-filter media can be provided in any of two forms: as a coiled arrangement of a single facer comprising a fluted (corrugated) media sheet secured to a facing media sheet; or, as a stack of strips of single facer each comprising a fluted (corrugated) media sheet secured to a facing media sheet. Either type of arrangement can be provided with the general techniques described herein. However, the assemblies depicted are specifically configured for use with coiled arrangements, and variations in shape and other detail would typically be used when a stacked media pack arrangement is to be used. Thus, the example media pack 251 depicted comprises a coiled z-filter media arrangement 251z, comprising a fluted (corrugated) media sheet secured to a facing media sheet, coiled with the facing sheet directed outwardly.

The media pack 251 is generally closed to flow of air therethrough, between inlet face 252 and outlet face 253, unless the air passes through a media sheet (fluted or facing) with filtering.

Adjacent outlet end face 253 is mounted housing seal arrangement 257. The housing seal arrangement 257 includes a housing sealing portion 258 and, in the example shown, an over mold portion 259. The housing seal arrangement 257 may be analogous to similar features described in US Publication 2005/0166561, published Aug. 4, 2005, incorporated herein by reference, although alternatives are possible. In general terms, the housing seal portion 258 is configured to form an outwardly directed radial seal with an annular housing seal surface 230 of a housing 201, into which cartridge 250 is positioned for use. Overmold portion 259 provides structure that attaches the housing seal arrangement 257 to the media pack 251; although alternate methods of attachment are possible. Typically the attachment is permanent. In a typical arrangement, housing sealing portion 258 is provided around a support or backup member, to facilitate sealing.

Mounted at inlet end 252 is frame member 260 comprising a band 261 circumscribing media pack 251 and secured thereto, for example with an adhesive. Band 261 includes end section 263 with handle member 264 mounted thereon, and projecting radially therefrom. The handle member 264 is typically sized to be received within handle receiver 264x in cover 206, FIG. 14, when cartridge 250 is installed. This is described in PCT Publication WO 05/107924, published Mar. 2, 2006.

Frame member 260 is generally configured such that no portion thereof extends toward face 253, from end face 252, a distance greater than 50% of the distance between the end faces 252, 253, and preferably no portion extends more than 35% of this distance.

Frame piece 260 further includes an end portion 270 which projects axially outwardly from the media pack 251 in a direction away from end 253, typically in overlap with face 252. End portion 270 provides an engagement member or arrangement for sliding engagement with a portion of a housing 201, if desired, during installation.

Frame piece 260 further includes cross brace or extension arrangement 275 extending there across, over face 252 for structural stability. A portion of arrangement 275 may, in some instances, also engage the housing in a slidable manner during installation.

In FIG. 6, a top plan view of cartridge 270 is provided, showing features viewable when looking down upon the cartridge 250 when it is oriented for installation with a housing oriented as shown in FIG. 14. A side of cartridge 250 opposite the view of side 280, not viewable, would typically have analogous features, as mirror images.

Figure 16:
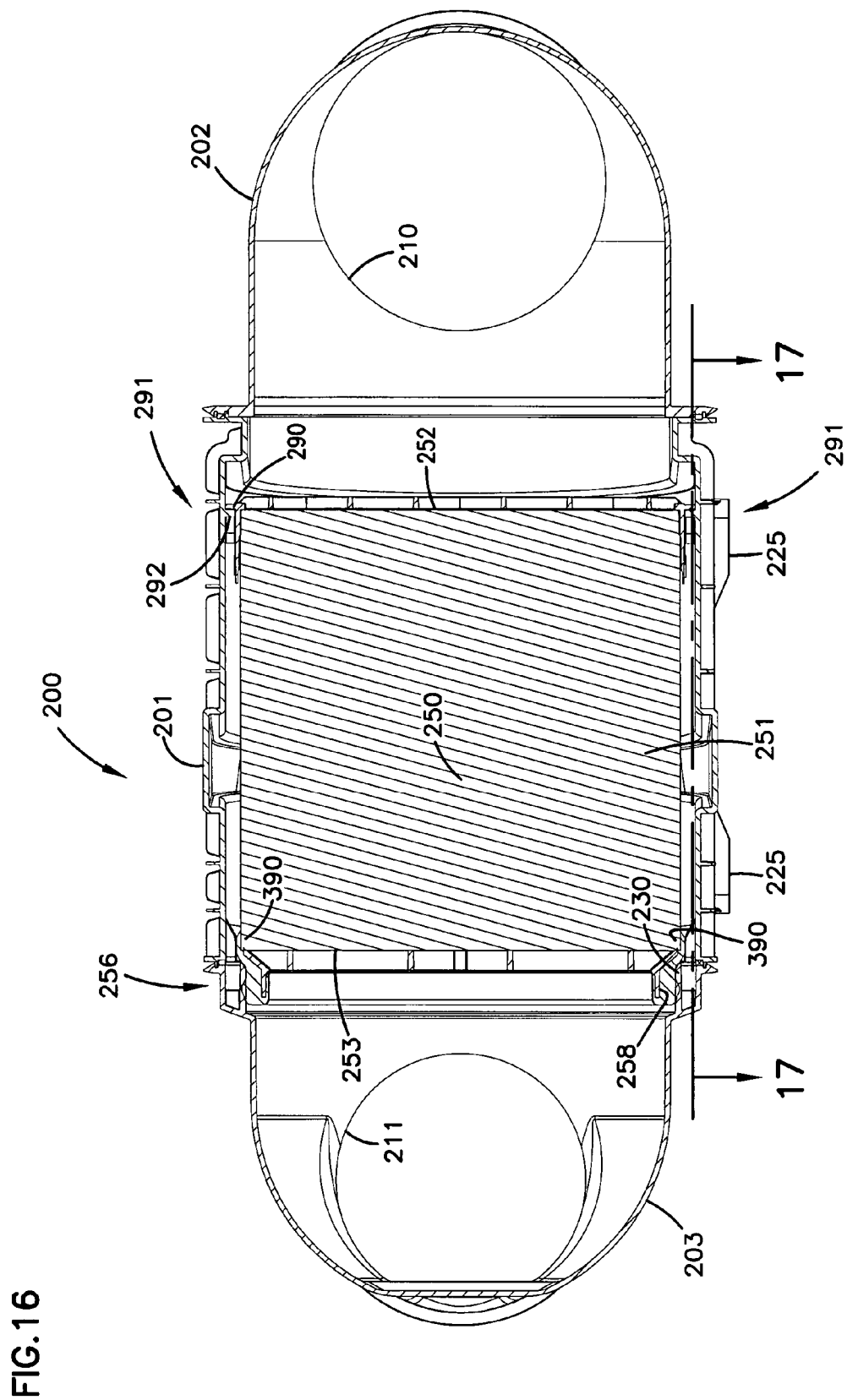
FIG. 16 is a schematic cross-sectional view of the air cleaner depicted in FIG. 15, showing a filter cartridge in accord with FIG. 6 installed.

Still referring to FIG. 6, cartridge 250 includes a first member 290 of a projection/receiver arrangement 291, FIG. 16. The first member 290 of the projection/receiver arrangement 291, is positioned on frame piece 260, typically as an integral part thereof. A second member 292, FIG. 16, would be positioned as part of an associated housing 200, as discussed below. For the example shown, the first member 290 of the projection receiver arrangement 291 comprises at least one, and in the example shown two, projection members 295. Further regarding the function operation of the projection members 295, and in particular as part of the projection/receiver arrangement 291 is discussed below, in part in connection with FIG. 17.

Attention is now directed to FIG. 11, a side elevational view of cartridge 250, taken toward a curved side end 282.

The cartridge 250 includes opposite sides 280, 281, and opposite curved side ends 282, 283 (FIG. 6). In a typical example, the oval shaped media pack 251 has a racetrack shape, with central portions of sides 280, 281 extending generally parallel to one another, and with curved ends 282, 283 being generally semicircular (circular) and opposite one another.

Referring to FIG. 11, frame member 260 is viewable with band 261 thereof. Handle member 264 on end section 263 is viewable. Although alternatives are possible, typically band 260 comprises a single integral molded (preform) plastic unit having the features characterized molded integral therewith. After formation, the band 260 would then be adhesively secured to a media pack 251 at the location indicated, i.e., over and around the (inlet) end 252.

Referring to FIG. 11, it is noted that for the example shown, opposite sides 280, 281 of the cartridge 250 each include a first member 290 of a projection receiver arrangement 291 thereon. In the particular example shown, opposite sides 298, 299 of the frame member 260 are generally identical, being oriented as mirror images of one another.

Figure 12:
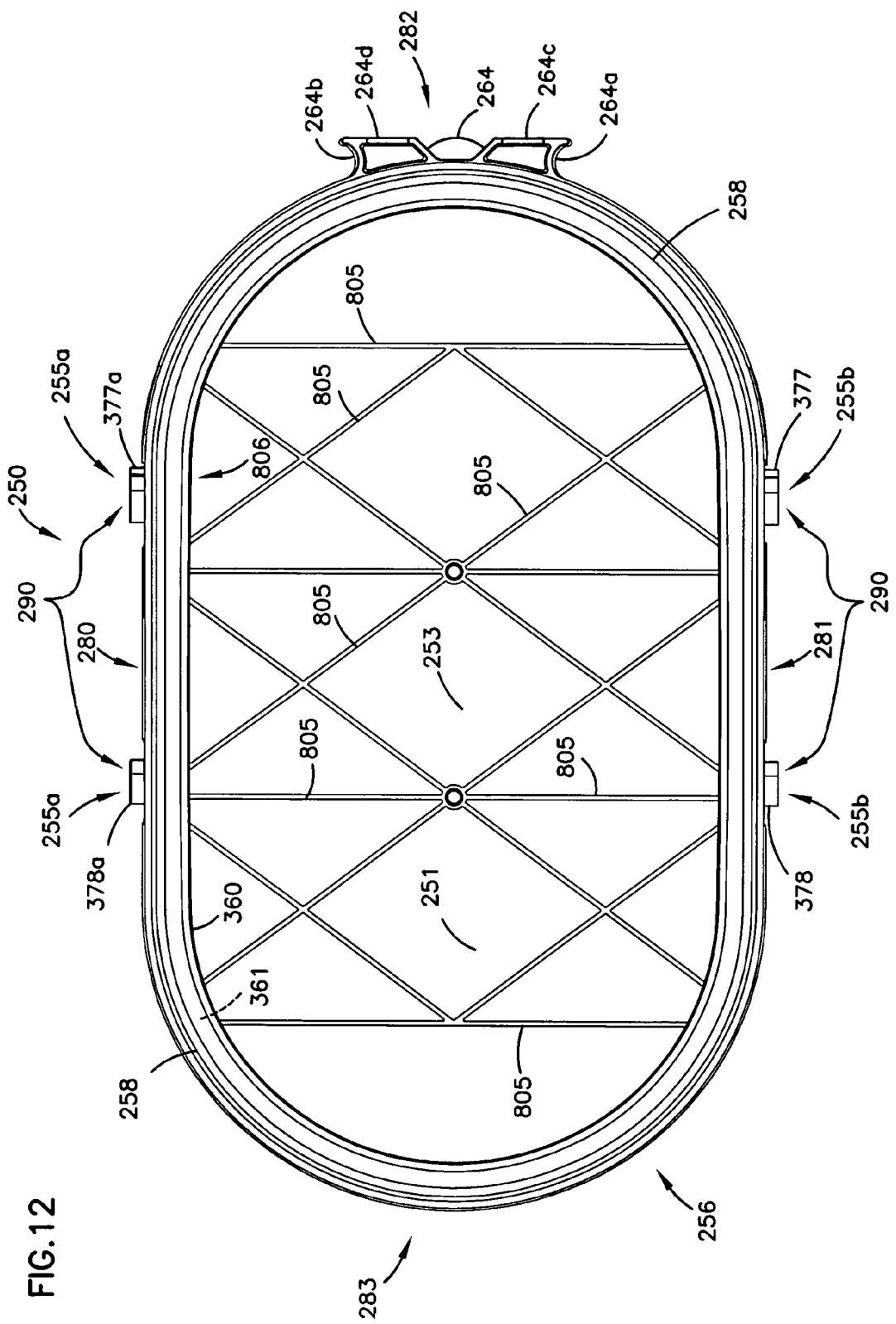
FIG. 12 is a schematic end elevational view of filter cartridge depicted in FIGS. 6 and 11.

In FIG. 12, a schematic end elevational view of cartridge 250 is depicted. In FIG. 12, the view is taken toward outlet end 253 of the media pack 251 and individual flow flutes and flute seals in the media pack 251 are not shown. Referring to FIG. 12, the general shape of media pack 251 is shown having: opposite sides 280, 281, with central sections generally parallel to one another; and, opposite semicircular curved side ends 282, 283, forming an oval (in this instance racetrack) shape. Extending across outlet end face 253, frame structure 805 is provided, as a grid work. The frame structure 805 can be formed integral with a support member 362 discussed below in connection with FIG. 19 that supports housing seal 258 during installation.

Handle member 264 is viewable in FIG. 12, comprising opposite finger receivers 264a, 264b, underneath outer cover members 264c and 264d respectively. The handle member 264 is sized for receipt within receiver 264x, FIG. 4, when cartridge 250 is installed.

Still referring to FIG. 12, for the example shown each of opposite sides 280, 281 of the cartridge 250 includes identical, oppositely mounted, first members 290 of projection/receiver arrangements 291. For the example shown, cartridge 250 includes: projection member arrangement 295a on one side 290 of the media pack 700; and, projection member arrangement 295b on opposite side 281.

Figure 13:
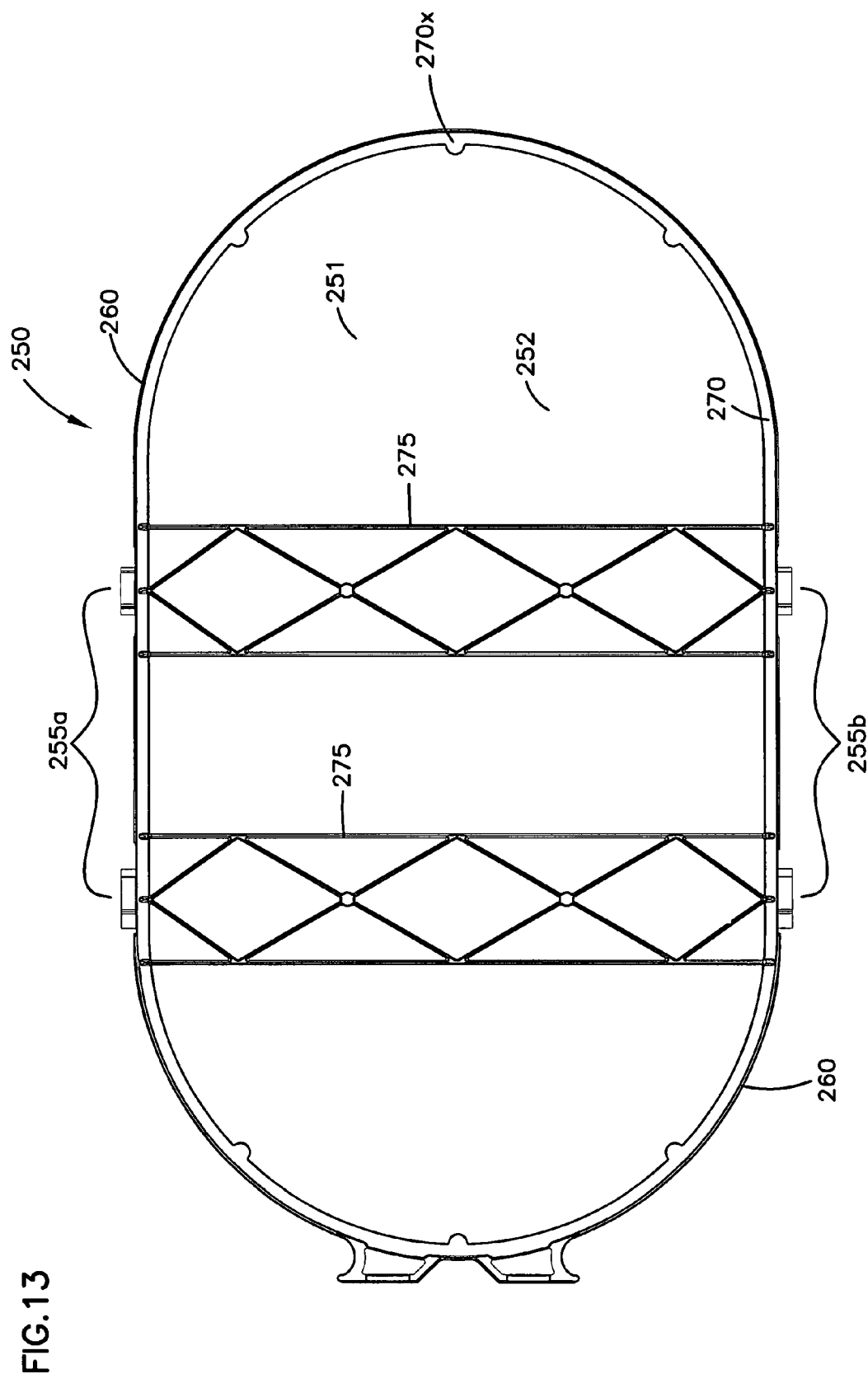
FIG. 13 is a schematic end elevational view of the cartridge depicted in FIGS. 6, 11 and 12; the view of FIG. 13 being toward an end opposite to that of FIG. 12.

Attention is now directed to FIG. 13, an end elevational view of cartridge 250 taken toward inlet end or face 252. Frame member 260 includes rim 270 extending over and projecting outwardly from end 252 of media pack 251. Cross brace arrangement 275 extends across face 252, to provide strength and rigidity.

For the particular housing 201 depicted, FIG. 15, cartridge 250 is sized and configured to be installed in sealing engagement with housing annular seal surface 230. Further, cartridge 250 is sized for a step of installation with inlet end 252 oriented with frame piece 260 in sliding engagement, to the extent desired, with slide ramp 237. (That is, installation with sliding engagement is not required, but it does help if used, at least during later stages of installation, to properly position the cartridge 250.) After insertion, the cartridge 250 is then tipped into sealing engagement, i.e., an installed position. It is noted that once the cartridge 250 is in an installed position, projections 238 will bias against region 270x (FIG. 13) of rim 270, FIG. 13, to help secure the cartridge 250 within the housing 201.

In FIG. 16 a cross-sectional view of air cleaner 200 (FIG. 15) is schematically depicted comprising housing 201 with cartridge 250 in an installed position. In FIG. 16, the view is a cross-section analogous to the view of FIG. 15.

Referring to FIG. 16, attention is first directed to engagement between housing seal member 258 (adjacent outlet end or face 253 of cartridge 250), and annular seal surface or member 230 in housing 201. Engagement is through an outwardly directed radial seal arrangement and an enlarged fragmentary view of the engagement is shown in FIG. 19.

Figure 19:
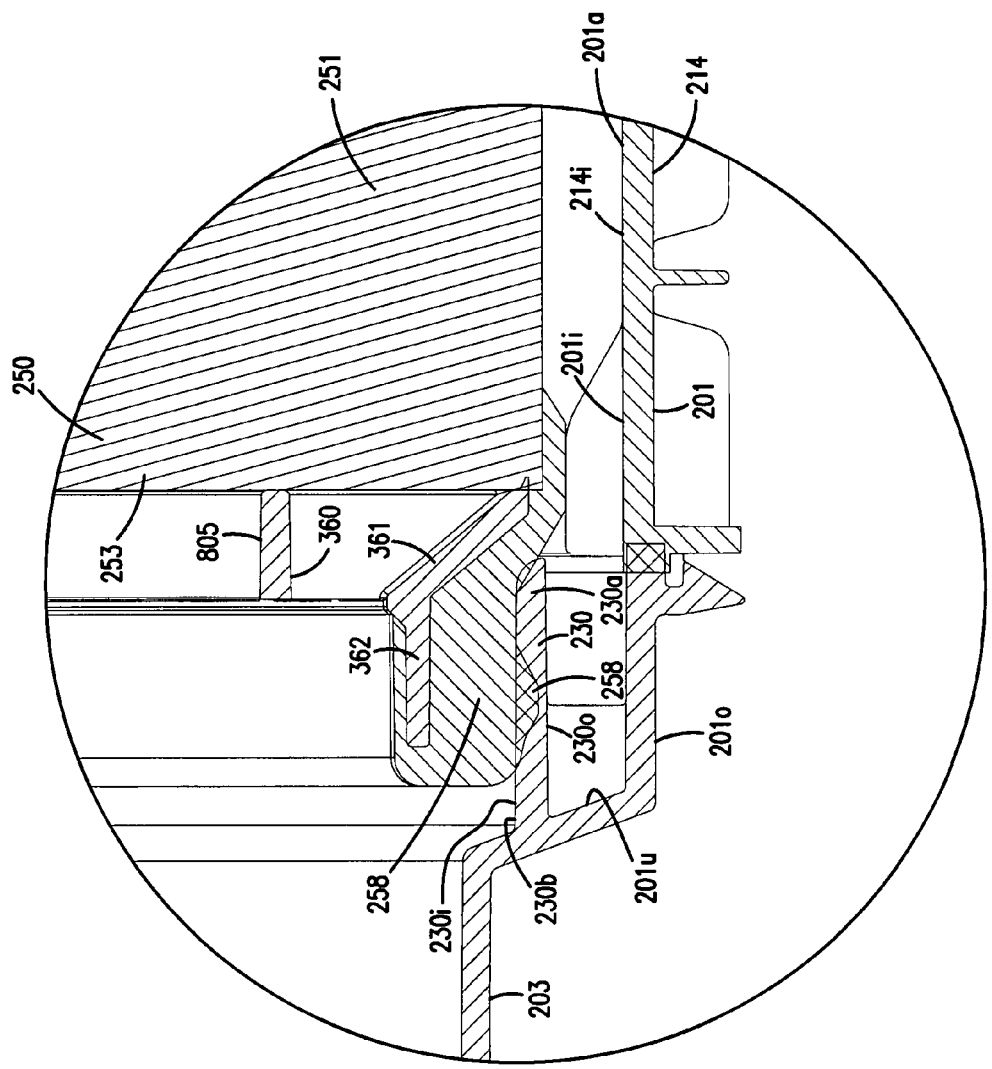
FIG. 19 is an enlarged schematic fragmentary view of a portion of FIG. 16.

Referring to FIG. 19, member 230 comprises a flange member 230a projecting axially into an interior 201i of housing 201, spaced from outer wall 201o, by u-shaped receiver section 201u. Receiver section 201u is sized and positioned as an annulus region to receive air flow from a first annulus 201a around cartridge 250 during use. This receipt of air flow is typically directly from the first annulus 201a; i.e., without a requirement that the air first pass through the media pack 251. In addition, base portion 230i of member 230a extends beyond housing seal arrangement 258. As a result of the structure shown, air flow will pass member 230a on opposite sides thereof (at base region 230b, where flange 230a engages a remainder of housing 201), except where engaged with housing seal member 258 in use. This will help tend to cool member 230a and housing seal member 258. This air cooling effect will facilitate the thermal stability of seal member 258, which typically comprises foamed polyurethane as described below. This feature is particularly useful, when the air cleaner 200 is mounted under the hood of a vehicle, during use, where heat buildup can be substantial.

In FIG. 19, overlap is shown between seal arrangement 258 and housing seal surface 230, showing an amount of compression of member 258, during normal installation.

The example air cleaner 200 (of which housing 201 is a component) thus includes an annular seal arrangement 230 comprising a projection 230a extending into an interior 201i of housing 201, toward inlet section 210 with: an outer surface 230o positioned to define an annulus region to receive air flow from an annular region 201a of housing 201, between the housing outer wall 201o and the cartridge 250. This air flow will help cool annular seal support 230 in a region where a seal is formed with outer annular housing seal arrangement 258.

Referring again to FIG. 12, at air flow outlet end 253, the example media pack 251 is shown having frame piece 360 thereon comprising cross-brace structure 805 and a seal support 361, FIG. 19. The seal support 361 includes projection member 362 oriented for positioning of housing seal member 258 between the support 362 and the housing annular seal member 230. Support 361 supports the extension or projection member 362 as a seal support at an appropriate orientation to back up seal member 361. Such a seal arrangement is generally described in PCT Publication WO 05/63361, published Jul. 14, 2005, incorporated herein by reference.

Typically, the seal region 258 is positioned at a location axially beyond end face 253 of the media pack 251, in a direction opposite face 252. That is, the seal region 258, which sealingly engages housing section 230, does not typically extend around the media pack 251, but rather is mounted at a location projecting axially outwardly from the media pack 251, away from the media pack 251 in a direction opposite surface 252.

The principles described herein can be utilized with alternate seal arrangements, including ones that extend around a media pack. However for the particular housing 201 depicted, and primary filter cartridge 250 described herein, a seal arrangement 257 as described, in which the housing seal member 258 includes a radially outwardly directed seal region positioned at a location axially outwardly from the media pack 251, is typical.

It is noted that a variety of alternate arrangements can be used to position a seal support such as support 362 in position, the example shown, comprising a framework 360 including support 361, is intended as an example.

An example polymeric material useable for housing the seal regions (and overmold if present) as described herein is polyurethane. An example useable polyurethane is a foamed polyurethane which will increase in volume during use. Preferred ones increase by at least 40% in volume, to fill the mold cavities (typically at least 80% in volume) and having an as-molded density of no greater than 30 lbs/cu.ft (0.48 g/cc), typically no greater than 22 lbs/cu.ft. (0.35 g/cc) and usually with in the range of 10 lbs/cu.ft (0.16 g/cc) to 22 lbs/cu.ft (0.35 g/cc); and, a hardness (Shore A) typically of not greater than 30, preferably not greater than 25 and typically within the range of 10 to 22. Of course polyurethanes outside of this range can be used, but the characterized ones are advantageous for manufacturing and handling.

Referring to FIG. 16, when a relatively long cartridge 250 is in an installed position within housing 201, during dust loading undesirable stress or strain can be a problem at region 390 of media pack 251, where engagement with housing seal arrangement 256 (comprising seal member 258 and frame piece 360) occurs. That is: (a) under dust load, substantial weight increase in media pack 251 can occur, for example two to four times filter cartridge weight increase, from dust load; and, (b) under conditions of typical use, for example as a vehicle air cleaner, substantial vibration and shock occur. Thus, with a relatively long media pack 251 movement adjacent end 252, as a result of cantilevered mounting of the cartridge 251 at seal member 258, can lead to damage or loss of media pack integrity. The problem is exacerbated, as mentioned, with a relatively long media pack 251, i.e., typically a media pack 251 having a length, between opposite (inlet and outlet) flow ends or surfaces 252, 253, of at least 230 mm.

To inhibit damage to the media pack 251, and thus cartridge 250 integrity, a media support arrangement is provided in a region adjacent to (i.e. at or slightly spaced from) inlet end 252; often no further than 100 mm from, typically within 50 mm of, and sometimes within 30 mm of, inlet end 252. Also, being on band 261 (frame member 260) the media support arrangement is usually positioned no more than 50% of a length of the media pack 251 from end 252, typically no more than 35% of this distance. A support arrangement at this location, is configured to provide engagement between the cartridge 250 and the housing 201, so that the cartridge end 252 is supported against unacceptable levels of movement.

In the arrangement of FIGS. 6-19, such a support arrangement is provided by implementing at least one, and typically two opposite projection/receiver arrangement(s) 291 with certain advantageous features. For an understanding of this, attention is first directed to FIG. 17.

Figure 17:
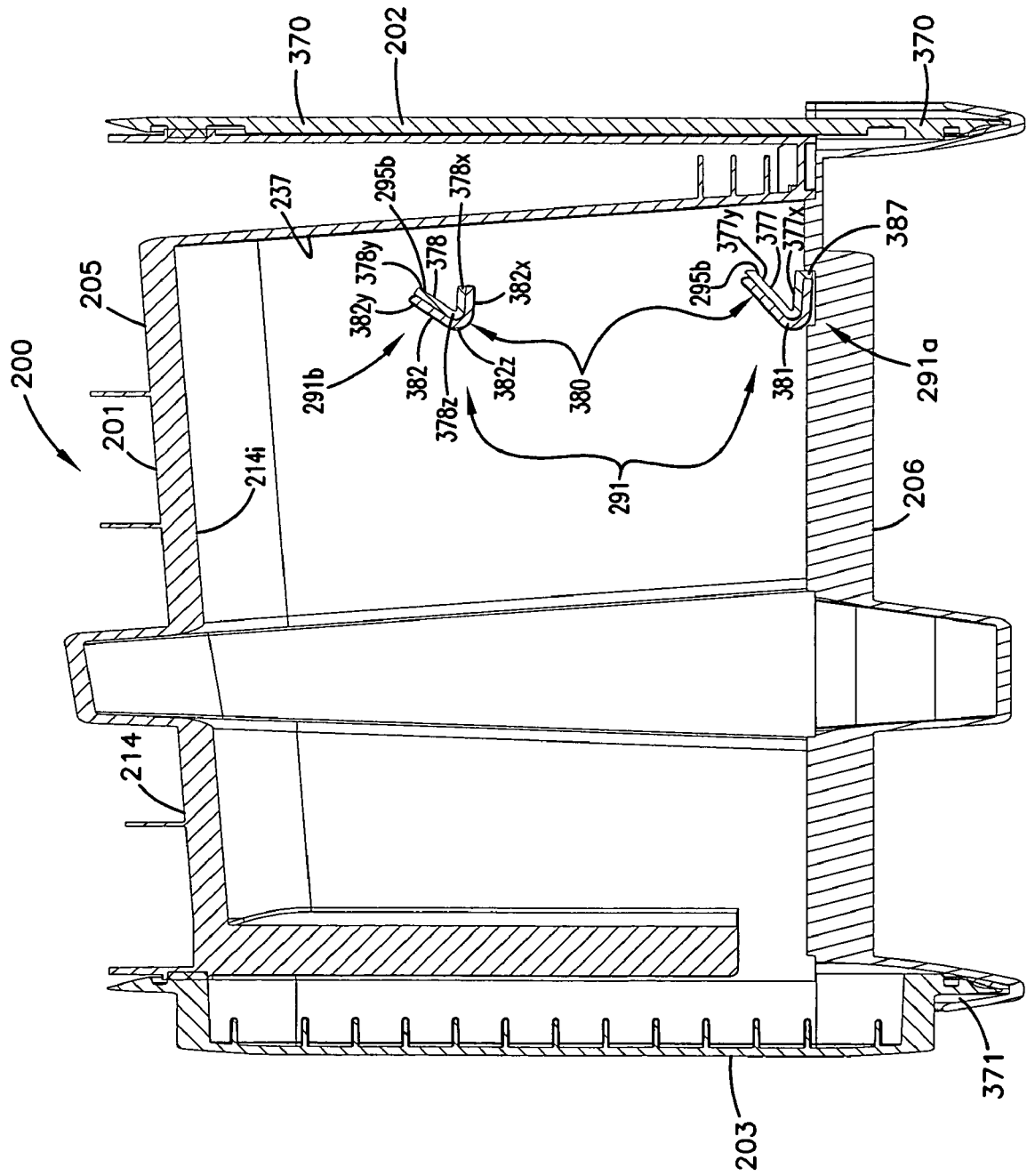
FIG. 17 is a schematic fragmentary cross-sectional view taken along line 17-17, FIG. 16.

Referring to FIG. 17, an enlarged, schematic, fragmentary cross-sectional view of air cleaner 200 is depicted, taken generally along line 17-17, FIG. 16, and with an access cover 206 in place. The fragmentary cross-sectional view of air cleaner 200 depicted in FIG. 17 is taken through a portion of projection/receiver arrangement 291, in particular through projection arrangement 295b, FIG. 12 and directed downwardly, so that engagement with the housing 201 can be understood. It is noted that, as a result of the cross-section location, no portion of media pack 251 is viewable in FIG. 17.

Referring to FIG. 17, the inlet section 202 (which is not fully viewable, see FIG. 16), would be mounted at 370, and the outlet section 203 (not fully viewable, see FIG. 16), would be mounted at region 371. At 206 the access cover is partially viewable. The cover 206, of course, is removable from a remainder of housing section 201.

Still referring to FIG. 17, double headed arrow 295b, indicates a first member of projection/receiver arrangement 291, mounted on the cartridge 250, FIGS. 12 and 13. In particular, double headed arrow 255b indicates projections or projection members 377, 378. Orientation of projections 377, 378 on cartridge 250 is shown in FIG. 12. It is noted that projection members 377a, 378a, FIGS. 6 and 12, are analogous members to projection members 377, 378 but on an opposite side 280 of the cartridge 250.

Referring again to FIG. 17, double headed arrow 380 indicates a second member of the projection/receiver arrangement 291; arrow 380 indicating two spaced receiver members 381, 382 respectively. Second member 380, in this example comprising receiver members 381, 382, are positioned in housing 201, in particular cartridge receiver section 205, at an appropriate location for engagement with the first member 295b of the projection/receiver arrangement 291. Typically, housing section 205 is a molded plastic component, with second member 380 of the projection/receiver arrangement 291 molded integrally therewith. For the example shown, the receiver members 381, 382 are stationary (i.e., non-moveable) members, that is they are non-moveably positioned within the housing section 205, in particular base section 214.

Referring still to FIG. 17, during installation with cover 206 removed, the cartridge 250, FIG. 6, is installed, for example with guiding assistance by some sliding engagement of end piece 270 with ramp 237. As the cartridge 250 is then pivoted or tipped into the sealing (installed) position, FIG. 16, projection member 327 will pivot or tip into its final installed position (FIG. 17) in installation engagement with receiver 381; and, projection member 378 will pivot or tip into its final installed position (FIG. 17) in installation engagement with receiver 382. In the example shown, member 377 also includes projection tip 387 thereon. Tip 387 is oriented to project toward access cover 206 when installed.

Figure 18:
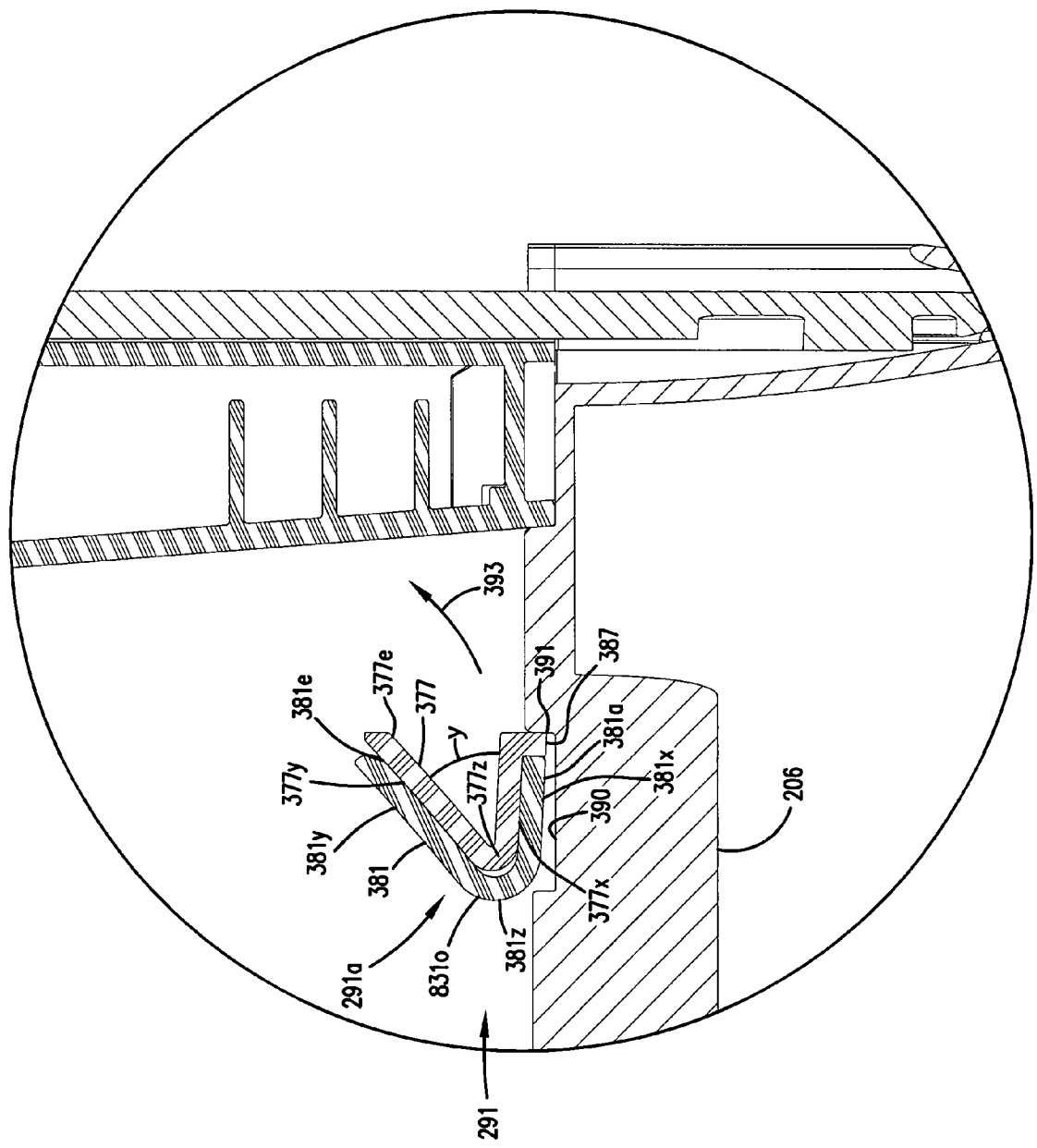
FIG. 18 is an enlarged, fragmentary, cross-sectional view of a portion of FIG. 17.

Attention is now directed to FIG. 18, an enlarged fragmentary view of a portion of FIG. 17, in particular a portion in which the part of projection/receiver arrangement 291, which comprises projection 377 and receiver 381 is depicted. Access cover 206 includes support structure, in this instance receiver pocket or indent 390 therein, including side 391. Receiver indent 390 and side 391 are positioned as support structure to engage (in this instance receive) tip 387 and side portion 381a of receiver 831 therein, when access cover 206 is secured in place, to prevent the cartridge 250 from pivoting or tipping away from sealing; i.e. to prevent projection 387 from pivoting away from installation engagement with receiver 381. Tip 387 is positioned to be engaged between portion 381a and side 391. Thus, cover 206 prevents projection member 377, and as a result the corresponding cartridge 250, from moving (tipping or pivoting) in the direction of arrow 393 out of installation engagement (the installed position) once installed. Further, receipt of projection 377 within receiver 381, and projection 378 within receiver 382, FIG. 17, will inhibit movement of the cartridge 250, adjacent end 252, FIG. 16, beyond an acceptable amount and/or out of installation engagement, during vibration and/or shock. It is noted that the access cover 206 can include analogous structure positioned at an opposite side of cartridge 250, to analogously engage an opposite or second projection/receiver arrangement.

From the above, it will be understood that the air cleaner 200 includes a projection/receiver arrangement 291, which inhibits cantilevered movement of end 252 of cartridge 250, once installed. This will alleviate stress at regions 390 previously discussed, during vibration and shock.

Still referring to FIG. 18, in the example shown, receiver 381 has a pocket shape between side walls or side wall sections, which will receive projection 377 in the example shown, in a manner supporting the projection 377 on both: (1) a side 377x directed toward curved side end 282 of cartridge 250, FIG. 6; and, (2) a supporting side 377y, directed toward a curved side end 283 of cartridge 250, FIG. 6, i.e., in a direction across, but not perpendicular to, a flow direction between end faces 252, 253 or inlet and outlet sections, 202, 203, (and in the example not parallel (i.e., non-parallel) to flow faces 252, 253). This support will help inhibit unintended motion of cartridge 250, within housing 201. Thus, the example receiver 381 has at least two, non-parallel, side wall sections 381x, 381y, defining a receiver or pocket therebetween.

To facilitate the support, both the projection 377 and receiver 381, for the example shown, are provided with a generally "v" or "checkmark" shape, FIG. 18, with at least two diverging (non-parallel) side wall sections and, in the example shown, with a central vertex or vertex region present; a point of the vertex between sides directed toward an outlet portion 203 of the air cleaner 200; and, away from the inlet portion 202 of the air cleaner 200, FIG. 17. Referring again to FIG. 18, to accomplish this projection 377 is provided with sides 377x, 377y that in the example engage one another at vertex 377z, although alternatives are possible. Also receiver 381 is provided with sides 381x, 381y diverging from one another (and in the example shown engaging at central vertex or vertex region 381z,) although alternatives are possible.

For the particular example shown, side 377x of projection 377, and side 381x receiver 381, extend in a direction (and engage along a direction) parallel or nearly parallel to a direction of extension between inlet section 202I and outlet section 203, FIG. 17. Also, side 377y and side 381y extend (and engage) at an angle relative to the corresponding sides 377x, 381x, typically of at least 20° and no more than 80° and, in the example shown, within the range of 25° to 55° inclusive, often 35° to 55° inclusive, although alternatives are possible. In FIG. 6, the angle between sides 377x, 377y is indicated at x; and in FIG. 18, the angle between sides 381x and 381y is indicated at y. Thus, sides 377y and 381y extend in a direction across a direction between inlet and outlet faces (252, 253) of the cartridge 250; in the example shown the extension being at an angle non-perpendicular to this direction.

At vertex region 381z, receiver 831 can be optionally provided with an aperture arrangement or similar arrangement at 831o, to allow for dust passage therethrough, as projection 377 is pushed into receiver 381, during cartridge 250 installation.

In more general terms, for the projection/receiver arrangement 291 depicted in FIG. 17 a first member, (for example a projection member 377) is positioned on the cartridge 250; and a second member, (for example receiver member 381), is positioned on a first side wall of the housing 201. The two are oriented such that during a pivoting of the cartridge 250 into sealing or installation (installed) position, the projection member 377 engages the receiver member 381 for secure holding of the cartridge 250 in position, when the cover 206 is installed. This is accomplished by defining a projection/receiver arrangement in which the first member, i.e., projection member 377, is supported by, and within, the second member, i.e., receiver member 386. This is provided in the example of FIG. 17, by utilizing a first v-shaped projection 377 and a second v-shaped receiver 381, the second sized to receive the first in a supporting fashion.

For the particular example shown, projection 377 and receiver 381 are oriented with open ends 377e, 381e (i.e. ends of, or direction of, divergence for the corresponding sidewalls) directed toward the inlet end face 252 (FIG. 6) of the cartridge 250 and the inlet end 202 of the housing 201 respectively; and, with the vertices 377z, 381z (i.e., ends of, or direction of, convergence of the corresponding sidewalls) thereof directed toward the outlet end 253 of the cartridge 250 and the outlet end 203 of the housing 200 respectively.

In addition, the member of the projection/receiver arrangement 291 mounted on the cartridge 250, in this instance projection member 377, is provided with a tip 387 that is positioned between the receiver 381 and a portion 391 of the cover 206 when the cartridge 250 is in the installation (or installed) position. For the particular arrangement 291 depicted, FIG. 6, tip 387 is positioned on a first side wall 377x of the projection member 377 of projection arrangement 291 and projects toward curved side end 282 of cartridge 250 (and away from a second side wall 377y of the projection member 377) and is pinched between cover 206 and a portion of receiver 381, to secure projection member 377, and thus cartridge 250 in place at installation. Still referring to FIG. 18, the portion of the projection/receiver arrangement 291 comprising projection member 377 and receiver member 381 will sometimes be referred to herein as a projection/receiver couple 291a.

Referring to FIG. 17, it is noted that projection/receiver arrangement 291 includes a second projection/receiver couple 291b, spaced from couple 291a along side 281 of cartridge 250 (FIG. 12). This will provide further stabilization. Couple 291b comprises a projection/receiver arrangement including projection member 378 and receiver member 382, for the example shown each having a "v" or "check" shape (as previously described for the first couple 291a, except without a locking tip) with opposite sides. Thus, receiver 382 has sides 382x and 382y around central vertex or vertex region 382z; and, projection 278 comprises sides 378x, 378y around central vertex or vertex region 378z.

It will be understood from the discussed figures that for a typical preferred securing engagement between and among: cartridge 250; cover 206; and, a remainder of housing 201; often at least two and in some instances four couples are provided; in the latter, two being positioned on each side of the cartridge 250, the opposite sides being mirror images.

From FIGS. 6-19, then, and the above characterizations above regarding them, general principles and observations in accord with the following will be understood. In one aspect, an air cleaner is provided with a housing having a primary filter cartridge housing radial seal surface comprising an interior flange projecting toward an air flow inlet section of the housing. The flange can be configured to define an air flow annulus section or region therearound, within the housing interior and in flow communication with a first air flow annulus around a filter cartridge received within the housing, between the filter cartridge and a housing side wall. In a typical application, the interior flange 230a would have a length of at least 20 mm, typically within the range of 25-35 mm, inclusive and typically not more than 40 mm, and would be typically at least 2.5 mm thick, usually 2.5-4.5 mm thick, inclusive, and typically not more than 5 mm. Also, in some applications the interior flange would have a base end portion 230b directed radially interiorly, with an extension of at least 3 mm, typically 3-7 mm inclusive and typically not more than 7 mm not covered by a filter cartridge housing seal member 258, when the filter cartridge is installed, see FIG. 19.

The interior flange 230 projecting toward the air flow inlet section 202 can be provided in the housing 201 whether the housing 201 is configured for alternatively receiving two different lengths of filter cartridge, or otherwise.

In another or second aspect, an air cleaner assembly 200 is provided including: a housing 201 defining an interior and having an air flow inlet section and air flow outlet section; a primary filter cartridge receiving section between the air flow inlet section and the air flow outlet section; and, a primary filter cartridge housing radial seal surface. The radial seal surface may or may not be defined with the interior flange previously discussed. The housing may be configured for possible receipt of only one length (or more than one length) of filter cartridge, as a matter of choice.

In this other or second aspect, a first removable and replaceable primary filter cartridge is positioned within the housing. The primary filter cartridge comprises a media pack having an inlet flow face and an opposite outlet flow face. The media pack typically comprises a plurality of flutes extending between the inlet flow face and the opposite outlet flow face. The media pack is closed to passage of unfiltered air therethrough, between the inlet flow face and the outlet flow face. By this it is meant that the air must be filtered, if it enters the inlet flow face and exits the outlet flow face, by passage through the media. The primary filter cartridge includes or is provided with, for installation, a housing seal member. In an example shown, the housing seal member is provided with a radial seal portion, member or surface in radial seal engagement with the primary filter cartridge housing radial seal surface.

In this other or second aspect, the air cleaner further includes a first projection/receiver arrangement. The first projection/receiver arrangement includes a first receiver member secured (typically stationary) to an interior wall of the housing. It typically includes at least first and second (typically non-parallel) side wall sections defining a receiver space therebetween. A first projection member is positioned on the first removable and replaceable primary filter cartridge. It is oriented with at least a portion thereof within the receiver space between the first and second side wall sections of the first receiver member. In the particular example shown, the projection member is configured to engage, during installation, at least a first, and typically the first and second (typically non-parallel) sidewall sections of the receiver space.

In an example shown, the first and second side wall sections of the first receiver member are not parallel to one another; and, for example, diverge from one another in extension, for example in extension toward the inlet of the air cleaner. By doing so, they form a pocket or receiver into which the first projection member can tip, or from which it can tip, during installation or removal of the primary filter cartridge. The access cover can be provided with support structure, for example a pocket, recess or shoulder arrangement, although alternatives are possible, that inhibits tipping out of an installed position within the receiver or pocket, when the access cover is installed.

In an example described, the first projection member includes first and second side wall sections non-parallel to one another (i.e., diverging from one another), for example in extension toward the inlet flow face of the first removable and replaceable primary filter cartridge.

In an example, the first projection member includes a locking tip thereon directed toward the access cover; the locking tip being positioned between the first receiver member and the inlet flow face of the filter cartridge. Further, in this example, the access cover includes a first receiver pocket oriented with a first locking tip of the first projection member (of the first projection/receiver arrangement) directed therein, when the access cover is in place. As a result, the first receiver pocket of the access cover includes a locking shoulder securing the first locking tip from tipping away from an installed position. The access cover can include a similar pocket or other structure at opposite sides of the cartridge, for such engagement.

Although a variety of alternatives are possible, in an example shown the filter cartridge has first and second opposite sides and first and second opposite curved ends; and, the first projection member is positioned on a first side of the cartridge.

In an example described, a second projection/receiver arrangement is provided in the air cleaner, with a first receiver member thereon secured (typically stationary) to an interior wall of the housing opposite the first receiver member of the first projection/receiver arrangement and with the first removable and replaceable filter cartridge therebetween. The first member of the second projection/receiver arrangement comprises at least first and second side wall sections non-parallel to one another, typically diverging from one another to form a receiver or pocket, for example diverging from one another in extension toward the inlet section; and, a first projection member of the second projection/receiver arrangement is positioned on the first removable and replaceable primary filter cartridge and oriented with at least a portion thereof within the receiver or pocket between the first and second side wall sections of the first receiver member of the second projection/receiver arrangement. In the particular example shown, the projection member of the second projection/receiver arrangement engages the first and second side wall members of the first receiver arrangement of the second projection/receiver arrangement, positioned therebetweeen.

The second projection/receiver arrangement can include a tip, for engagement by support structure in the access cover, analogous to the tip described for the first projection/receiver arrangement.

Also described are filter cartridges having features in general in accord with those characterized above for an air cleaner. For example, the filter cartridge may comprise a media pack having an inlet flow face and an opposite outlet flow face, and comprising a plurality of flutes extending between the inlet flow face and the opposite outlet flow face. The media pack would generally be closed to passage of unfiltered air therethrough, between the inlet flow face and the outlet flow face. A seal member is positioned on the media pack, for example adjacent a flow face, typically the outlet flow face, and including, in an example shown, radially outwardly directed radial seal member or surface.

A preform support is positioned on the media pack adjacent the inlet flow face, the preform support including a first member of a projection/receiver arrangement thereon, the first member including at least first projection member having at least first and second side wall sections typically non-parallel, i.e. diverging from one another, in an example shown in extension toward the inlet flow face.

Typically the first member of the first projection/receiver arrangement is positioned on the media pack at a location no more than 100 mm from the inlet flow face.

In still another general statement, a filter cartridge is provided which comprises a media pack as characterized, and a seal member as characterized. A first member of the first projection/receiver arrangement is positioned on the media pack within a location of 100 mm, typically no more than 50 mm, and sometimes within 30 mm, of the inlet flow face; and within a distance of no more than 50%, and typically no more than 35%, of a distance across the media pack from the inlet flow face. The first member includes a first projection member extending outwardly from adjacent the media pack and including at least one of: a first projection wall segment that is directed generally between the inlet face and the outlet flow face; and, a second projection wall segment with a portion directed generally across a direction between the inlet flow face and the outlet flow face. In the specific example shown, the first member of the first projection member includes both. However there is no specific requirement that in all applications of the techniques described herein, both are present, as long as a secure installation position is achievable. Of course a first projection member of a second projection receiver arrangement can be mounted on an opposite side of the filter cartridge.

Referring to FIGS. 17 and 18, for the projection/receiver arrangement 291 shown, the member 377 includes a first side 377x directed generally between the inlet flow face and the outlet flow face of the filter cartridge 250. Also, a second wall section 377y is depicted, which generally extends across a direction between the inlet flow face and the outlet flow face, in the example shown at an angle of less than 90°, as opposed to directly parallel to the two opposite flow faces. It will be understood from the example shown in FIGS. 17 and 18, that both wall sections can be present. However some stabilization will occur if only one or the other of the wall sections is present. This will be understood from the general descriptions and functions provided previously.

C. The Example Variations in Housing Seal Arrangement on Filter Cartridge

Figure 10:
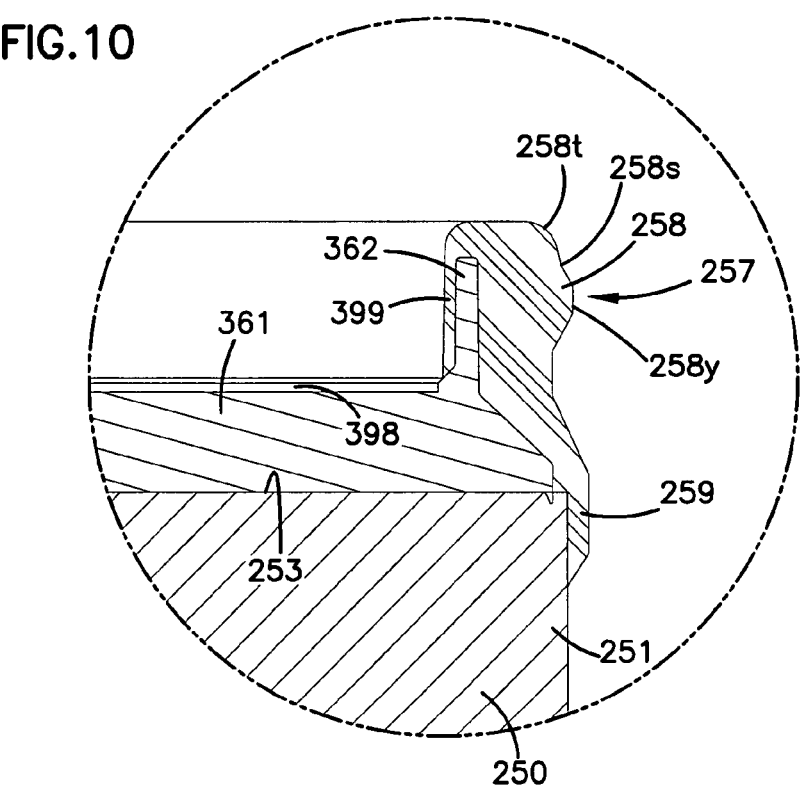
FIG. 10 is a schematic fragmentary cross-sectional view depicting of the filter cartridge of FIG. 6.

Hereinabove, in connection with cartridge 250, FIG. 6, and in particular in the discussion evolving a cross-section of FIG. 19, a general discussion of a housing seal arrangement 257 was provided. An enlarged, schematic, fragmentary cross-sectional view depicting the seal arrangement, is shown in FIG. 10. Referring to FIG. 10, the seal arrangement 257 comprises housing seal member 258, in this example secured to media pack 251 by overmold portion 259. The seal portion 258 includes an outer seal surface 258s having an increasing step (or thickness/projection) definition, from outermost tip region 258t to thickest seal region 258y. When installed, region 258y will compress. In FIG. 19, an overlap in seal area 258 with housing annular seal surface 230 is shown. In actual installation, the overlap represents how much the seal arrangement 257 will compress during sealing.

Referring still to FIG. 10, support 361 is shown with seal backup support 362 thereon, projecting axially away from media pack end 253. The housing seal member 258 which compresses in use, is backed up by support 362.

Frame work 361 also include cross-brace arrangement 805, FIG. 12. Attention is directed to lip 398, which provides for a stop to rise of urethane in region 399. This is described in U.S. Provisional application 60/735,650, filed Nov. 9, 2005, incorporated herein by reference.

Figure 7:
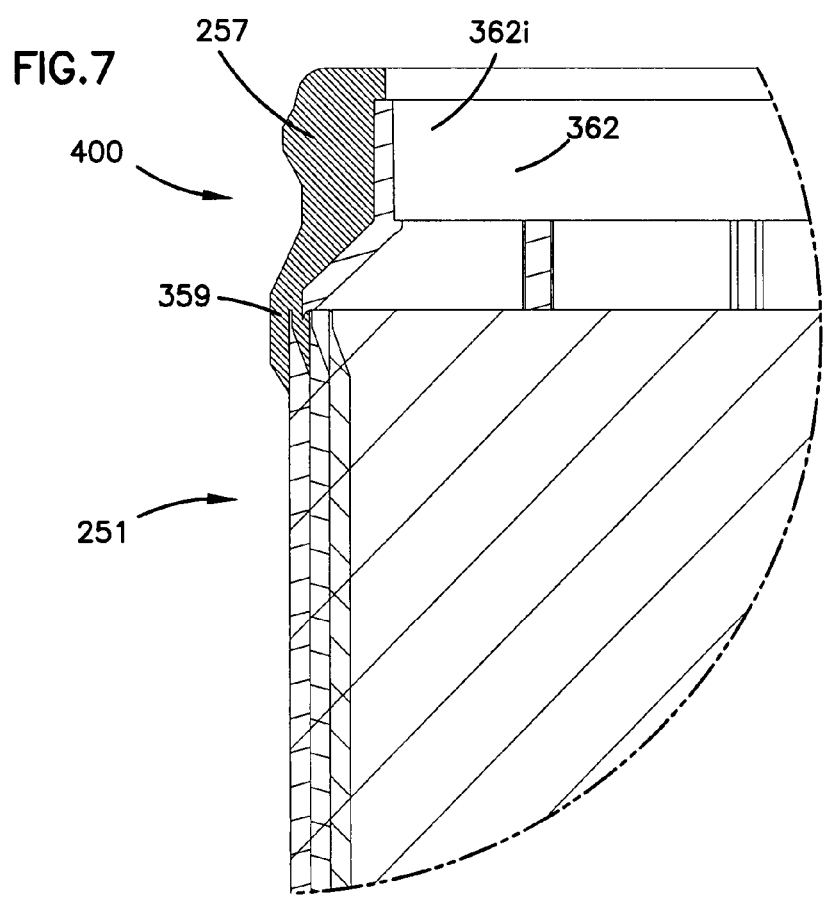
FIG. 7 is a schematic fragmentary cross-sectional view of a variation in a filter cartridge according to FIG. 6.

Variations in the housing seal arrangement are possible. In FIG. 7 an alternate cross-sectional view of a housing seal arrangement 400 mounted on media pack 251 is shown. Here the housing seal member 258 and overmold 259 are similar, except there is no portion of overmold along surface 362i of support 362. Thus, molding of housing seal member 258 would not involve a rise along an interior surface 362i of support 362, with stop by an analogous stop to lip 398. A seal arrangement analogous to that shown in FIG. 7, is described in US Publication 2005/0166561, published Aug. 4, 2005, incorporated herein by reference.

Figure 8:
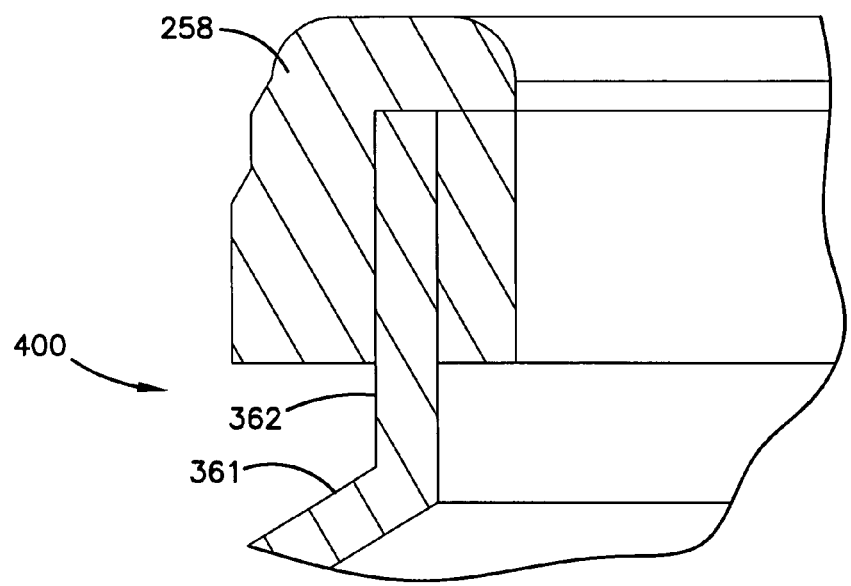
FIG. 8 is a schematic fragmentary cross-sectional view of an alternate housing seal component usable in a cartridge according to FIG. 6.

In FIG. 8, another variation in a seal arrangement 400 mountable on media pack 251 is shown. Here frame work 361 and support 362 are provided as a separate preformed piece, to which seal arrangement 258 is secured, for example by molding. Frame piece 361 would then be attached for example with adhesive, to a media pack 251. This type of seal arrangement is described, for example, in U.S. Pat. Nos. 6,190,432, 6,350,291; 6,610,117; and 6,783,565, incorporated herein by reference.

Figure 9:
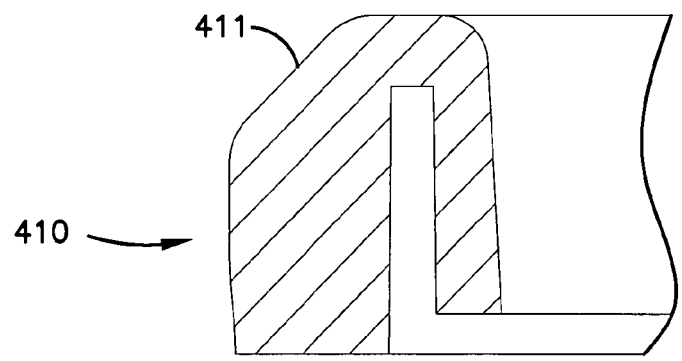
FIG. 9 is a schematic fragmentary cross-sectional view of a further alternate seal component usable in a cartridge according to FIG. 6.

In FIG. 9, a variation in seal shape is shown. Referring to FIG. 9, at 410 is depicted a seal member. The seal member does not include the multiple step definition of the seal arrangements of FIGS. 7, 8, and 10. Rather a single slanted surface 411 is depicted. This shape can be utilized in some arrangements, whether practiced with: an overmold; or, a pre-molded arrangement with a frame piece, which is then secured to a media pack. The arrangement of FIG. 9 is discussed, for example, in U.S. Provisional application 60/735, 650, filed Nov. 9, 2005, incorporated herein by reference.

From the above discussions with respect to FIGS. 7-10, it will be understood that the principles of the present disclosure can be applied with a wide variety of housing seal configurations and supports. The examples provided are useful, and relatively straight forward to implement. However, a variety of alternatives in which a seal member is attached to (or mounted on) a media pack analogous to media pack 251, can be used. The seal members can be molded in place, and the support arrangement secured by an overmold. However, alternatives are possible, as indicated.

IV. A Second Example Improved Air Cleaner Arrangement Utilizing Z-Filter Media; FIGS. 20-33

Alternate applications of selected principles characterized previously are provided in FIGS. 20-33. Attention is first directed to FIG. 20 in which an air cleaner 500 is depicted. The air cleaner 500 generally comprises housing 501 including an inlet section 502, an opposite outlet section 503, and a central cartridge receiving section 505. The cartridge receiving section 505 comprises a base 514 and a removal and replaceable access cover 515. The access cover 515 is secured in place by over center latches 516. Although not required, in a typical application an opposite side view of air cleaner 500 from that shown in FIG. 20, would be similar with analogous features.

Figure 20:
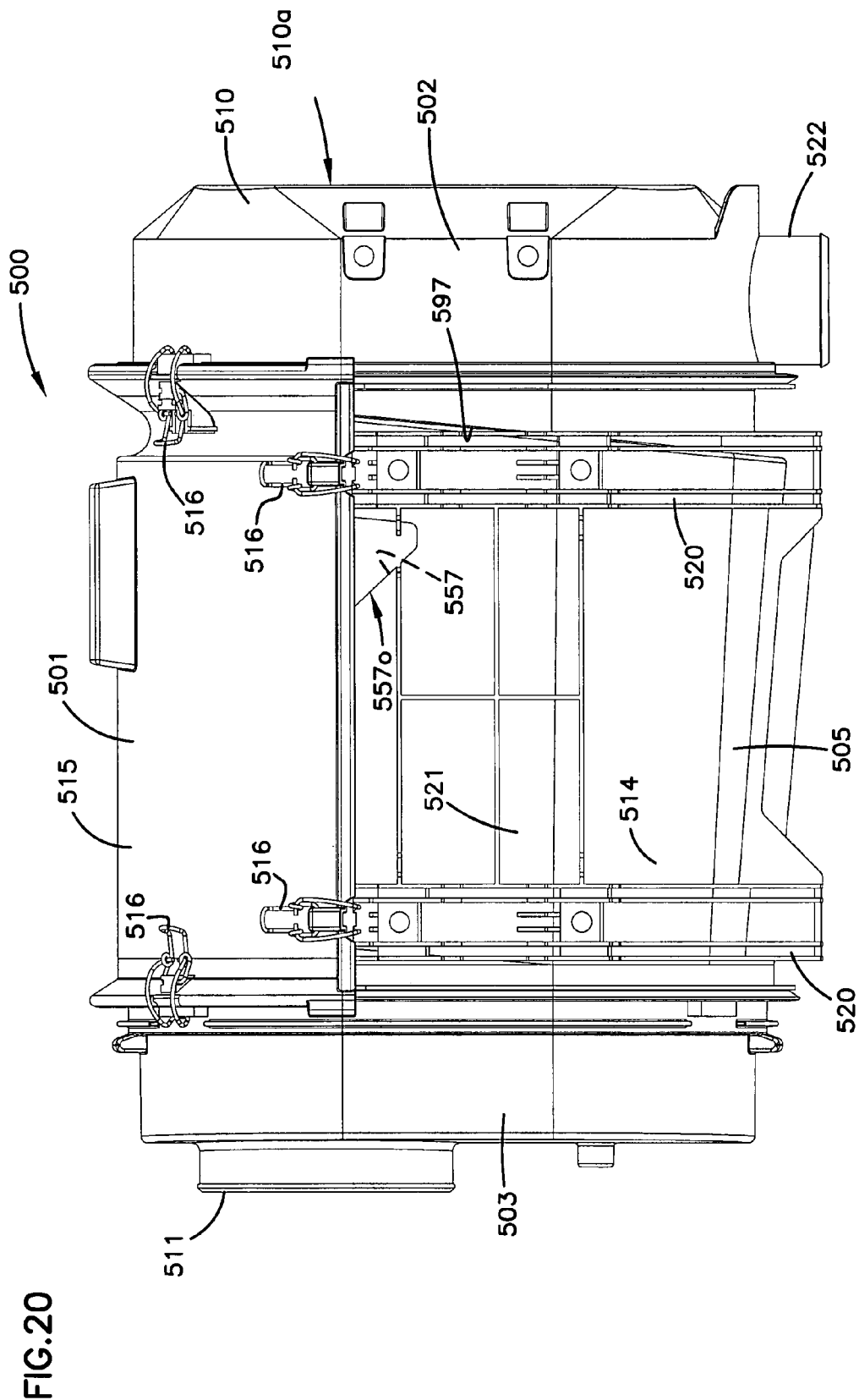
FIG. 20 is a schematic side elevational view of an alternate air cleaner to that depicted in FIG. 14; the air cleaner of FIG. 20 being depicted oriented for vertical, side, installation of a filter cartridge.

Still referring to FIG. 20, outlet section 503 includes air flow outlet 511. The air flow outlet can be secured to an engine air intake hose or duct work, or to other equipment with which air cleaner 500 would be used.

Inlet section 502, for the example shown, comprises a first stage pre-cleaner 510, typically comprising a plurality of centrifugal separator tubes with inlets at end 510a.

Air cleaner housing 501 is provided with a mounting pad arrangement 520 thereon. The mounting pad arrangement 520 is configured so that the air cleaner 500 can be mounted in a variety of orientations. The particular orientation shown in FIG. 20, is a vertical orientation with the access cover lifted up, for access to an internally received filter cartridge. Alternate configurations would be either laying on side 521, or an opposite side, 521a, FIG. 21.

The features of air cleaner 500 thus far characterized, are generally analogous to those described in PCT Publication WO 05/107924, published Mar. 2, 2006, incorporated herein by reference.

Still referring to FIG. 20, inlet pre-cleaner section 510 includes dust drop tube 522. The inlet pre-cleaner section 510 will normally be oriented so that the dust drop tube 522 is positioned directed downwardly, when the air cleaner 500 is installed for use. Thus, air cleaner 500 FIG. 20, is configured for mounting in a vertical orientation as shown, with the dust drop tube 522 directed downwardly. The dust drop tube 522 can be attached to a scavenge arrangement, or an evacuation valve, as appropriate for the system of use. Of course the dust drop tube 522 can be oriented at a different location in Section 510, if the air cleaner 500 is to be mounted on its side. This is discussed in PCT Publication WO 05/107924, published Mar. 2, 2006, incorporated herein by reference.

Figure 21:
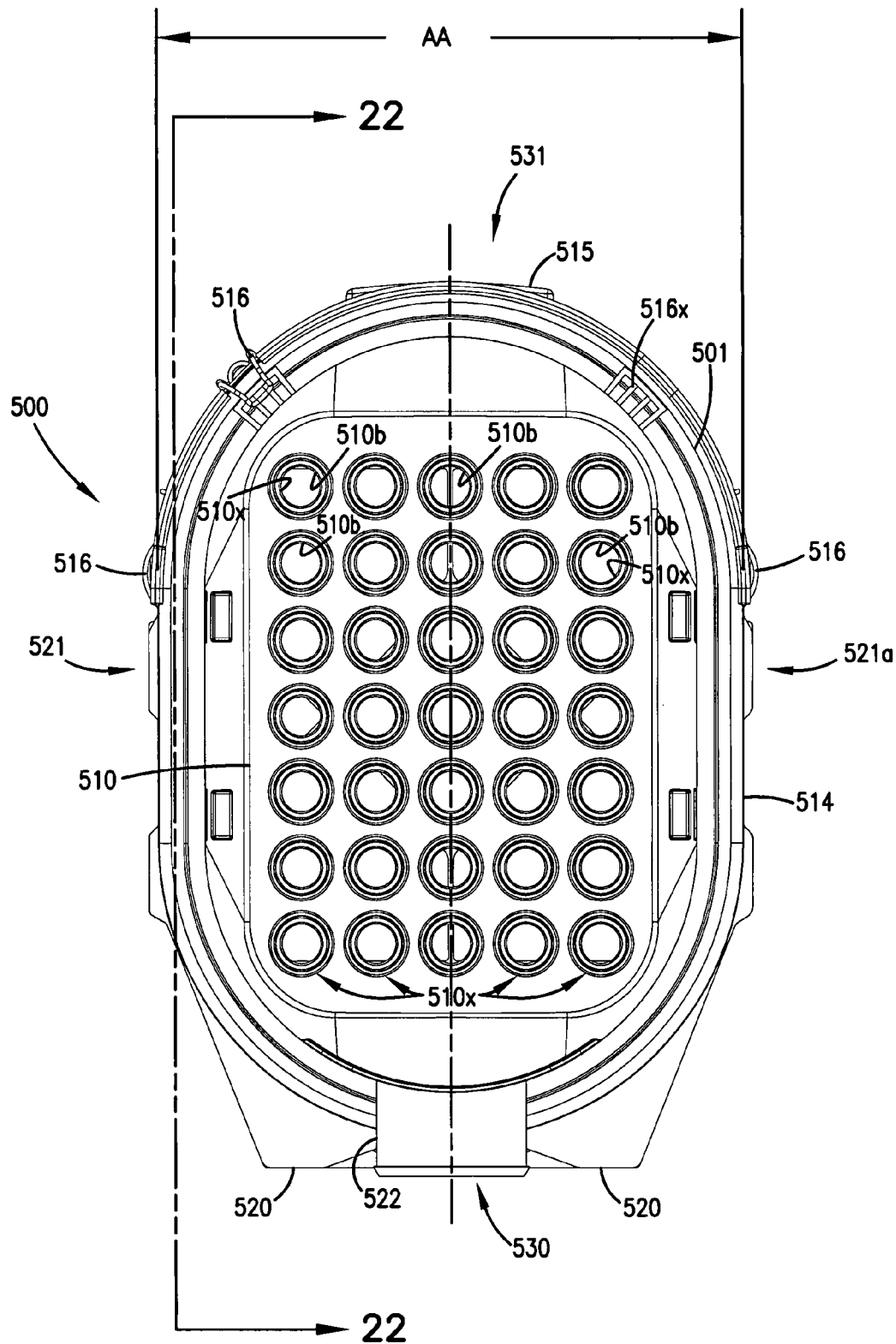
FIG. 21 is an inlet end elevational view of the air cleaner depicted in FIG. 20.

Attention is now directed to FIG. 21, an end elevational view taken toward pre-cleaner inlet section 510. It is noted that at 516x, a latch connection point is shown, where a latch similar to 516 would typically be latched, when the cover 515 is in place. No latch is located in the drawing at 516x, so one can view location 516x in complete view.

Still referring to FIG. 21, individual inlets for centrifugal separator tubes 510x are shown at 510b. The number and location of tubes 510x is a matter of choice, for the system involved. Generally it is desirable to provide as many centrifugal separators as conveniently managed within the space allowed, to maximize precleaner operation.

Installation and removal of an internally received filter cartridge for the air cleaner 500 could be generally as characterized for the air cleaner arrangements described in PCT Publication WO 05/107924, published Mar. 2, 2006, except as characterized herein, although alternatives are possible.

That is, access cover 515 would be removed, and a filter cartridge (sealed in place with an outwardly directed radial seal), would be tipped out of seal engagement (installed position) and then be removed from the housing. A new (factory new or refurbished) filter cartridge could be installed with a reverse operation.

As previously discussed for FIG. 6-19, when the filter cartridge utilized in air cleaner 500 is relatively long, for example greater than about 230 mm, vibration and shock can cause some damage to the filter media, as a result of the cantilevered support of the filter cartridge within the seal location. This would be analogous to that described above for FIG. 16.

Figure 22:
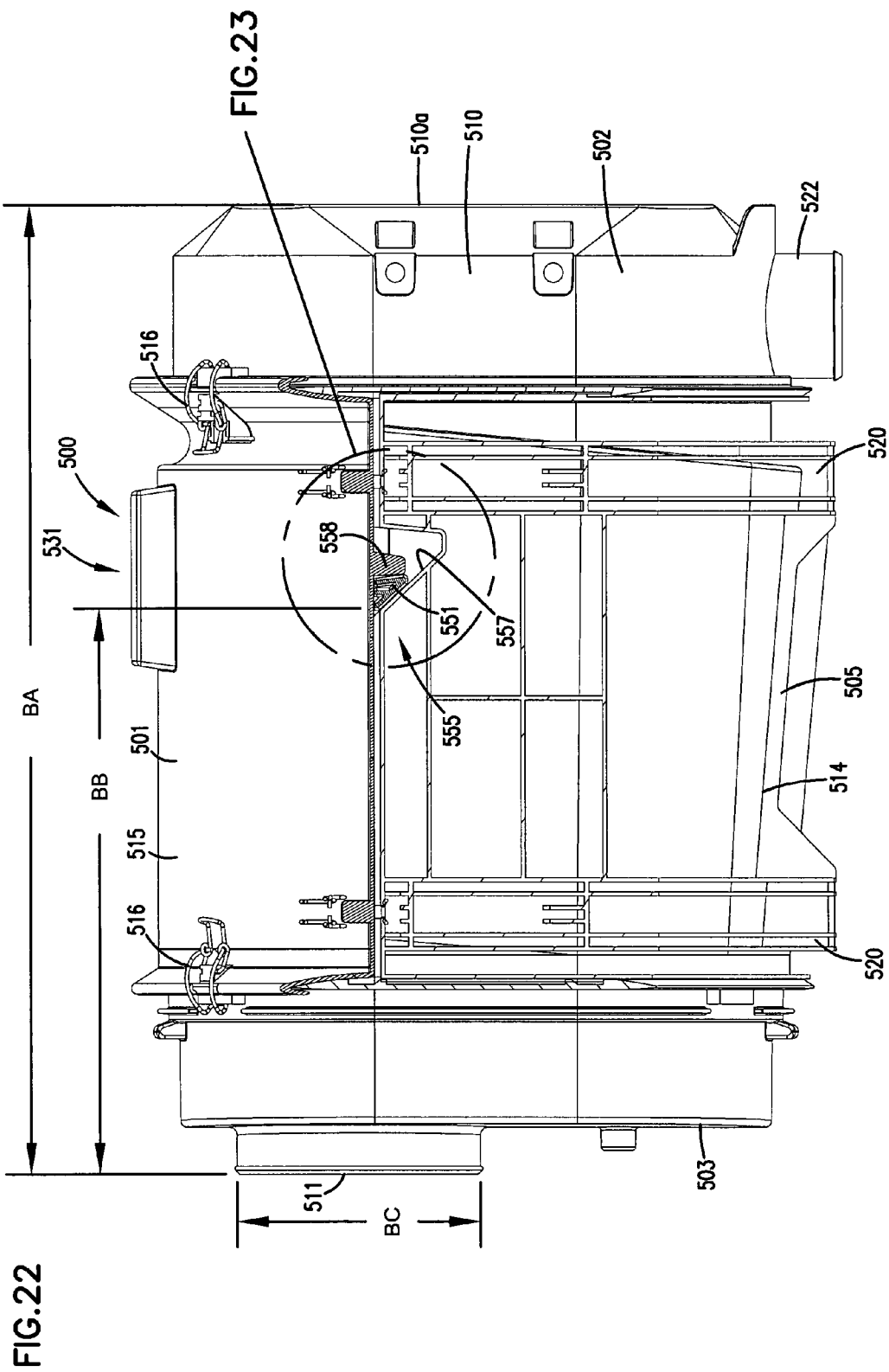
FIG. 22 is a schematic cross-sectional view of an air cleaner taken along line 22-22, FIG. 21, with only portions of an internally received filter cartridge being viewable.

Air cleaner arrangement 500 is modified, in both the housing and the filter cartridge, to provide for support against this undesired motion. With respect to this, attention is now directed to FIG. 22. In FIG. 22 a cross-section is taken generally along line 22-22, FIG. 21. It is noted that in FIG. 22 only a selected portion of the cartridge that would be installed, is shown. This will be further understood from additional description below.

Figure 30:
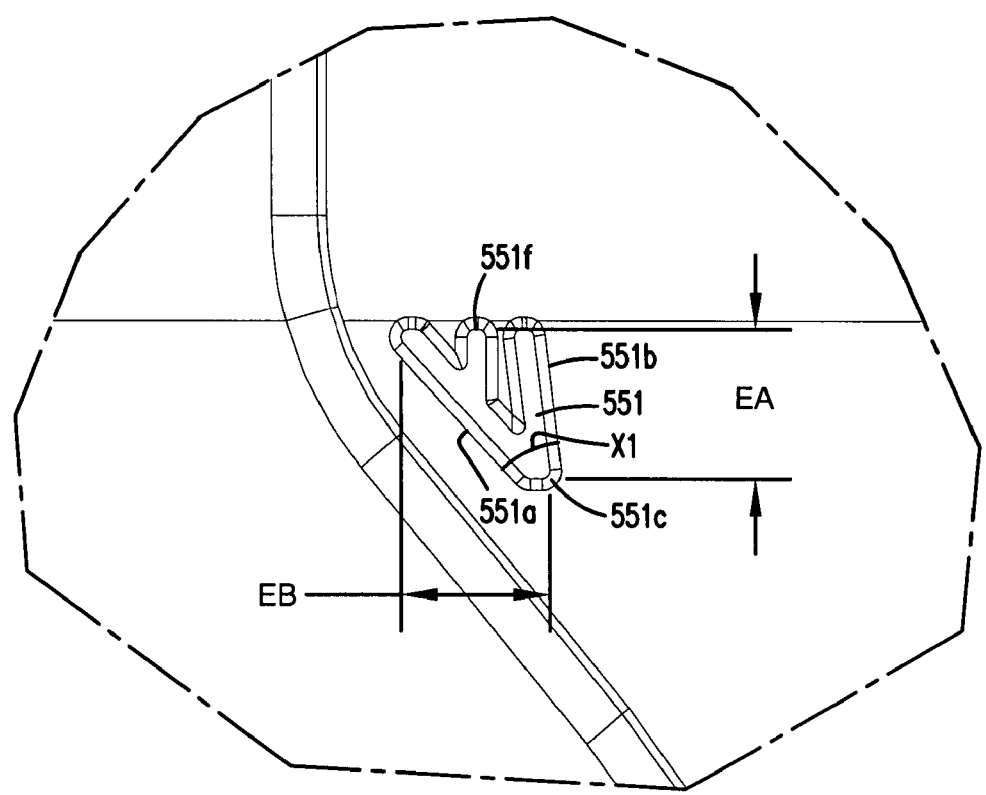
FIG. 30 is a schematic, enlarged, fragmentary view of a portion of FIG. 29.

Air cleaner housing 501, FIG. 22, is specifically configured for receipt therein of cartridge 550, FIGS. 29-31. In FIG. 22, the only portion of cartridge 550 viewable, is projection member 551. Referring to FIG. 22, housing 501 is depicted with access cover 515 in place on base section 514. A portion of wall 521, FIG. 20, is removed, for view of interaction between the air cleaner and projection member 551 on cartridge 550, FIG. 29. Projection 551 comprises a first member of a projection receiver arrangement 555; a second member, comprising a receiver 557 also being shown. In operation, projection member 551, when the cartridge 550 is installed, is received within receiver 557, to provide a coupled projection/receiver arrangement 555, securing the cartridge in place, with projection member 551 engaging a side of receiver 557. Access cover 515, includes tab 558 to provide for secure arrangement and avoid rocking or tipping of cartridge 550 out of a sealed or installed position.

Referring to FIG. 20, at 557o, an outer or outside appearance of pocket or receiver 557 is viewable. On an interior, FIG. 22, the receiver 557 is positioned to receive projection 551 as the cartridge 550 is inserted into housing 501. The typical receiver 557 is stationary; i.e., non-moveable with respect to a remainder of housing 501.

Figure 23:
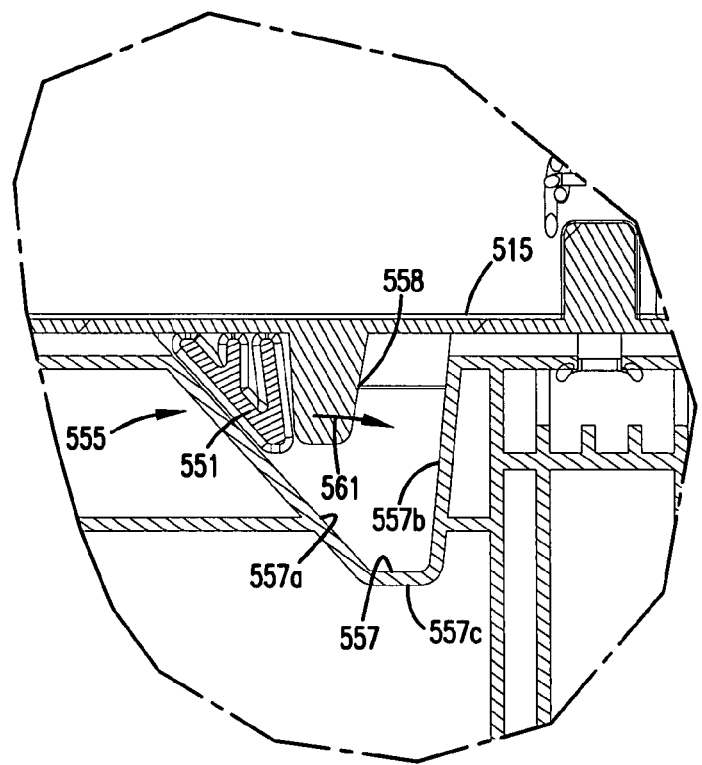
FIG. 23 is an enlarged fragmentary schematic view of a portion of FIG. 22.

Attention is now directed to FIG. 23, a schematic, enlarged, fragmentary view of a portion of FIG. 22. Referring to FIG. 23, receiver 557 can be seen to comprise first and second side walls or side wall sections 557a, 557b, diverging from one another in extension away from central vertex or vertex region 557c. In the example shown, the walls 557a, 557b, diverge from one another in extension toward access cover 515, and away from a bottom end 530, FIG. 21, of air cleaner housing 501. Thus, walls 557a, 557b diverge from one another in extension in the general direction of cartridge curved side end 531, FIG. 21.

Referring to FIG. 23, in can be seen that when access cover 515 is removed (along with tab 558), projection 551 can be pivoted away from wall 557a, toward wall 557b, in the direction of arrow 561. This pivoting motion would typically be associated with a rocking of the cartridge 550 out of a sealing (installed) position within air cleaner 500.

When access cover 515 is in place, tab 558 projects into the receiver 557, positioning projection 551 between the tab 558 and pocket side wall 557a. This inhibits movement of the tab 551, and thus the resulting cartridge 550 away from a stable, installed, sealed position within air cleaner housing 501.

Figure 24:
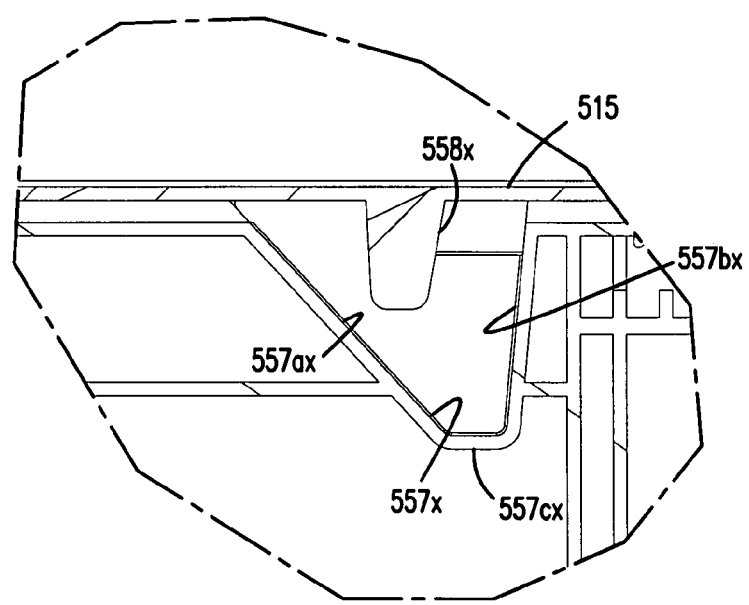
FIG. 24 is an enlarged fragmentary schematic view of a portion of an air cleaner corresponding to FIG. 23, but depicting the air cleaner housing with a filter cartridge removed.

In FIG. 24, a view analogous to FIG. 23 is shown, except showing an opposite receiver 557x, at an opposite side of housing 501, from side 521, i.e., adjacent side 521a. Pocket 557x can be analogous to pocket 557, except oppositely positioned as a mirror image. Projection or tab 558x is shown on access cover 515, projecting into pocket or receiver 557x. Receiver 557x includes side walls 557ax and 557bx, diverging away from vertex region 557cx, in extension toward access cover 515 (and curved side end 531 of air cleaner housing 501).

In FIG. 24, receiver 557x is shown without a projection analogous to projection 554, FIG. 23, positioned therein. Thus, FIG. 24 indicates the region around one of the receivers 557, 557x, when the access cover 515 is installed, but no cartridge 550 is positioned within housing 501.

Figure 25:
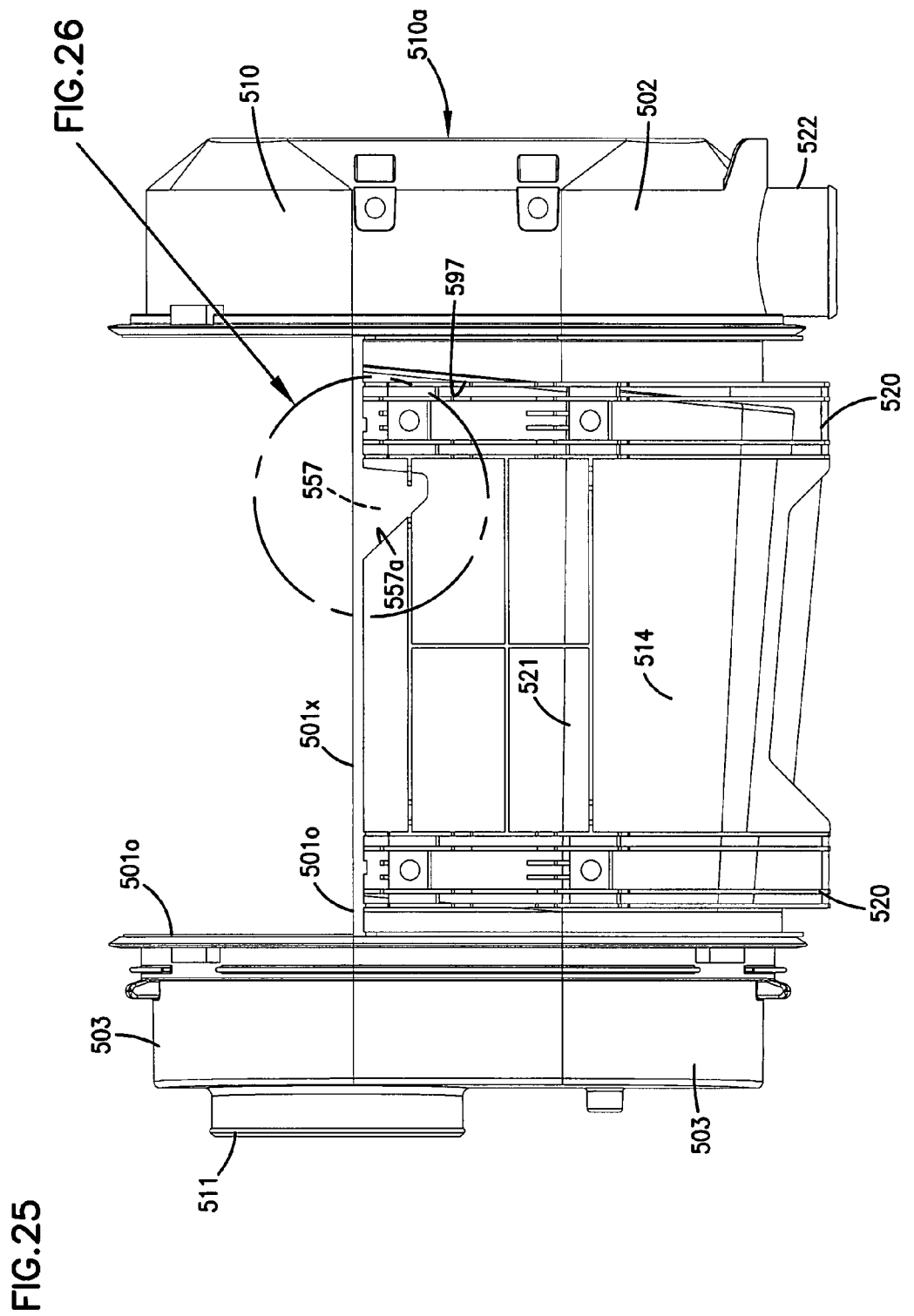
FIG. 25 is a schematic side elevational view of a portion of the air cleaner of FIG. 20, with an access cover removed.

FIG. 25 shows a remainder of housing 501x, when access cover 515, FIG. 20, has been removed, and when no filter cartridge is positioned within interior 501a.

Figure 26:
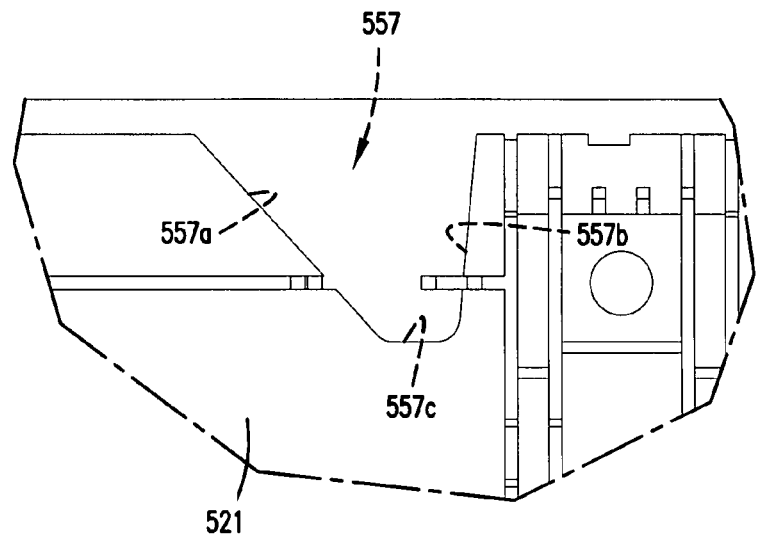
FIG. 26 is an enlarged, schematic, fragmentary view of a portion of FIG. 25.

In FIG. 26 an enlarged fragmentary view of a portion of FIG. 25 is shown. In FIG. 26, the fragmentary view depicted, is a portion of side 521, in particular the portion that includes receiver 557, viewed from outside the housing 501.

Figure 28:
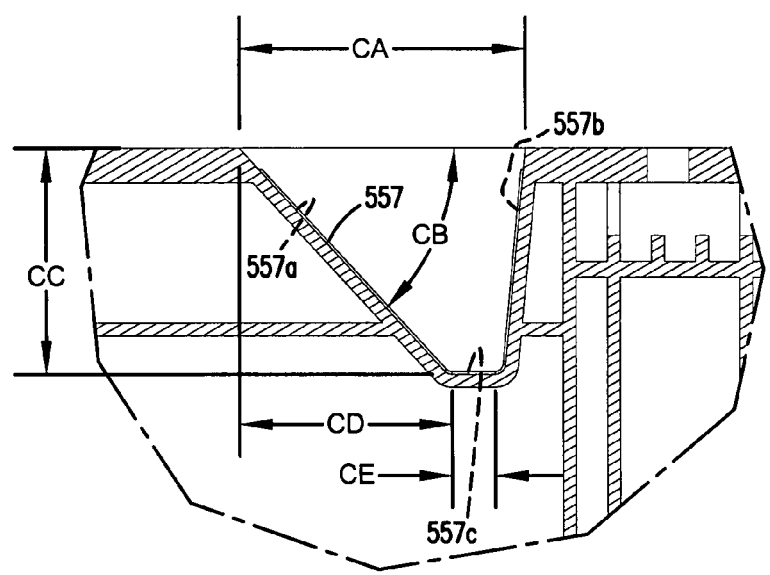
FIG. 28 is an enlarged fragmentary cross-sectional view of a portion of FIG. 27.
Figure 27:
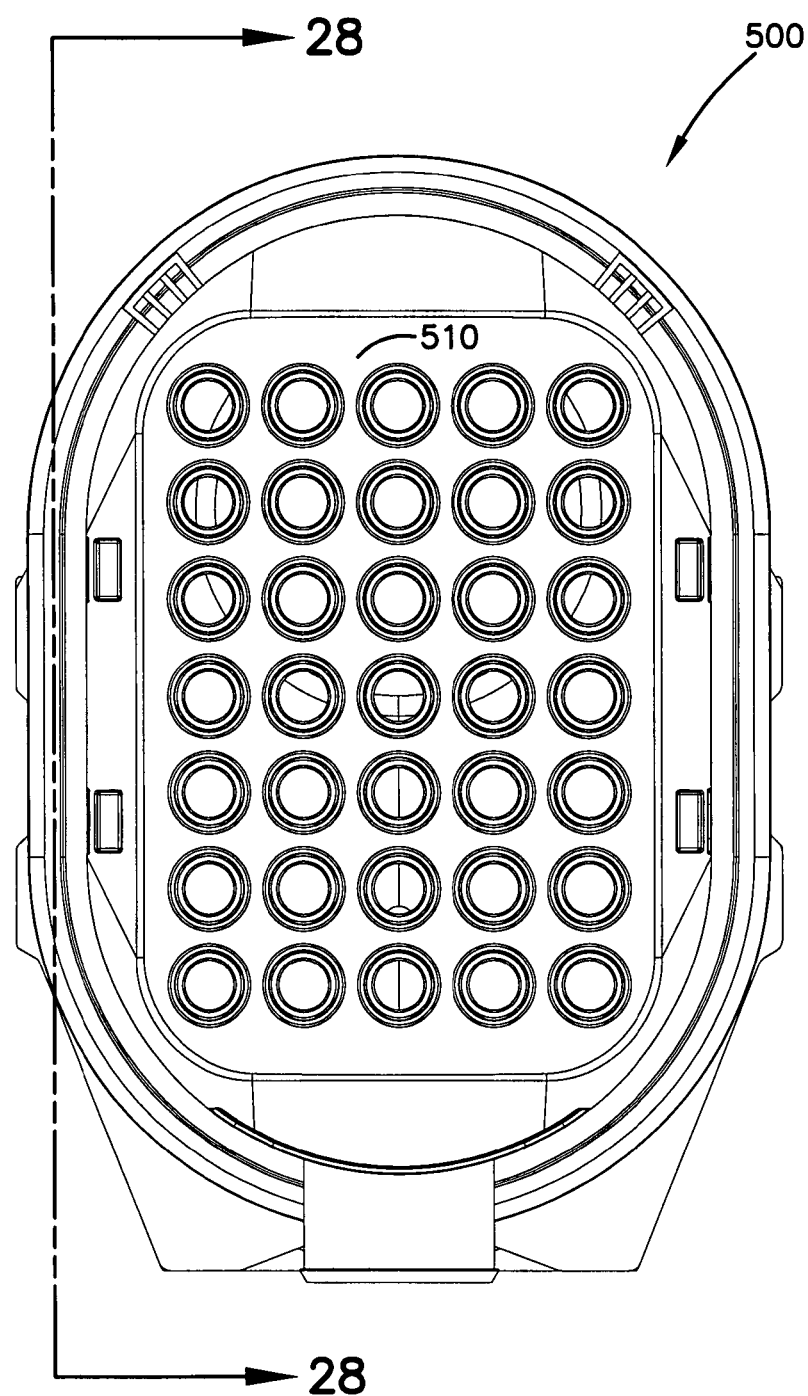
FIG. 27 is an end elevational view of a portion of FIG. 25.

In FIG. 27, an end view of air cleaner 500 is viewable with the access cover 206 removed and taken toward precleaner inlet section 510. Line 28-28, FIG. 7, shows where the cross-sectional view for the fragmentary cross-section of FIG. 28 is taken. Here the view is of pocket receiver 557, with neither the access cover nor the internally received cartridge in place.

In FIGS. 29-31, filter cartridge 550 and portions thereof are viewable. Referring first to FIG. 29, cartridge 550 comprises media pack 580 having a first flow end 581 and an opposite, second, flow end 582. In a typical example, first flow end 581 would be an inlet flow end, and opposite second flow end 582 would be an outlet flow end. The media pack 580 may comprise a coiled z-filter media pack, in accord with descriptions previously given. Mounted around an end of media pack 580 adjacent face 581, is provided a preform arrangement 585 including a band 586. The preform arrangement includes opposite sides 587, 588, FIG. 31, and opposite ends 589, 590. Also provided at end 589 is handle arrangement 591. Referring to FIG. 39, preform 585 includes, extending cross flow face 581 a grid arrangement 594, for media pack support. Rim 595 is provided over surface 581, to provide for engagement, if desired, with a sliding mount arrangement.

Referring to FIG. 20, at 597, portions of a slide mount or ramp arrangement are shown, to facilitate mounting.

As thus far characterized, the cartridge 550 can be generally analogous to cartridge 250, FIG. 6.

Referring to FIG. 29, projection member 551 is provided on preform 585 adjacent side 587. Typically projection member 551 is formed integral with a remainder of preform 585, before preform 585 is secured to the media pack 580, for example with an adhesive. For the particular example shown, the cartridge 550 includes a projection member 551x analogous to projection member 551, at an opposite side 588 of cartridge 550 from member 551. Thus, member 551 is on side 587 and member 551x is on side 558.

Typically, projection member 551 is located within a distance of 100 mm of end 581.

Projection member 551 depicted, has sidewall sections or sides 551a, 551b which diverge from one another away from vertex or central vertex region 551c generally in a direction toward handle arrangement 591, and curved side end 589 of cartridge 550. The projection member 551 is shown in more detail, in the enlarged fragmentary view of FIG. 30.

Referring to FIG. 30, projection member 551 comprising sidewall sections or sides 551a or 551b, and central vertex 551c is shown. Generally sides 551a, 551b diverge away from one another at an angle X1 of no greater than 80°, at least 10°, usually at least 20° and typically within the range of 25° to 55° inclusive, although alternatives are possible. It is noted that projection member 551 includes added third or central leg or sidewall section 551f, for strength.

Referring again to FIG. 29, adjacent end 582 is positioned a housing seal arrangement 600, in this instance comprising a housing seal member 601 configured as an outwardly directed radial seal member. Variations discussed above in connection with FIGS. 7-10 can be used. The particular housing seal arrangement 600 depicted, is generally analogous to the housing seal arrangement of FIG. 10.

From a review of FIGS. 20-31, in combination with an understanding of the operation of the air cleaner arrangement 200, FIG. 6-19; installation and removal of cartridge 550, with respect to housing 501 will be understood. Referring to FIG. 20, access cover 515 would be removed, providing an arrangement analogous to that shown in FIG. 25. Cartridge 550 can be grasped by handle 591, FIG. 29. The cartridge 550 can be installed, when held in the orientation shown in FIG. 29, and inserted into opening 501o, FIG. 25, resulting from removal of access cover 515. The cartridge 550 can be installed utilizing guide arrangement 597 if desired. Once inserted, the cartridge 550 would be tipped into a sealing position, involving engagement of housing seal member 601 with an annular sealing surface within housing 501. During the tipping, tab or projection 551, which will have been received in pocket 557 during installation, is tipped toward (and typically into engagement with) wall 557a. When access cover 515 is put in place, tab 558 will become positioned behind projection 551, securing the cartridge 550 against movement. An analogous tab would be positioned behind projection 551x; which projection 551x would be received in an opposite projection to projection 557, further insuring stability.

Figure 33:
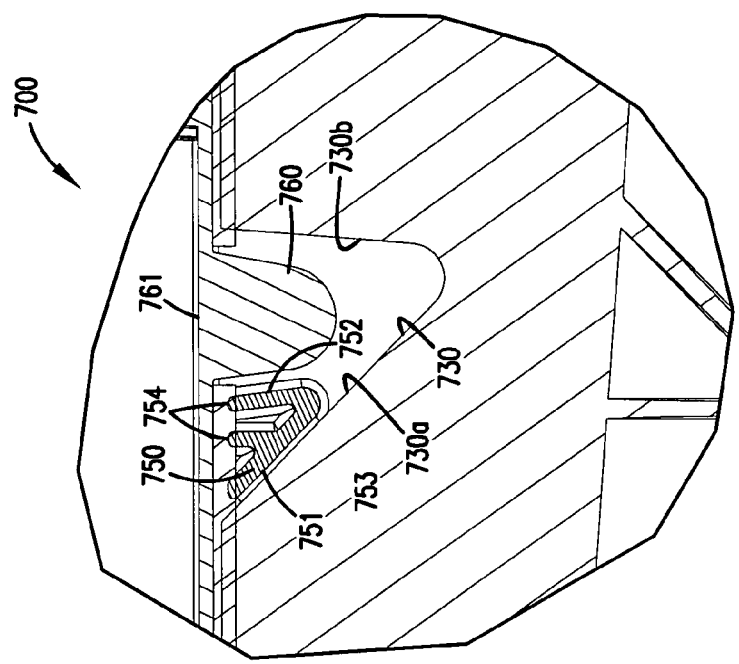
FIG. 33 is a fragmentary cross-sectional view generally analogous to FIG. 23, taken of an internal portion of the air cleaner of FIG. 32, with a portion of a filter cartridge depicted.
Figure 32:
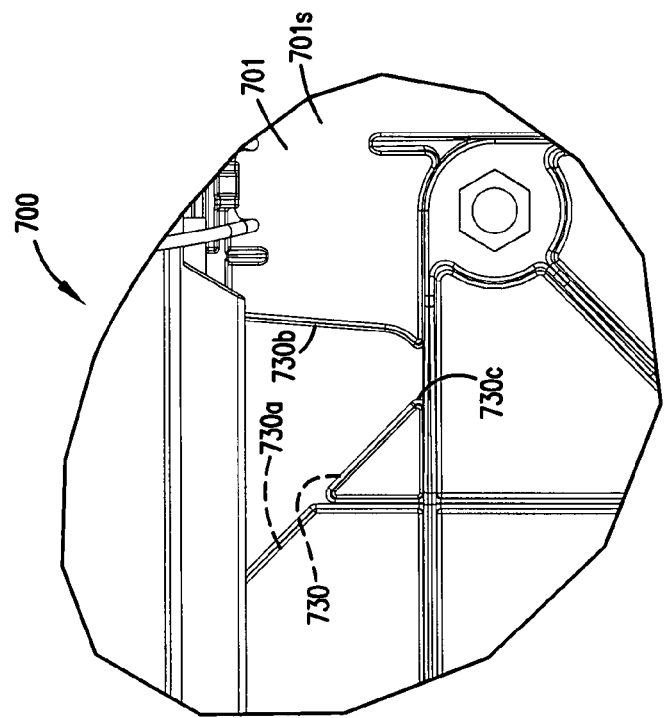
FIG. 32 is an enlarged fragmentary view of the side portion of an alternate air cleaner in accord with the present disclosure.

An alternate projection/receiver arrangement, useable with the principles described in FIGS. 20-31, is depicted in FIGS. 32, 33. Referring to FIG. 32, air cleaner 700 is depicted with housing 701 having a sidewall 701s with receiver pocket 730 therein. FIG. 32 is generally analogous to FIG. 26. Receiver pocket 730 includes opposite side 730a, 703b, diverging from a central vertex or vertex region 730c.

Referring to FIG. 33, a cross-sectional view generally analogous to the view of FIG. 23, a projection arrangement 750, on an internally received cartridge, is shown positioned within receiving pocket 730 against side wall 730a and secured thereto by tab 760 on access cover 761. Projection 750 generally includes first and second outer sidewall sections 751, 752 which diverge from one another in extension from a central vertex or vertex region 753. Projection 750 includes a third side leg member or sidewall section 754, positioned between the diverging first and second lengths or sidewall sections 751, 752.

In more general terms, as with the arrangement of FIGS. 6-19, an air cleaner assembly is provided. The assembly includes a housing defining an interior and having: an access cover; and, an air flow inlet section; an air flow outlet section; a primary filter cartridge receiving section between the air flow inlet section and the air flow outlet section; and, a primary filter cartridge radial seal surface. A first removable and replaceable primary filter cartridge is in an installed positioned within the housing. The primary filter cartridge generally comprises a media pack having an inlet flow face and an opposite outlet flow face. The media pack comprises a plurality of flutes extending between the inlet flow face and the opposite outlet flow face. The media pack is closed to passage of unfiltered air therethrough, between the inlet flow face and the outlet flow face.

The primary filter cartridge is provided with a housing seal member in radial sealing engagement with the primary filter cartridge housing radial seal surface. Alternatives are provided for the seal arrangement. Typically seal arrangement includes a seal support on (around) which the housing seal member is positioned. The seal support is typically positioned projecting axially outwardly from the outlet flow face of the media pack.

The air cleaner assembly includes at least a first projection/receiver arrangement. The first projection/receiver arrangement includes a first receiver member secured to the first interior wall of the housing being at least first and second sidewall sections defining a receiver space therebetween. The first and second sidewall sections of the receiver member are non-parallel to one another. The first projection/receiver arrangement also includes projection member positioned on a first removable and replaceable primary filter cartridge and oriented with at least a portion thereof within the receiver spaced between the first and second sidewall sections of the first receiver member. In the example shown, the first projection member is positioned in engagement with one of the first and second side walls of the receiver packet, when installed.

Typically, the first projecting member of the first projection/receiver arrangement includes at least first and second sidewall sections that are non-parallel to one another.

Typically, the access cover includes the first support arrangement oriented to prevent the first projection member of the first projection/receiver arrangement from tipping away from an installed position with respect to the first receiver member of the first projection/receiver arrangement. The installed position, is a position in which the cartridge is oriented with the housing seal arrangement sealed to the annular seal support within the housing.

For the example shown, the first projection member has a v-shape with a vertex directed generally across (somewhat perpendicularly) a direction between the inlet flow face and the outlet flow face, i.e., generally toward a curved side end of the filter cartridge and away from the access cover. Also in the example shown the first and second sidewall sections of the first receiver member diverge from one another in extension toward the access cover.

In an example shown, a second projection/receiver arrangement is provided on an opposite side of the filter cartridge, from the first projection/receiver arrangement. It is typically oriented as a mirror image of the first projection/receiver arrangement.

In an example shown, the projection members of the first projection/receiver arrangement and second projection/receiver arrangement, each comprise a third sidewall positioned between the first and second sidewall sections.

Also in general, an air filter cartridge is provided. As with the cartridge of the example of FIGS. 6-20, the air filter cartridge includes a media pack having an inlet flow face and an opposite outlet flow face. The media pack comprises a plurality of flutes extending between the inlet flow face and the opposite outlet flow face. The media pack is closed to passage of unfiltered air therethrough, between the inlet flow face and the outlet flow face.

A seal member is provided adjacent the outlet flow face and includes a radially outwardly directed radial seal surface. A variety of arrangements with a seal surface are possible. In an example shown, the housing seal member is mounted around a seal support that projects outwardly from an outlet flow face of the filter cartridge.

As with the arrangement of FIGS. 6-20, preform support is positioned on the media pack adjacent the inlet flow face. The preform support extends toward the outlet flow face typically no more than 50% of the length of the media pack, and typically no more than 35% thereof; and, within a distance of 100 mm of the inlet flow face.

The preform support includes a first member of a first projection/receiver arrangement thereon. The first member includes a first projection member including first and second sidewall sections having portions non-parallel and diverging from one another.

In the example shown, the media pack is an oval outer perimeter shape with curved side ends on opposite sides. The first and second wall sections of the first projection member generally diverge from one another in extension toward one of the curved side ends of the oval outer perimeter shape.

The media pack typically comprises fluted sheets secured to facing sheet and coiled with the facing sheet directed outwardly. The opposite sides of the media pack are typically straight.

The preform support can include a handle member positioned in overlap with the curved end of the media pack.

In an example shown, the preform support includes a first member of a second projection/receiver member thereon, on an opposite side of the media pack from the first projection member of the first projection/receiver arrangement, generally oriented as a mirror image thereof.

In an alternate characterization, an air filter cartridge is provided with the media pack having an inlet flow face and an opposite outlet flow face with an oval perimeter shape and first and second opposite sides and first and second opposite curved side ends. The media pack comprises a plurality of flutes extending between the inlet flow face and the outlet flow face. The media pack is closed to passage of unfiltered air therethrough, between the inlet flow face and the outlet flow face. A seal member is positioned on the media pack including a radially outwardly directed radial seal surface.

A first member of a first projection/receiver arrangement is positioned on the media pack at a location within 100 mm of the inlet flow face. The first member includes a first projection member extending outwardly from adjacent the media pack and including at least one of: (a) a first projection wall segment directed generally between the inlet flow face and the outlet flow face (see the example of FIGS. 6-20); and, (b) a second wall projection segment with a portion directed generally across a direction between the inlet flow face and the outlet flow face (see the example of FIGS. 20-33).

In an example in accord with FIGS. 20-33, the first projection member includes first and second sidewall segments oriented to diverge from one another in extension toward one of the first and second curved side ends of the media pack.

A second projection member on the filter cartridge, oriented as a mirror image of the first projection member, can be provided.

Typically the projection member(s) are provided on a preform support extending around the media pack adjacent the inlet flow face. Again, when used, preform support typically extends no more than 50% of a distance from the inlet flow face to the outlet flow face.

In an alternate characterization an air cleaner assembly is provided comprising a housing defining an interior and having air flow inlet and air flow outlet, a primary filter cartridge receiving section between the air flow inlet and air flow outlet and an access cover removably positioned in the primary filter cartridge receiving section. The housing primary filter cartridge receiving section includes a sidewall portion with the first receiver member of a first projection/receiver arrangement thereon, defining a first receiver space. The first receiver member has first and second sidewall sections defining the receiver space therebetween.

A first removable and replaceable primary filter cartridge is positioned within the housing. The primary filter cartridge comprises a media pack having an inlet flow face and an opposite outlet flow face. The media pack comprises a plurality of flutes extending between the inlet flow face and the outlet flow face. The media pack is closed to passage of unfiltered air between the inlet flow face and the outlet flow face and the media pack includes a housing radial seal member thereon adjacent the outlet face of the filter cartridge and sealed to the housing.

A first member of the first projection/receiver arrangement is positioned on the filter cartridge and includes a first projection member projecting radially outwardly from a location adjacent the media pack. The filter cartridge is tippable within the primary filter cartridge receiving section of the housing, when the access cover is removed, to move the filter cartridge into and out of an installed position. When in the installed position, the housing seal arrangement is sealed to the housing seal support within the housing.

The access cover includes structure preventing the filter cartridge from being tippable out of the installed position, when the access cover is installed on the housing.

In the example embodiment of FIGS. 20-31, example dimensions are provided. The dimensions are meant to be an example of a useable arrangement only, and alternate dimensions are useable. The dimensions indicated for the example shown are as follows: In FIG. 21, AA=11.69 inches (29.7 cm); in FIG. 22, BA=23.47 inches (59.4 cm); BB=13.72 inches (34.8 cm); BC=6.0 inches (15.2 cm); in FIG. 28, CA=2.17 inches (5.5 cm); CB=47°; CC=1.69 inches (4.3 cm); CD=1.61 inches (4.1 cm); and CE=0.33 inches (0.84 cm); in FIG. 29, DA=13.17 inches (33.5 cm); DB=9.90 inches (25.1 cm); in FIG. 30, EA=0.75 inches (1.9 cm); EB=0.76 inches (1.93 cm); and, in FIG. 31, FA=10.17 inches (25.83 cm); FB=15.17 inches (38.5 cm). Other dimensions can be taken from scale.

It is noted that not all of the features characterized herein need to be incorporated within a given arrangement, for the arrangement to include improvements according to the present disclosure.

What is claimed is:

1. An air filter cartridge comprising:
   (a) a media pack having an inlet flow face and an opposite outlet flow face;
      (i) the media pack comprising a plurality of flutes extending between the inlet flow face and the opposite outlet flow face; and,
      (ii) the media pack being closed to passage of unfiltered air therethrough, between the inlet flow face and the outlet flow face;
   (b) a seal member adjacent the outlet flow face and including a radially outwardly directed radial seal surface; and
   (c) a preform support positioned on the media pack adjacent the inlet flow face;
      (i) the preform support including a first member of a first projection/receiver arrangement thereon; the first member including a first projection member including first and second sidewall sections having portions non-parallel and diverging from one another; the first and second sidewall sections of the first projection member of the first projection/receiver arrangement diverging from one another in extension toward the inlet flow face.

2. An air filter cartridge according to claim 1 wherein:
   (a) the media pack comprises a fluted sheet secured to a facing sheet and coiled with the facing sheet directed outwardly.

3. An air filter cartridge according to claim 1 wherein:
   (a) the first projection member of the first member of the first projection/receiver arrangement includes a first locking tip on the first of the sidewall sections and directed away from the second of the sidewall sections.

4. An air filter cartridge according to claim 3 wherein:
   (a) the media pack has first and second, opposite, sides and first and second, opposite, curved, ends; and,
   (b) the first locking tip is directed toward the first curved end.

5. An air filter cartridge according to claim 1 wherein:
   (a) the preform support includes a first projection member of a second projection/receiver arrangement thereon; the first projection member of the second projection/receiver arrangement including first and second sidewall sections having portions non-parallel and diverging from one another.

6. An air filter cartridge comprising:
   (a) a media pack having an inlet flow face and an opposite outlet flow face and an oval perimeter shape with first and second opposite sides and first and second, opposite, curved side ends;
      (i) the media pack comprising a plurality of flutes extending between the inlet flow face and the outlet flow face; and,
      (ii) the media pack being closed to passage of unfiltered air therethrough, between the inlet flow face and the outlet flow face;
   (b) a seal member including a radially outwardly directed radial seal surface and positioned adjacent the outlet flow face; and,
   (c) a first member of a first projection/receiver arrangement positioned on the media pack at a location within 100 mm of the inlet flow face;
      (i) the first member including a first projection member extending outwardly from adjacent the media pack and including:
         (A) a first projection wall segment directed generally between the inlet flow face and the outlet flow face; and,
         (B) a second projection wall segment with a portion directed generally across a direction between the inlet flow face and the outlet flow face; the first and second projection wall segments diverging from one another at an angle of no more than 80°.

7. An air filter cartridge according to claim 6 wherein:
   (a) the first projection wall segment and the second projection wall segment diverge from one another in extension toward the inlet flow face.

8. An air filter cartridge according to claim 6 wherein:
   (a) the first member of the first projection/receiver arrangement has first and second side wall segments oriented to diverge from one another in extension toward one of the first and second curved side ends.

9. An air filter cartridge according to claim 6 wherein:
   (a) the first projection member is positioned adjacent the first side of the media pack; and,
   (b) the filter cartridge includes a first member of a second projection/receiver arrangement;
      (i) the first member of the second projection/receiver arrangement including a first projection member positioned to project outwardly from adjacent the second side of the media pack; and,
      (ii) the first projection member including at least one of:
         (A) a first projection wall segment directed generally between the inlet flow face and the outlet flow face; and,
         (B) a second projection wall segment with a portion directed generally across a direction between the inlet flow face and the outlet flow face.

10. An air filter cartridge according to claim 9 wherein:
    (a) the first projection member of the first member of the second projection/receiver arrangement is shaped and positioned as a mirror image of the first projection member of the first member of the first projection/receiver arrangement.

11. An air filter cartridge according to claim 6 including:
    (a) a preform support extending around the media pack adjacent the inlet flow face;
       (i) the first projection member of the first member of the first projection/receiver arrangement comprising a portion integral with a remainder of the preform support; and
       (ii) the preform support extending no more than 50% of a distance from the inlet flow face to the outlet flow face.

12. An air cleaner assembly comprising:
    (a) a housing defining an interior and having: an access cover; and, an air flow inlet section; an air flow outlet section; a primary filter cartridge receiving section between the air flow inlet section and the air flow outlet section; and, a primary filter cartridge radial seal surface;
    (b) a first removable and replaceable primary filter cartridge positioned within the housing; the primary filter cartridge comprising a media pack having an inlet flow face and an opposite outlet flow face;
       (i) the media pack comprising a plurality of flutes extending between the inlet flow face and the opposite outlet flow face;

(ii) the media pack being closed to passage of unfiltered air therethrough, between the inlet flow face and the outlet flow face; and, (iii) the primary filter cartridge including a housing seal member thereon in radial sealing engagement with the primary cartridge housing radial seal surface; and, (c) a first stationary projection/receiver arrangement including:

(i) a first receiver member secured to a first interior wall of the housing having at least first and second sidewall sections defining a receiver space therebetween;

(A) the first and second sidewall sections of the first receiver member being non-parallel to one another; and, (ii) a first projection member positioned on the first removable and replaceable primary filter cartridge and oriented with at least a portion thereof within the receiver space between the first and second sidewall sections of the first receiver member;

(iii) the first projection member of the first projection/receiver arrangement includes at least first and second side wall sections that are not parallel to one another;

(A) the first projection member having a v-shape with a vertex region directed toward the outlet flow face of the filter cartridge; and, (B) the first and second side wall sections of the first receiver member diverging from one another in extension toward the inlet section of the housing.

13. An air cleaner assembly according to claim 12 wherein:

(a) the access cover includes a first support arrangement oriented to prevent the first projection member of the first projection/receiver arrangement from tipping away from an installed position with respect to the first receiver member of the first projection/receiver arrangement.

14. An air cleaner assembly according to claim 12 wherein:

(a) the first projection/receiver arrangement includes: the first stationary receiver member; and, a second stationary receiver member positioned on the first interior wall of the housing spaced from the first receiver member;

(i) the second receiver member of the first projection/receiver arrangement having first and second side wall sections defining a receiver space therebetween;

(A) the first and second sidewall members of the second receiver member of the first projection/receiver arrangement being non-parallel to one another; and, (b) the first projection/receiver arrangement includes a second projection member positioned on a same side of the first removable and replaceable filter cartridge as the first projection member of the first projection/receiver arrangement and spaced from first projection member of the first projection/receiver arrangement;

(i) the second projection member being oriented with at least a portion thereof within the receiver space between the first and second side wall sections of the second receiver member of the filter projection/receiver arrangement.

15. An air cleaner assembly according to claim 12 including:

(a) a second projection/receiver arrangement including:

(i) a first stationary receiver member secured to an interior wall of the housing opposite the first receiver member of the first projection/receiver arrangement with the first removable and replaceable filter cartridge therebetween;

(A) the first receiver member of the second projection/receiver arrangement comprising first and second sidewall sections defining a receiver space therebetween;

(1) the first and second sidewall sections of the first receiver member of the second projection/receiver arrangement being non-parallel to one another; and, (ii) a first projection member positioned on the first removable and replaceable primary filter cartridge and oriented with at least a portion thereof between the first and second wall sections of the first receiver member of the second projection/receiver arrangement.

16. An air cleaner assembly comprising:

(a) a housing defining an interior and having: an air flow inlet; an air flow outlet; a primary filter cartridge receiving section between the air flow outlet and the air flow inlet; and, an access cover removably positioned in the primary filter cartridge receiving section;

(i) the housing primary filter cartridge receiving section including a sidewall portion with a first stationary receiver member of a first projection/receiver arrangement thereon defining a first receiver space;

(A) the first receiver member having at least first and second sidewall sections defining a receiver space therebetween;

(b) a first removable and replaceable primary filter cartridge positioned within the housing; the first primary filter cartridge comprising a media pack having an inlet flow face and an opposite outlet flow face;

(i) the media pack comprising a plurality of flutes extending between the inlet flow face and the outlet flow face;

(ii) the media pack being closed to passage of unfiltered air between the inlet flow face and the outlet flow face; and, (iii) the media pack including a housing radial seal member thereon adjacent the outlet face of the filter cartridge and sealed to the housing; and, (c) a first member of the first projection/receiver arrangement positioned on the filter cartridge and including a first projection member projecting radially outwardly from a location adjacent the media pack;

(i) the filter cartridge being tippable within the primary filter cartridge receiving section of the housing, when the access cover is removed, into and out of an installed position;

(ii) the access cover includes structure preventing the filter cartridge from being tippable out of the installed position when the access cover is installed on the housing; and, (iii) the first member of the first projection/receiver arrangements comprising first and second sidewall sections that diverge from one another.

17. An air filter cartridge comprising:

(a) a media pack having an inlet flow face and an opposite outlet flow face;

(i) the media pack comprising a plurality of flutes extending between the inlet flow face and the opposite outlet flow face;

(ii) the media pack being closed to passage of unfiltered air therethrough, between the inlet flow face and the outlet flow face; and, (iii) the media pack having an oval outer perimeter shape with curved side ends and opposite sides;

(b) a seal member adjacent the outlet flow face and including a radially outwardly directed radial seal surface; and
(c) a preform support positioned on the media pack adjacent the inlet flow face;
  (i) the preform support including a first member of a first projection/receiver arrangement thereon; the first member including a first projection member including first and second sidewall sections having portions non-parallel and diverging from one another; the first and second side wall sections diverging from one another in extension toward one of the curved side ends of the oval outer perimeter shape.

18. An air filter cartridge according to claim 17 wherein:
(a) the media pack comprises a fluted sheet secured to a facing sheet and coiled with the facing sheet directed outwardly.

19. An air filter cartridge comprising:
(a) a media pack having an inlet flow face and an opposite outlet flow face;
  (i) the media pack comprising a plurality of flutes extending between the inlet flow face and the opposite outlet flow face;
  (ii) the media pack being closed to passage of unfiltered air therethrough, between the inlet flow face and the outlet flow face; and,
  (iii) the media pack having first and second opposite, straight sides and first and second, opposite, curved side ends;
(b) a seal member adjacent the outlet flow face and including a radially outwardly directed radial seal surface; and
(c) a preform support positioned on the media pack adjacent the inlet flow face;
  (i) the preform support including a first member of a first projection/receiver arrangement thereon; the first member including a first projection member including first and second sidewall sections having portions non-parallel and diverging from one another; and,
  (ii) the preform support including a handle member positioned in overlap with a curved side end of the media pack.

20. An air filter cartridge comprising:
(a) a media pack having an inlet flow face and an opposite outlet flow face;
  (i) the media pack comprising a plurality of flutes extending between the inlet flow face and the opposite outlet flow face; and,
  (ii) the media pack being closed to passage of unfiltered air therethrough, between the inlet flow face and the outlet flow face;
(b) a seal member adjacent the outlet flow face and including a radially outwardly directed radial seal surface; and
(c) a preform support positioned on the media pack adjacent the inlet flow face;
  (i) the preform support including a first member of a first projection/receiver arrangement thereon; the first member including a first projection member including first and second sidewall sections having portions non-parallel and diverging from one another; and,
  (ii) the first projection member of the first member of the first projection/receiver arrangement includes a first locking tip on the first of the sidewall sections and directed away from the second of the sidewall sections.

21. An air filter cartridge comprising:
(a) a media pack having an inlet flow face and an opposite outlet flow face;
  (i) the media pack comprising a plurality of flutes extending between the inlet flow face and the opposite outlet flow face; and,
  (ii) the media pack being closed to passage of unfiltered air therethrough, between the inlet flow face and the outlet flow face;
(b) a seal member adjacent the outlet flow face and including a radially outwardly directed radial seal surface; and
(c) a preform support positioned on the media pack adjacent the inlet flow face;
  (i) the preform support including a first member of a first projection/receiver arrangement thereon; the first member including a first projection member including first and second sidewall sections having portions non-parallel and diverging from one another; and,
  (ii) the preform support includes a first projection member of a second projection/receiver arrangement thereon; the first projection member of the second projection/receiver arrangement including first and second sidewall sections having portions non-parallel and diverging from one another.

22. An air cleaner assembly comprising:
(a) a housing defining an interior and having: an access cover; and, an air flow inlet section; an air flow outlet section; a primary filter cartridge receiving section between the air flow inlet section and the air flow outlet section; and, a primary filter cartridge radial seal surface;
(b) a first removable and replaceable primary filter cartridge positioned within the housing; the primary filter cartridge comprising a media pack having an inlet flow face and an opposite outlet flow face;
  (i) the media pack comprising a plurality of flutes extending between the inlet flow face and the opposite outlet flow face;
  (ii) the media pack being closed to passage of unfiltered air therethrough, between the inlet flow face and the outlet flow face; and,
  (iii) the primary filter cartridge including a housing seal member thereon in radial sealing engagement with the primary cartridge housing radial seal surface; and,
(c) a first stationary projection/receiver arrangement including:
  (i) a first receiver member secured to a first interior wall of the housing having at least first and second sidewall sections defining a receiver space therebetween;
    (A) the first and second sidewall sections of the first receiver member being non-parallel to one another; and,
  (ii) a first projection member positioned on the first removable and replaceable primary filter cartridge and oriented with at least a portion thereof within the receiver space between the first and second sidewall sections of the first receiver member; and,
(d) a second projection/receiver arrangement including:
  (i) a first stationary receiver member secured to an opposite interior wall of the housing from the first interior wall with the first removable and replaceable filter cartridge therebetween;
    (A) the first receiver member of the second projection/receiver arrangement comprising first and second sidewall sections defining a receiver space therebetween;
      (1) the first and second sidewall sections of the second projection/receiver arrangement being non-parallel to one another; and, (ii) a first projection member positioned on the first removable and replaceable primary filter cartridge and oriented with at least a portion thereof between the first and second wall sections of the first receiver member of the second projection/receiver arrangement.

23. An air cleaner assembly according to claim 22 wherein:
(a) the first projection/receiver arrangement includes the first receiver member and a second stationary receiver member spaced from one another on the first interior wall of the housing from the first receiver member;
  (i) the second receiver member of the first projection/receiver arrangement having first and second side wall sections defining a receiver space therebetween;
    (A) the first and second sidewall members of the second receiver member of the first projection/receiver arrangement being non-parallel to one another;
(b) the first projection/receiver arrangement including a second projection member positioned on a same side of the first removable and replaceable filter cartridge as the first projection member and spaced therefrom;
  (i) the second projection member being oriented with at least a portion thereof within the receiver space between the first and second side wall sections of the second receiver member of the filter projection/receiver arrangement;
(c) the second projection/receiver arrangement includes the first receiver member and a second stationary receiver member of the projection/receiver arrangement spaced from the first receiver member on a same interior wall of the housing as the first receiver member of the second projection/receiver arrangement;
  (i) the second receiver member of the second projection/receiver arrangement being first and second side wall sections defining a receiver space therebetween;
    (A) the first and second sidewall members of the second receiver member of the second projection/receiver arrangement being non-parallel to one another; and,
(d) the second projection/receiver arrangement includes a second projection member positioned on a same side of the first removable and replaceable filter cartridge as the first projection member of the second projection/receiver arrangement and spaced therefrom;
  (i) the second projection member of the second projection/receiver arrangement being oriented with at least a portion thereof within the receiver space between the first and second side wall sections of the second receiver member of the second projection/receiver arrangement.

24. An air cleaner assembly comprising:
(a) a housing defining an interior and having: an access cover; and, an air flow inlet section; an air flow outlet section; a primary filter cartridge receiving section between the air flow inlet section and the air flow outlet section; and, a primary filter cartridge radial seal surface;
(b) a first removable and replaceable primary filter cartridge positioned within the housing; the primary filter cartridge comprising a media pack having an inlet flow face and an opposite outlet flow face;
  (i) the media pack comprising a plurality of flutes extending between the inlet flow face and the opposite outlet flow face;
  (ii) the media pack being closed to passage of unfiltered air therethrough, between the inlet flow face and the outlet flow face; and,
  (iii) the primary filter cartridge including a housing seal member thereon in radial sealing engagement with the primary cartridge housing radial seal surface; and,
(c) a first stationary projection/receiver arrangement including:
  (i) a first receiver member secured to a first interior wall of the housing having at least first and second sidewall sections defining a receiver space therebetween;
    (A) the first and second sidewall sections of the first receiver member being non-parallel to one another; and,
  (ii) a first projection member positioned on the first removable and replaceable primary filter cartridge and oriented with at least a portion thereof within the receiver space between the first and second sidewall sections of the first receiver member.
(d) the first projection/receiver arrangement includes: the first stationary receiver member; and, a second stationary receiver member positioned on the first interior wall of the housing spaced from the first receiver member;
  (i) the second receiver member of the first projection/receiver arrangement having first and second side wall sections defining a receiver space therebetween;
    (A) the first and second sidewall members of the second receiver member of the first projection/receiver arrangement being non-parallel to one another; and,
(e) the first projection/receiver arrangement includes a second projection member positioned on a same side of the first removable and replaceable filter cartridge as the first projection member of the first projection/receiver arrangement and spaced from first projection member of the first projection/receiver arrangement;
  (i) the second projection member being oriented with at least a portion thereof within the receiver space between the first and second side wall sections of the second receiver member of the filter projection/receiver arrangement.

25. An air cleaner assembly comprising:
(a) a housing defining an interior and having: an access cover; and, an air flow inlet section; an air flow outlet section; a primary filter cartridge receiving section between the air flow inlet section and the air flow outlet section; and, a primary filter cartridge radial seal surface;
(b) a first removable and replaceable primary filter cartridge positioned within the housing; the primary filter cartridge comprising a media pack having an inlet flow face and an opposite outlet flow face;
  (i) the media pack comprising a plurality of flutes extending between the inlet flow face and the opposite outlet flow face;
  (ii) the media pack being closed to passage of unfiltered air therethrough, between the inlet flow face and the outlet flow face; and,
  (iii) the primary filter cartridge including a housing seal member thereon in radial sealing engagement with the primary cartridge housing radial seal surface; and,
(c) a first stationary projection/receiver arrangement including:
  (i) a first receiver member secured to a first interior wall of the housing having at least first and second sidewall sections defining a receiver space therebetween;

(A) the first and second sidewall sections of the first receiver member being non-parallel to one another; and,
(ii) a first projection member positioned on the first removable and replaceable primary filter cartridge and oriented with at least a portion thereof within the receiver space between the first and second sidewall sections of the first receiver member;
(d) the first projection member of the first projection/receiver arrangement includes first and second side wall sections that define a v-shape with a vertex region directed away from the access cover; and,
(e) the first and second side wall sections of the first receiver member of the first projection/receiver arrangement diverge from one another in extension toward the access cover.

* * * * *